United States Patent
Kasatani

(10) Patent No.: US 12,299,272 B2
(45) Date of Patent: May 13, 2025

(54) INPUT APPARATUS, INPUT METHOD, PROGRAM, AND INPUT SYSTEM

(71) Applicant: RICOH COMPANY, LTD., Tokyo (JP)

(72) Inventor: Kiyoshi Kasatani, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/282,886

(22) PCT Filed: Oct. 11, 2019

(86) PCT No.: PCT/JP2019/040250
§ 371 (c)(1),
(2) Date: Apr. 5, 2021

(87) PCT Pub. No.: WO2020/080300
PCT Pub. Date: Apr. 23, 2020

(65) Prior Publication Data
US 2021/0365179 A1      Nov. 25, 2021

(30) Foreign Application Priority Data

Oct. 15, 2018   (JP) .................................. 2018-194685
Oct. 8, 2019    (JP) .................................. 2019-185271

(51) Int. Cl.
*G06F 3/04883*  (2022.01)
*G06F 3/0354*   (2013.01)
(Continued)

(52) U.S. Cl.
CPC ...... *G06F 3/04883* (2013.01); *G06F 3/03545* (2013.01); *G06F 3/0482* (2013.01);
(Continued)

(58) Field of Classification Search
CPC ............. G06F 3/04883; G06F 3/03545; G06F 3/0482; G06F 3/04842; G06F 21/31;
(Continued)

(56) References Cited

U.S. PATENT DOCUMENTS 9,237,246 B2    1/2016  Kemmochi et al.
10,705,724 B2   7/2020  Kanematsu et al.
(Continued)

FOREIGN PATENT DOCUMENTS

JP    H09-167058 A    6/1997
JP    2001-005599 A   1/2001
(Continued)

OTHER PUBLICATIONS

International Search Report and Written Opinion Issued on Dec. 16, 2019 in PCT/JP2019/040250 filed on Oct. 11, 2019.
(Continued)

*Primary Examiner* — William Boddie
*Assistant Examiner* — Bipin Gyawali
(74) *Attorney, Agent, or Firm* — XSENSUS LLP

(57) ABSTRACT

An input apparatus includes a handwriting input unit configured to receive a handwritten input using a position of a pen or a user's finger in contact with a display; and a display unit configured to display the handwritten input received by the handwriting input unit on the display as a handwritten object. The input apparatus is configured to, in response to no occurrence of a change in the handwritten object during a first period, display one or more operation commands on the basis of the handwritten object.

20 Claims, 40 Drawing Sheets

(51) Int. Cl.
  *G06F 3/0482* (2013.01)
  *G06F 3/04842* (2022.01)
  *G06F 21/31* (2013.01)
  *G06V 30/14* (2022.01)
  *G06V 30/244* (2022.01)
  *G06V 30/28* (2022.01)
  *G06V 30/32* (2022.01)

(52) U.S. Cl.
  CPC .......... *G06F 3/04842* (2013.01); *G06F 21/31* (2013.01); *G06V 30/1448* (2022.01); *G06V 30/1456* (2022.01); *G06V 30/2445* (2022.01); *G06V 30/287* (2022.01); *G06V 30/32* (2022.01)

(58) Field of Classification Search
  CPC ........ G06F 3/018; G06F 3/048; G06F 3/0488; G06K 9/00402; G06K 2209/011; G06K 9/2063; G06K 9/2081
  See application file for complete search history.

(56) References Cited

U.S. PATENT DOCUMENTS

| | | | | |
|---|---|---|---|---|
| 2003/0212961 A1* | 11/2003 | Soin | .................... | G06F 3/04883 715/271 |
| 2003/0233237 A1* | 12/2003 | Garside | .................. | G06F 3/038 704/E15.045 |
| 2004/0196266 A1* | 10/2004 | Matsuura | ........... | G06F 3/04883 345/169 |
| 2005/0251755 A1* | 11/2005 | Mullins | ................. | G06F 3/0482 715/779 |
| 2007/0067740 A1* | 3/2007 | Seo | ....................... | G06F 3/0482 715/810 |
| 2007/0266411 A1* | 11/2007 | Yamamoto | ........... | A63F 13/533 725/102 |
| 2009/0217204 A1* | 8/2009 | Yamashita | ............. | G06F 16/51 715/838 |
| 2010/0046020 A1* | 2/2010 | Chung | ................. | H04N 1/4413 715/810 |
| 2010/0171891 A1* | 7/2010 | Kaji | .................... | G06F 3/03545 349/12 |
| 2012/0287089 A1* | 11/2012 | Shiota | ................ | G06V 30/1423 345/179 |
| 2014/0062962 A1* | 3/2014 | Jang | ........................ | G06F 40/10 345/175 |
| 2014/0362002 A1* | 12/2014 | Nakasu | ................. | G06F 3/0416 345/173 |
| 2015/0046433 A1* | 2/2015 | Lee | ........................ | H04N 5/445 707/740 |
| 2015/0135065 A1* | 5/2015 | Hirabayashi | ........ | G06F 3/04883 715/261 |
| 2015/0139550 A1* | 5/2015 | Kuno | .................. | G06F 3/04883 382/189 |
| 2015/0242114 A1* | 8/2015 | Hirabayashi | ....... | G06V 30/1423 345/156 |
| 2015/0339936 A1* | 11/2015 | Lee | .......................... | G06F 3/00 348/565 |
| 2016/0092430 A1* | 3/2016 | Motoi | .................... | G06V 30/36 715/261 |
| 2017/0249293 A1* | 8/2017 | Couelier | .............. | G06V 30/387 |
| 2017/0270357 A1* | 9/2017 | Winebrand | .......... | G06V 30/387 |
| 2018/0292951 A1 | 10/2018 | Kato et al. | | |
| 2019/0042065 A1* | 2/2019 | Park | ....................... | G06F 3/0488 |
| 2020/0142952 A1* | 5/2020 | Akitomo | ............... | G06F 40/171 |
| 2021/0141363 A1* | 5/2021 | Shimura | .............. | G05B 19/408 |
| 2023/0043998 A1* | 2/2023 | Yoshida | .............. | G06F 3/04883 |

FOREIGN PATENT DOCUMENTS

| | | |
|---|---|---|
| JP | 2018-026185 A | 2/2018 |
| JP | 2018-124735 A | 8/2018 |

OTHER PUBLICATIONS

Office Action issued Oct. 24, 2023 in Japanese Patent Application No. 2019-185271, 6 pages.

\* cited by examiner

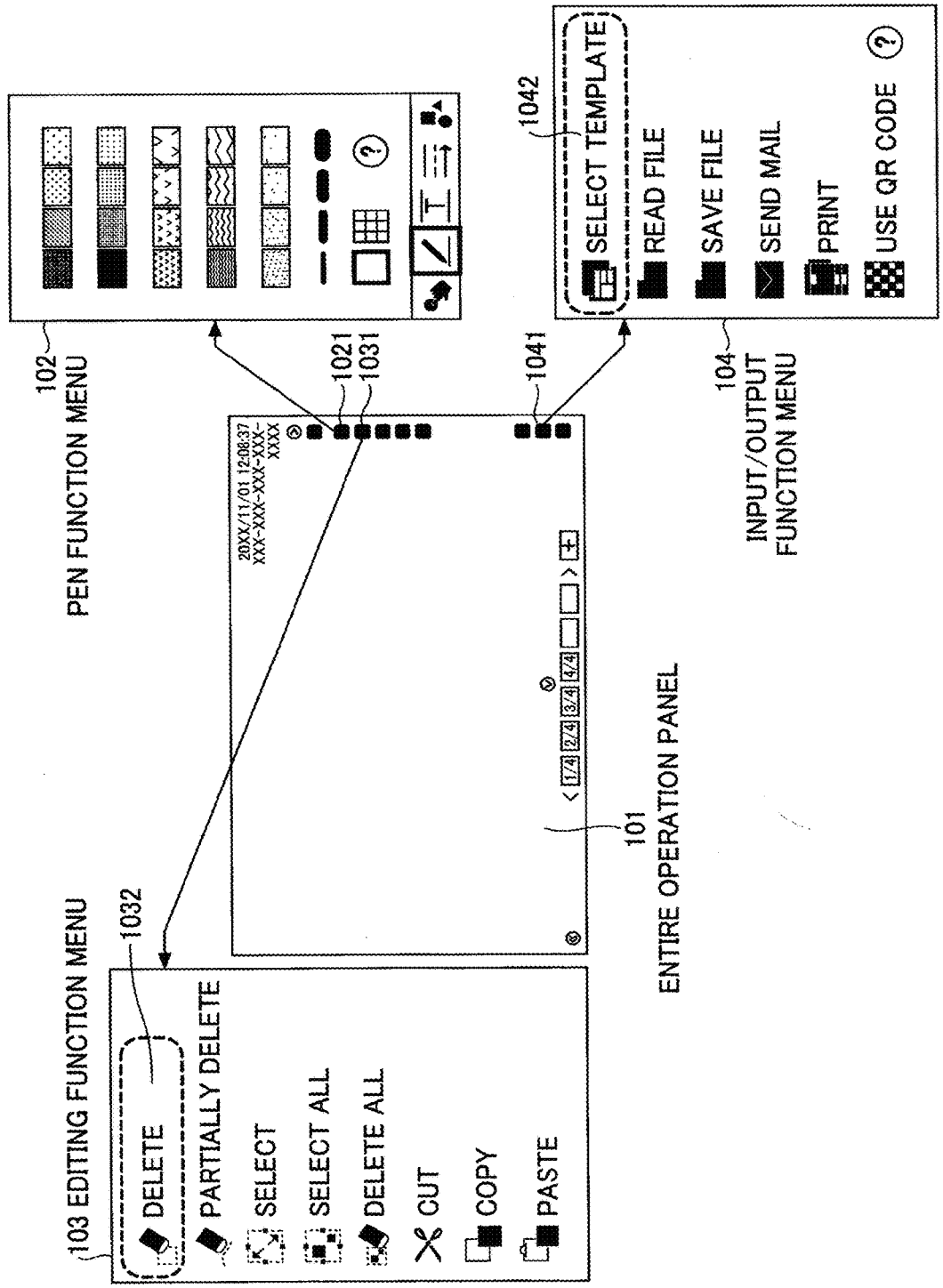

[Fig. 2]
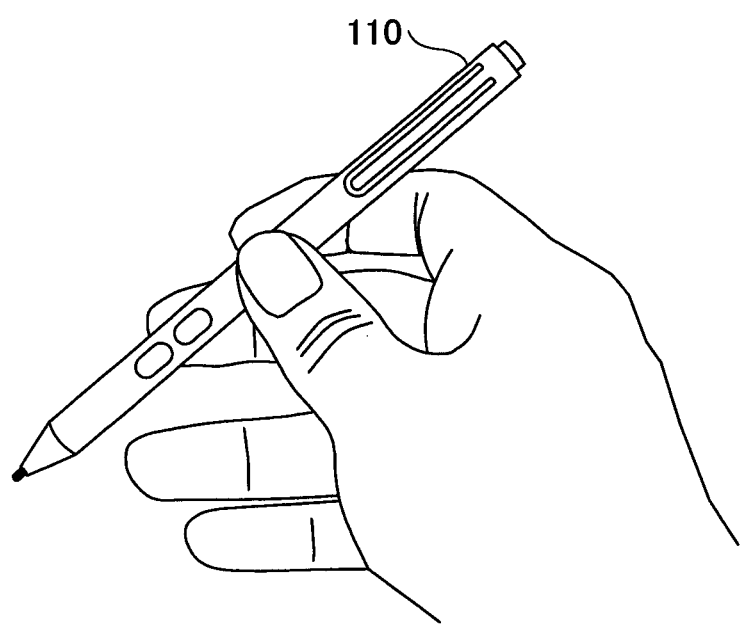

[Fig. 3A]
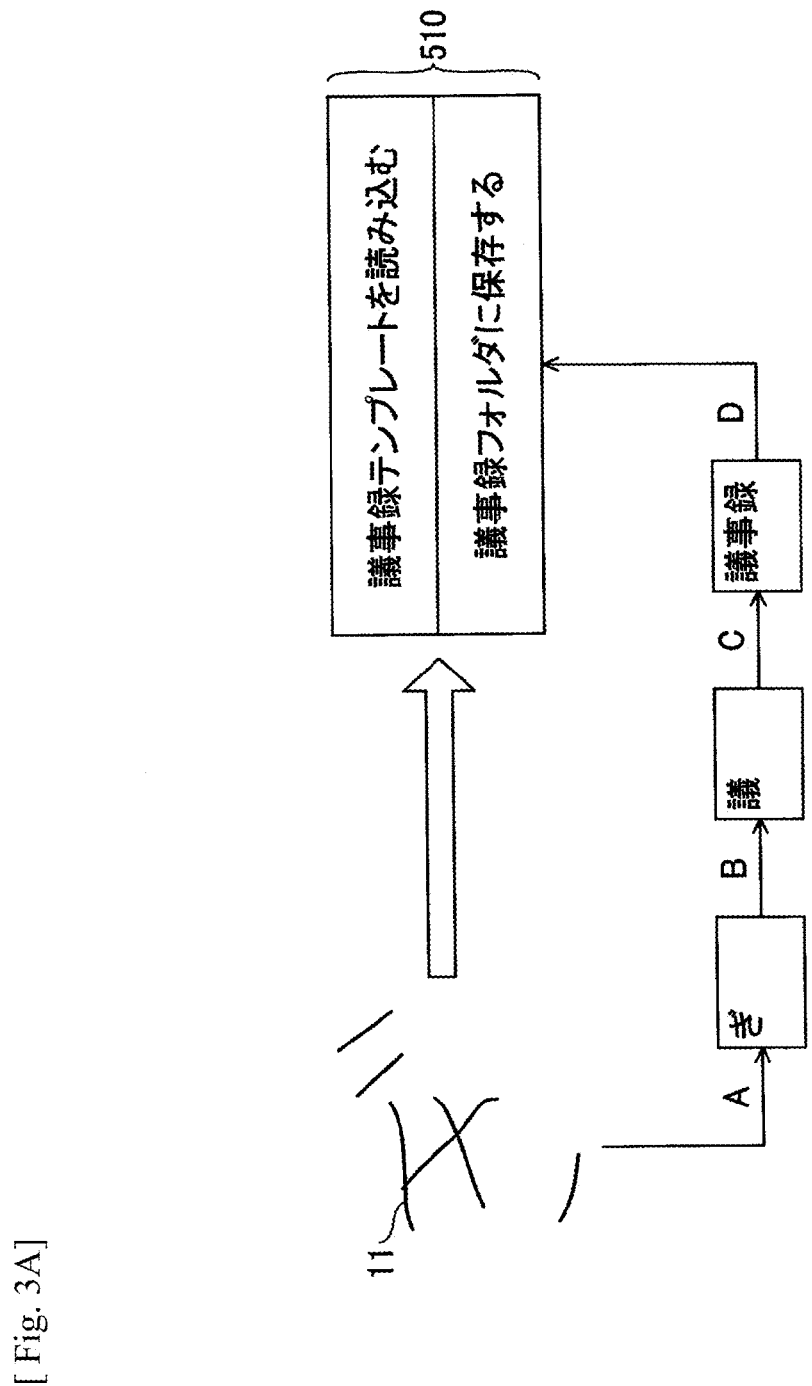

[Fig. 3B]
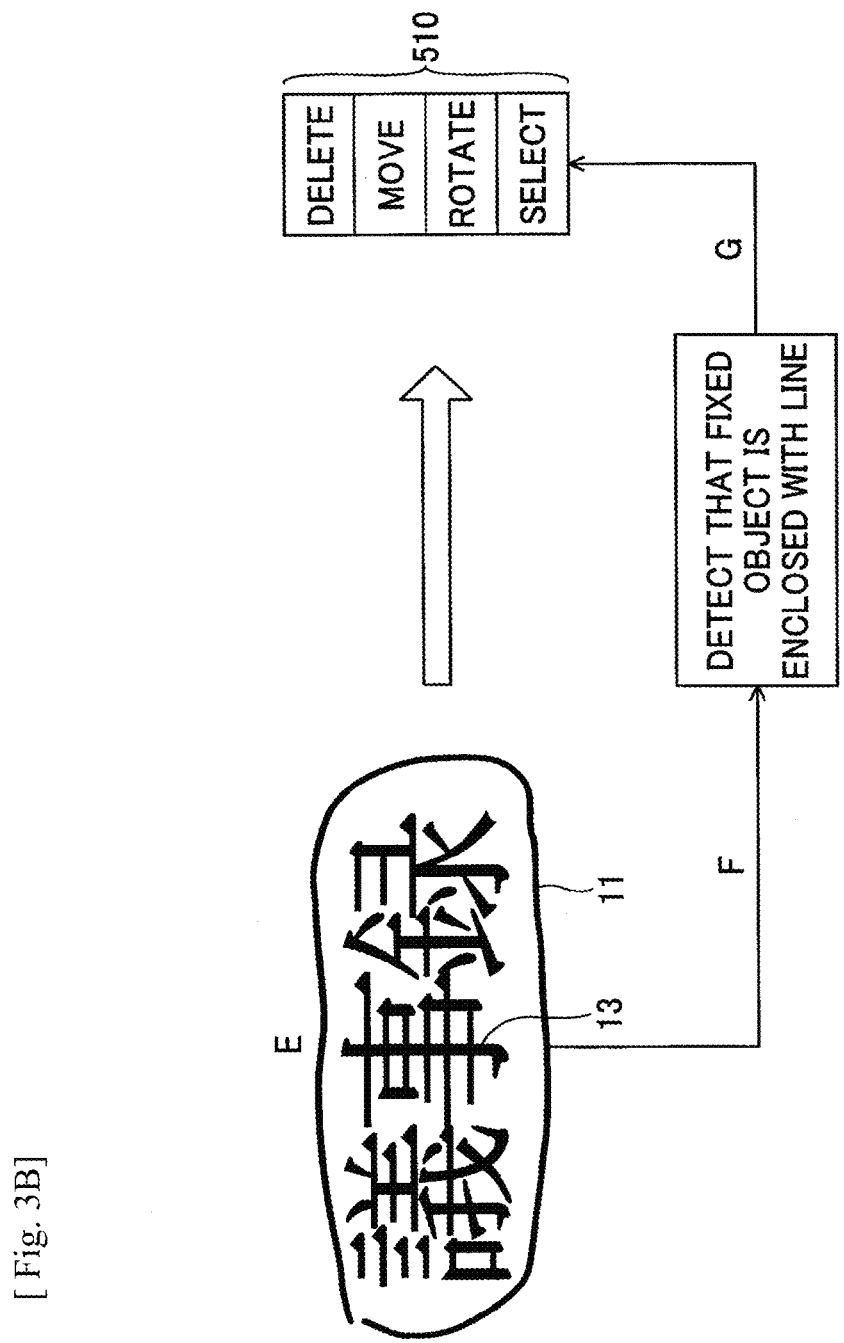

[Fig. 4]
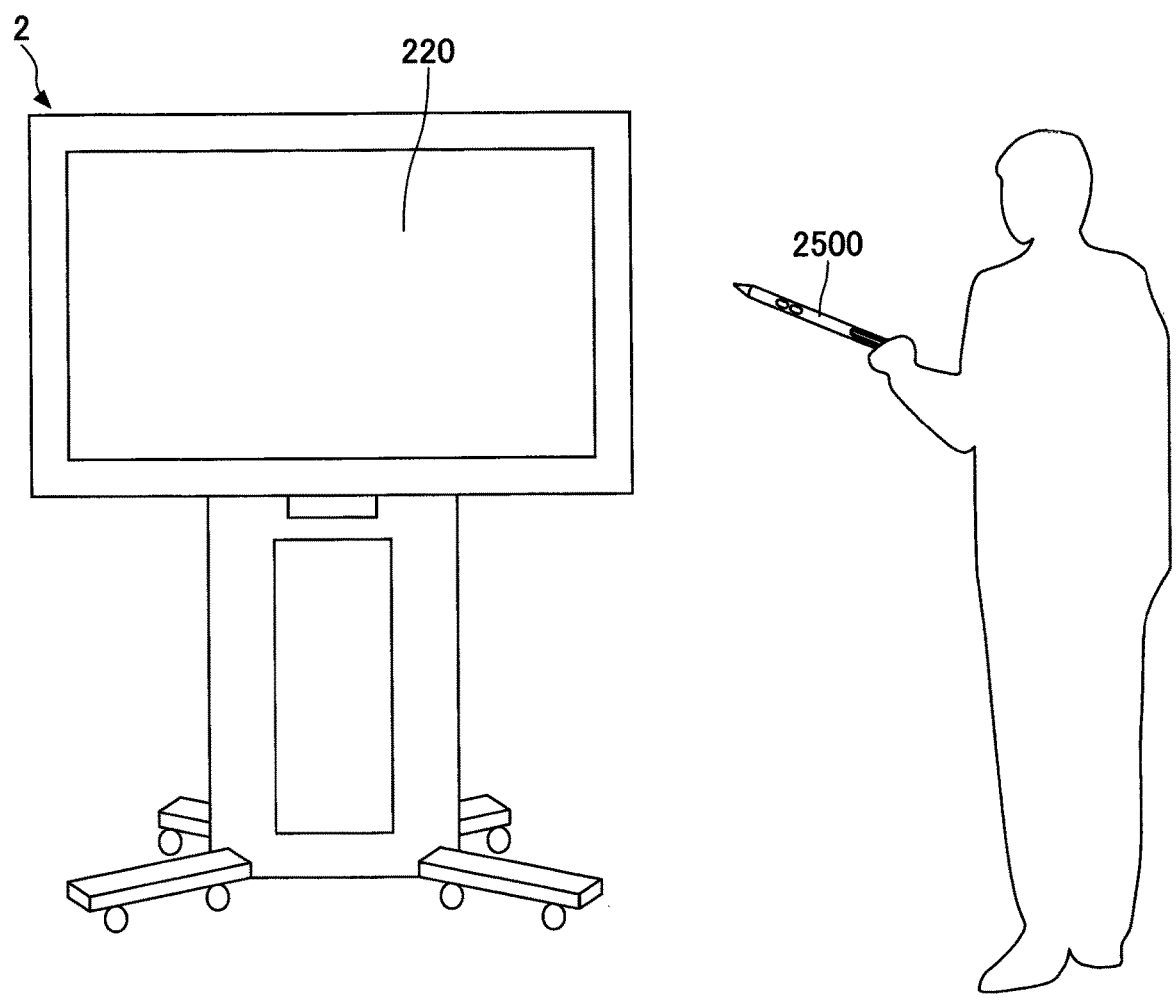

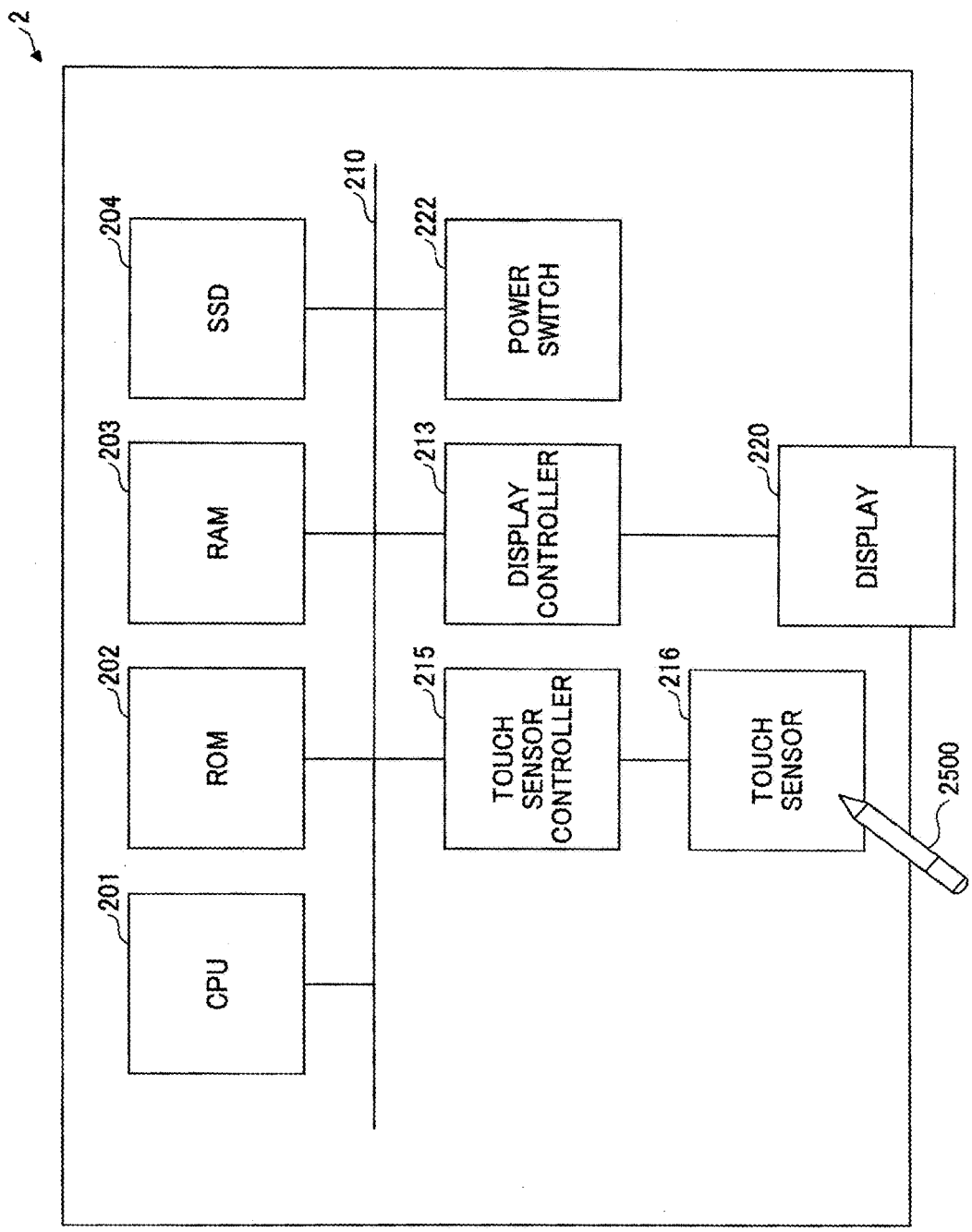
[Fig. 5]

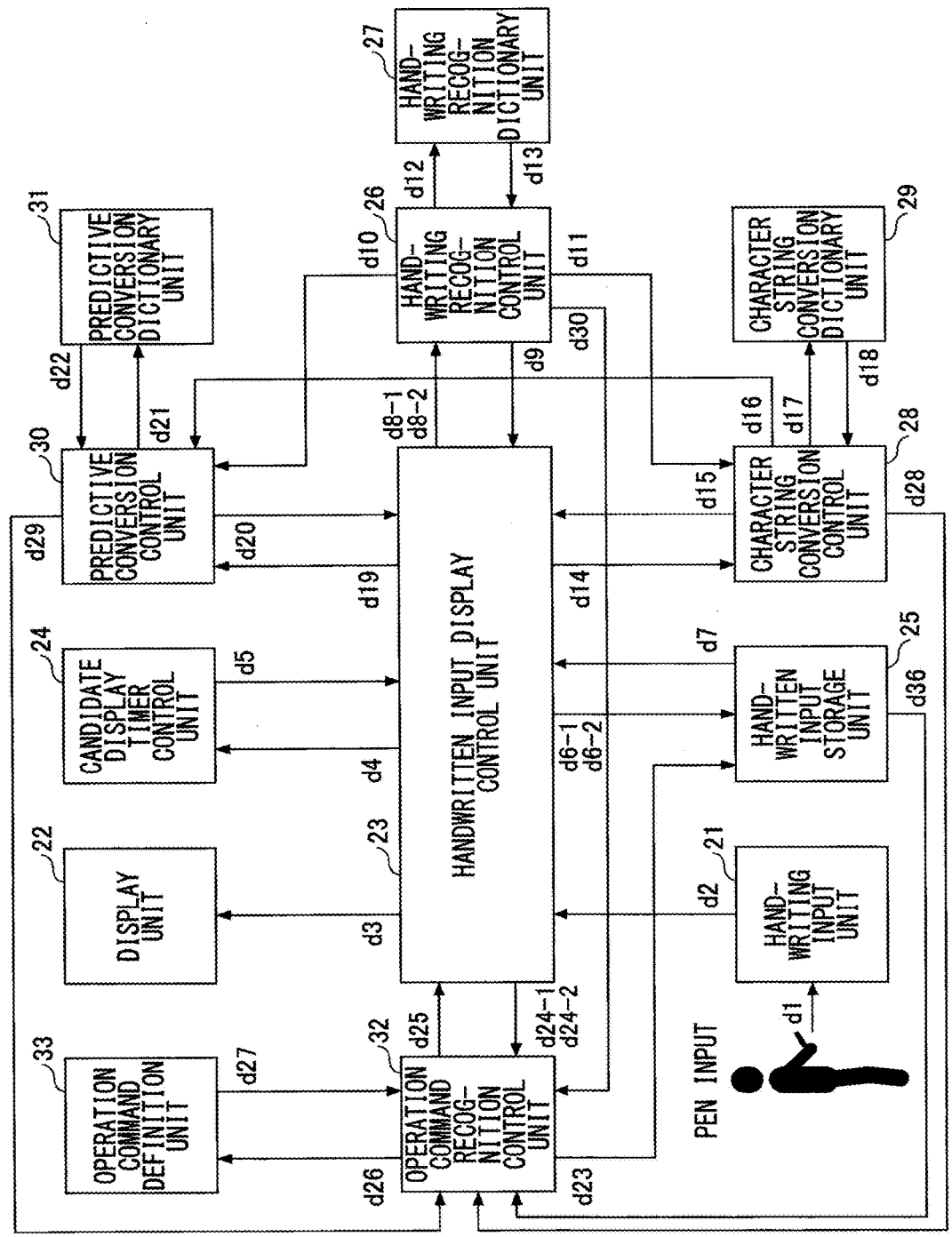
[Fig. 6]

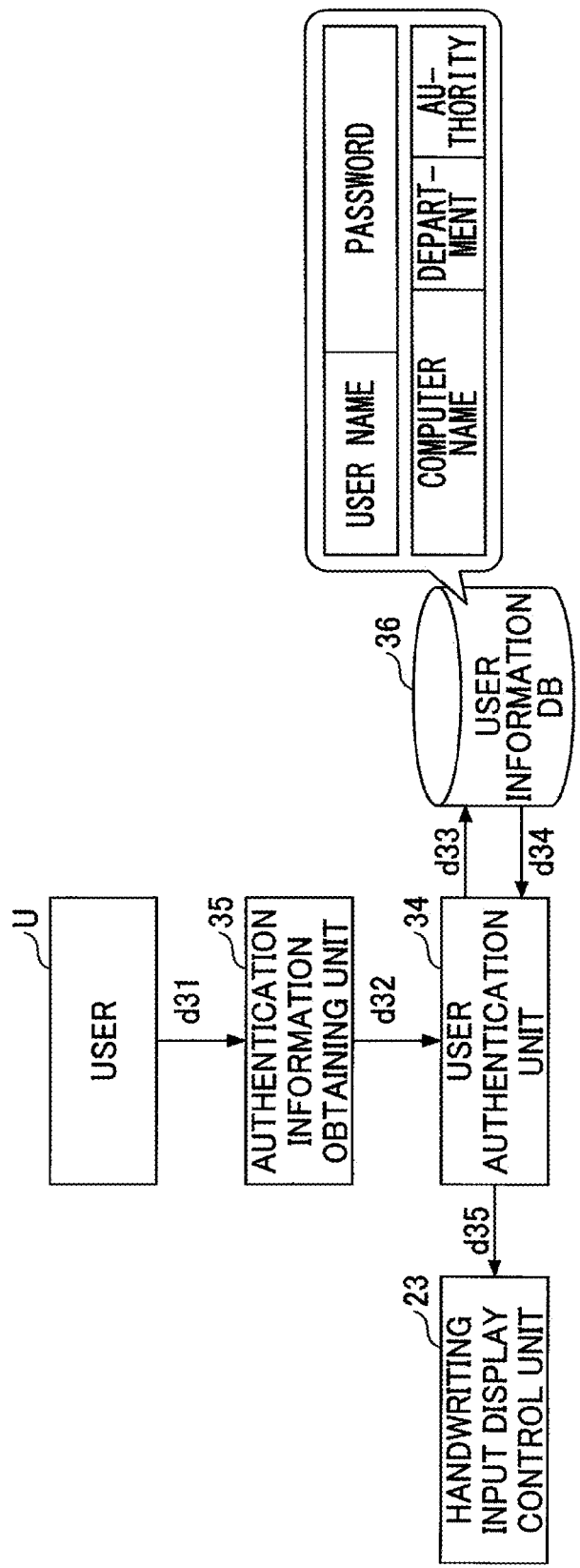

[Fig. 8]

| DEFINED CONTROL ITEM EXAMPLE | DEFINED CONTROL DATA EXAMPLE |
|---|---|
| 401 SELECTABLE CANDIDATE DISPLAY TIMER | TimerValue="500ms" |
| 402 SELECTABLE CANDIDATE DELETE TIMER | TimerValue="5000ms" |
| 403 HANDWRITTEN OBJECT APPROXIMATE RECTANGULAR AREA | Horizontal="50%" Vertical="80%" |
| 404 ESTIMATED WRITING DIRECTION AND CHARACTER SIZE DETERMINATION CONDITIONS | MinDiff="10mm" MinTime="1000ms" DefDir="Horizontal" |
| 405a SMALLER CHARACTER | FontStyle="MING BODY" FontSize="25mm" |
| 405b MEDIUM-SIZE CHARACTER | FontStyle="MING BODY" FontSize="50mm" |
| 405c LARGER CHARACTER | FontStyle="GOTHIC BODY" FontSize="100mm" |
| 406 CONNECTING LINE DETERMINATION CONDITION | MinLenLongSide="100mm" MaxLenShortSide="50mm" MinOverlapRate="80%" |
| 407 ENCLOSING LINE DETERMINATION CONDITION | MinOverLapRate="100%" |

(405a, 405b, 405c grouped as 405)

[Fig. 9]

HANDWRITING RECOGNITION DICTIONARY DATA EXAMPLE

| BEFORE CONVERSION | AFTER CONVERSION | PROBABILITY |
|---|---|---|
| ぎ | 議 | 0.55 |
| ぎ | 技 | 0.45 |
| ぎし | 技士 | 0.55 |
| ぎし | 技師 | 0.45 |
| ぎじ | 疑似 | 0.30 |
| ぎじ | 議事 | 0.25 |
| ぎじ | 擬似 | 0.20 |
| ぎじ | ギジ | 0.15 |

604: rows 1–2
605: rows 3–4
606: rows 5–8

[Fig. 10]

CHARACTER STRING CONVERSION DICTIONARY DATA EXAMPLE

| | BEFORE CONVERSION | AFTER CONVERSION | PROBABILITY |
|---|---|---|---|
| 607 | 議 | 議事録 | 0.95 |
| 608 | 技 | 技量試 | 0.85 |
| 608 | 技士 | 技士会 | 0.65 |
| | 技師 | 技師長 | 0.75 |
| 609 | ぎじ | 議事録 | 0.95 |
| 609 | ぎじ | 技術士 | 0.85 |
| | ぎじ | 技術 | 0.75 |
| 610 | 擬似 | 擬似相関 | 0.55 |
| 610 | 擬似 | 擬似的 | 0.50 |
| | 擬似 | 擬似乱数 | 0.40 |

[Fig. 11]

PREDICTIVE CONVERSION DICTIONARY DATA EXAMPLE

| BEFORE CONVERSION | AFTER CONVERSION | PROBABILITY |
|---|---|---|
| 議事録 | 議事録の送付先 | 0.65 |
| 技量試 | 技量試を決裁 | 0.75 |
| 技士 | 技士会連合会 | 0.95 |
| 技術 | 技師エンジニア | 0.85 |
| 技術 | 技術雑誌社 | 0.65 |
| 擬似 | 擬似体験 | 0.45 |
| 擬似 | 擬似逆行列 | 0.35 |

611 { rows 1–2
612 { rows 3–4
613 ― row 5
614 { rows 6–7

[Fig. 12A]

| OPERATION COMMAND DEFINITION DATA EXAMPLE (FOR A CASE WHERE THERE IS NO SELECTED OBJECT) |
|---|
| 701　Name="議事録テンプレートを読み込む" String="テンプレート" Command="ReadFile https://%username%:%password%@server.com/template/minutes.pdf" |
| 702　Name="議事録フォルダーに保存する" String="保存" Command="WriteFile https://%username%:%password%@server.com/minutes/%machinename%_%yyyy-mm-dd%.pdf" |
| 703　Name="印刷する" String="印刷" Command="PrintFile https://%username%:%password%@server.com/print/%machinename%-"%yyyy-mm-dd%.pdf" |

[Fig. 12B]

| SYSTEM DEFINITION DATA EXAMPLE |
|---|
| username="taro.tokkyo" |
| password="x2PDHTyS" |
| machinename="My-Machine" |

704 — username="taro.tokkyo"
705 — password="x2PDHTyS"
706 — machinename="My-Machine"

[Fig. 13]

| OPERATION COMMAND DEFINITION DATA EXAMPLE (FOR A CASE WHERE THERE IS SELECTED OBJECT(S)) |
|---|
| Name="DELETE" Group="Edit" Command="Delete" |
| Name="MOVE" Group="Edit" Command="Move" |
| Name="ROTATE" Group="Edit" Command="Rotate" |
| Name="SELECT" Group="Edit" Command="Select" |
| Name="MAKE THICKER" Group="Decorate" Command="Thick" |
| Name="MAKE THINNER" Group="Decorate" Command="Thin" |
| Name="MAKE LARGER" Group="Decorate" Command="Large" |
| Name="MAKE SMALLER" Group="Decorate" Command="Small" |
| Name="DRAW UNDERLINE" Group="Decorate" Command="Underline" |

707 (rows 1–4), 708 (rows 5–9)

[Fig. 14]
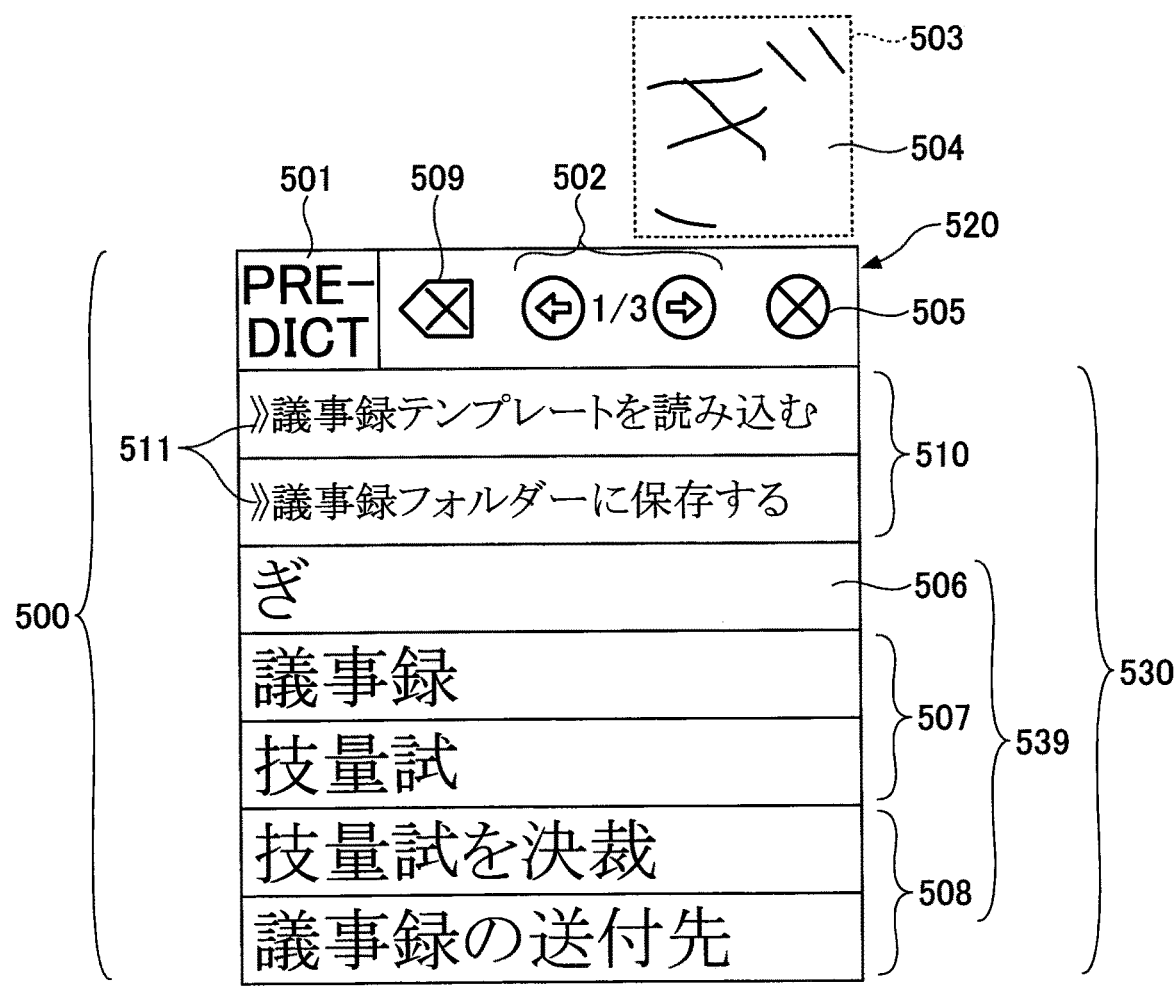

[Fig. 15A]
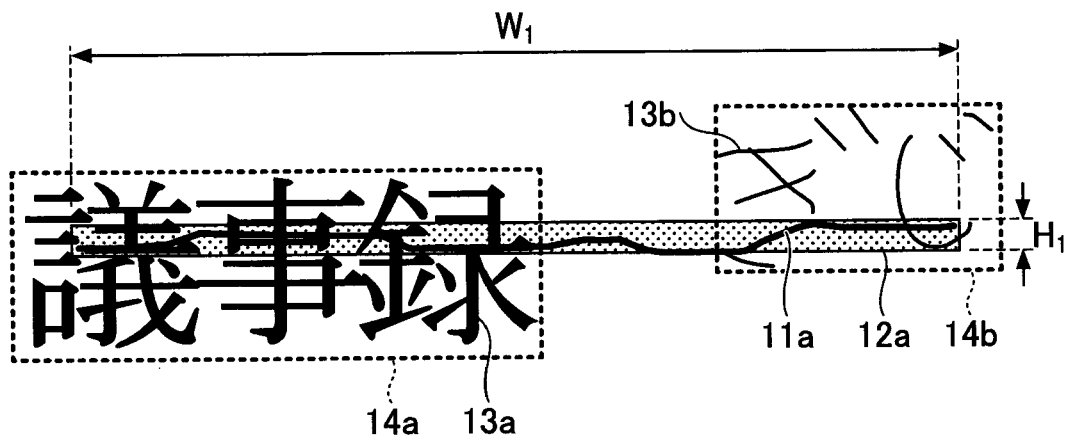
[Fig. 15B]
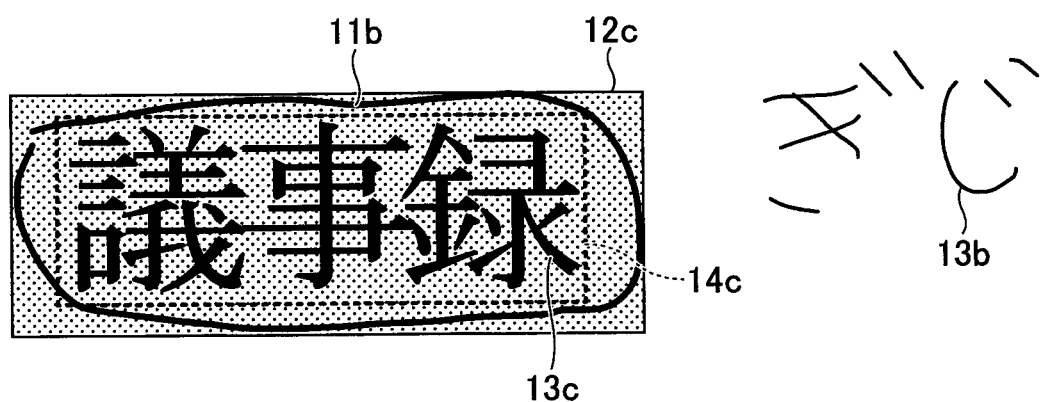

[Fig. 15C]
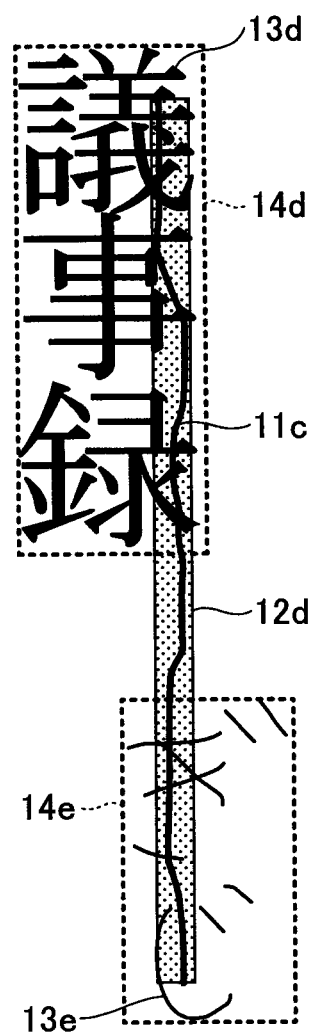

[Fig. 15D]
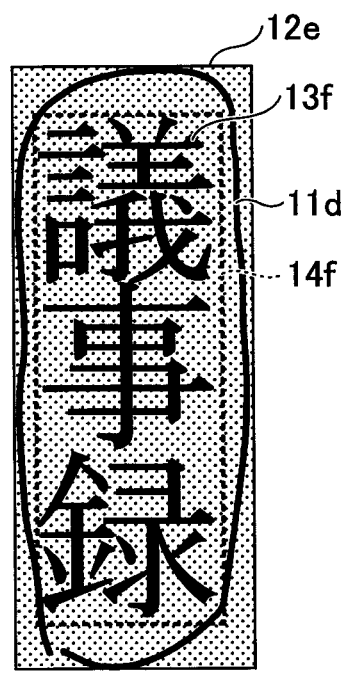

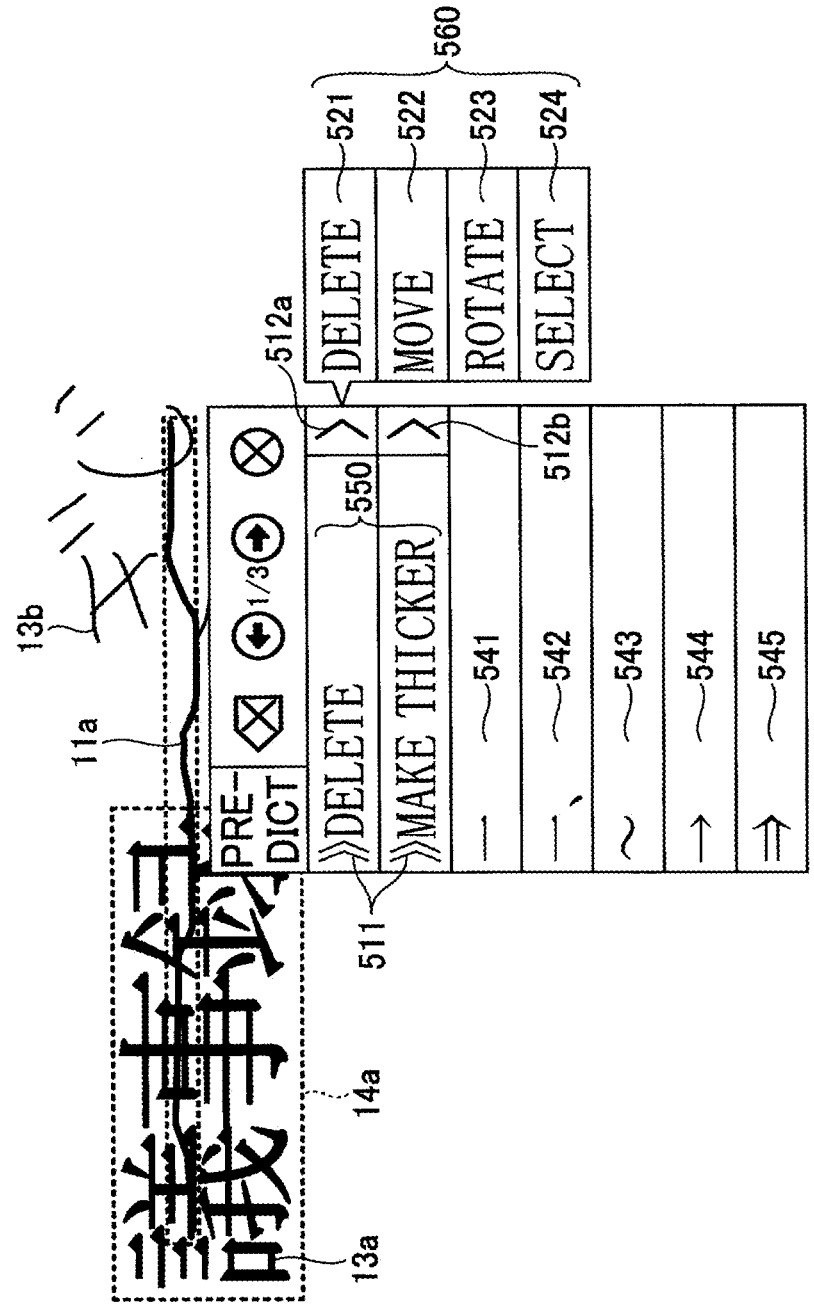

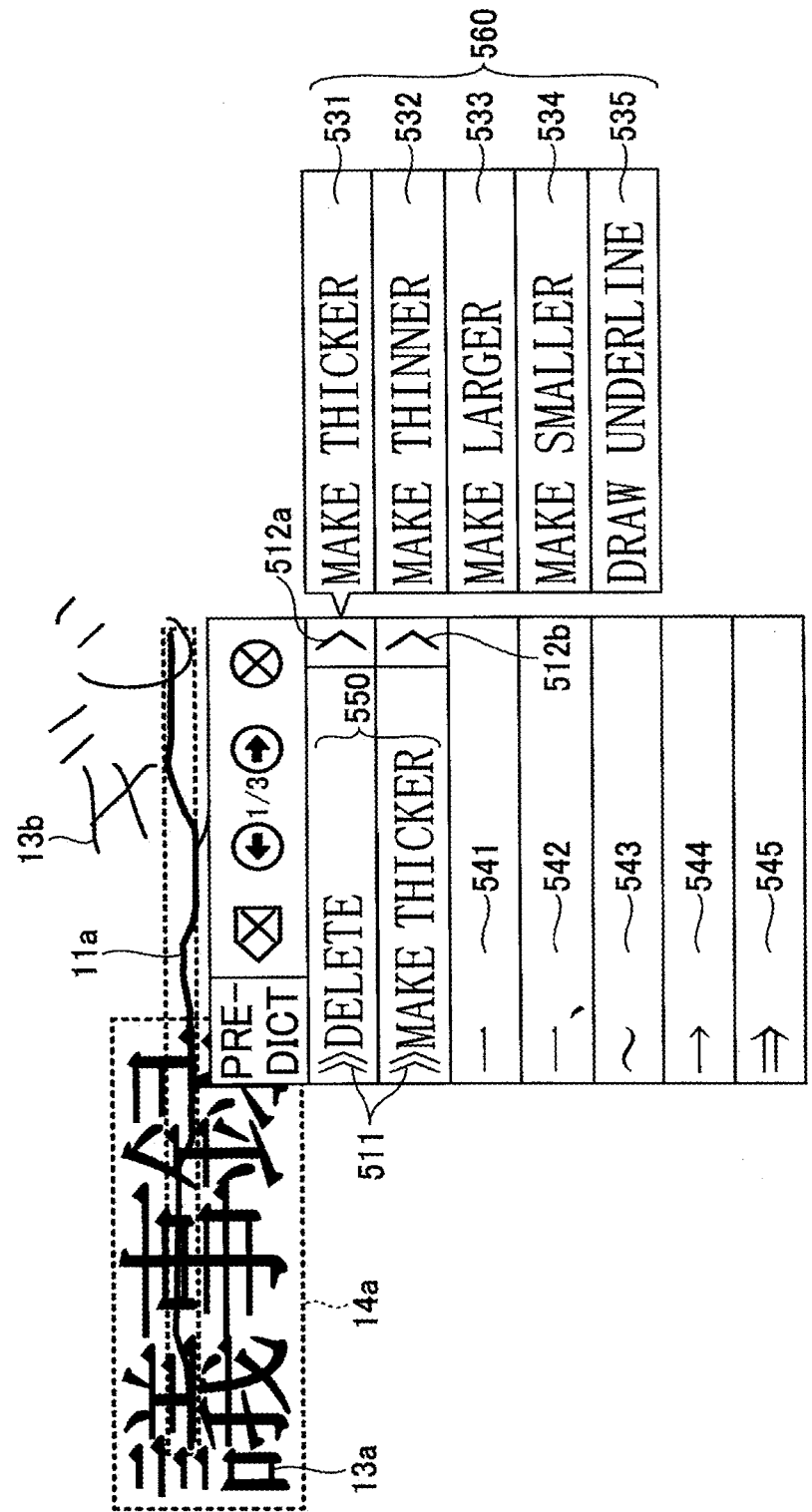

[Fig. 17A]
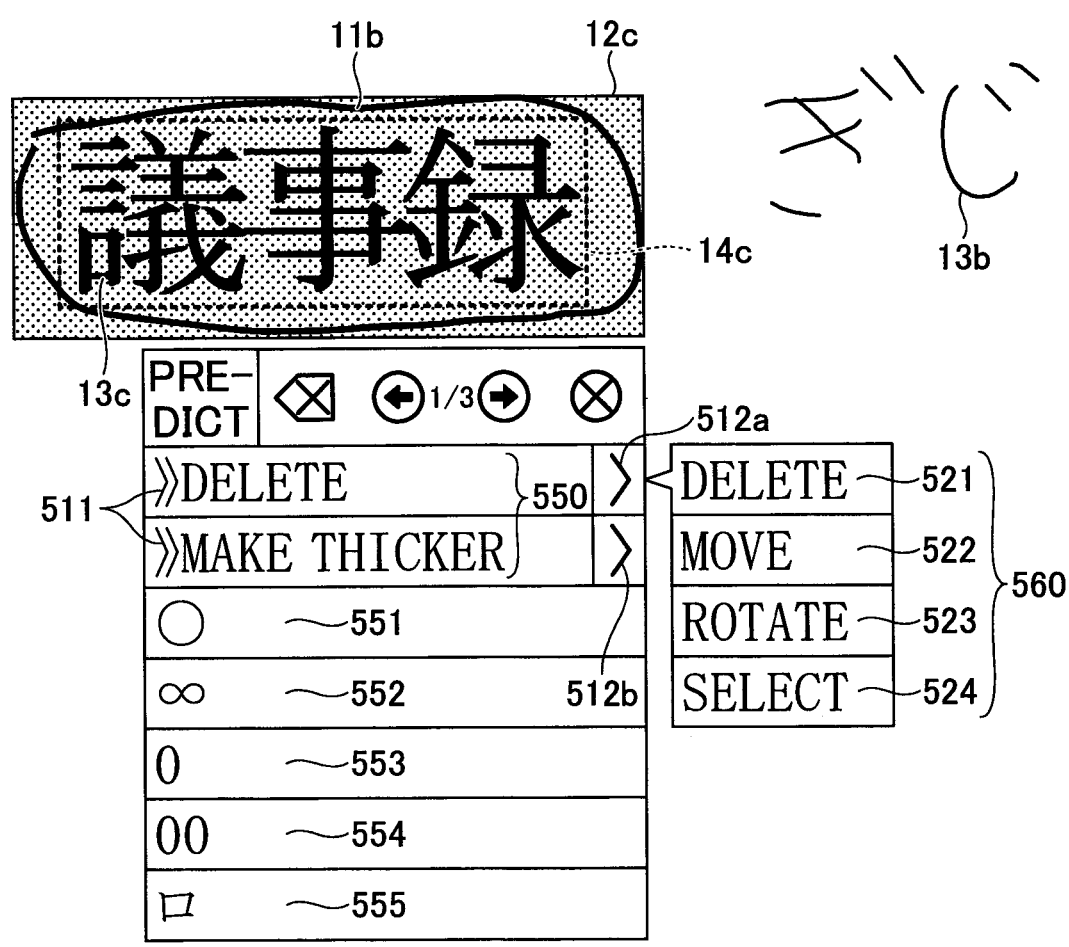

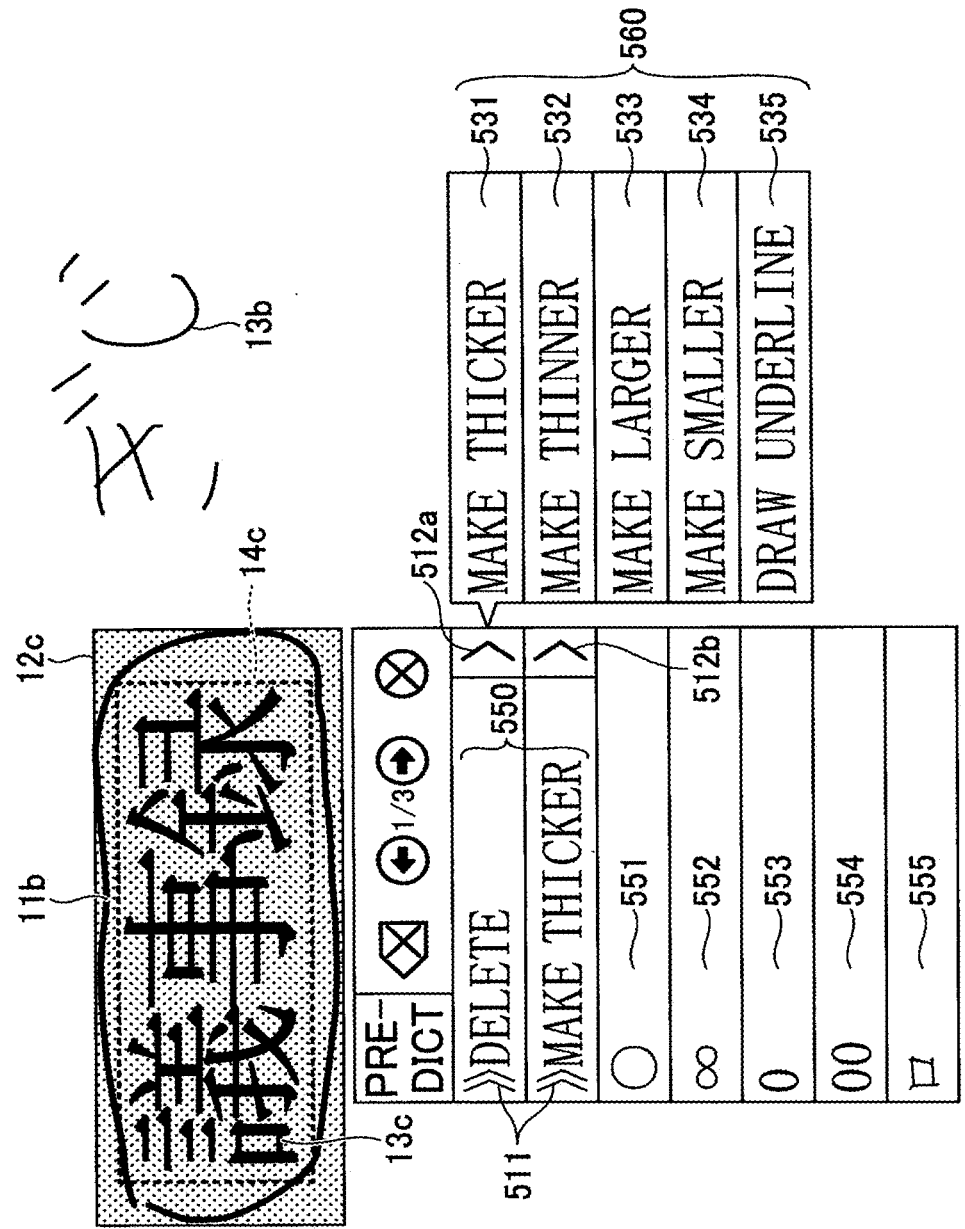
[Fig. 17B]

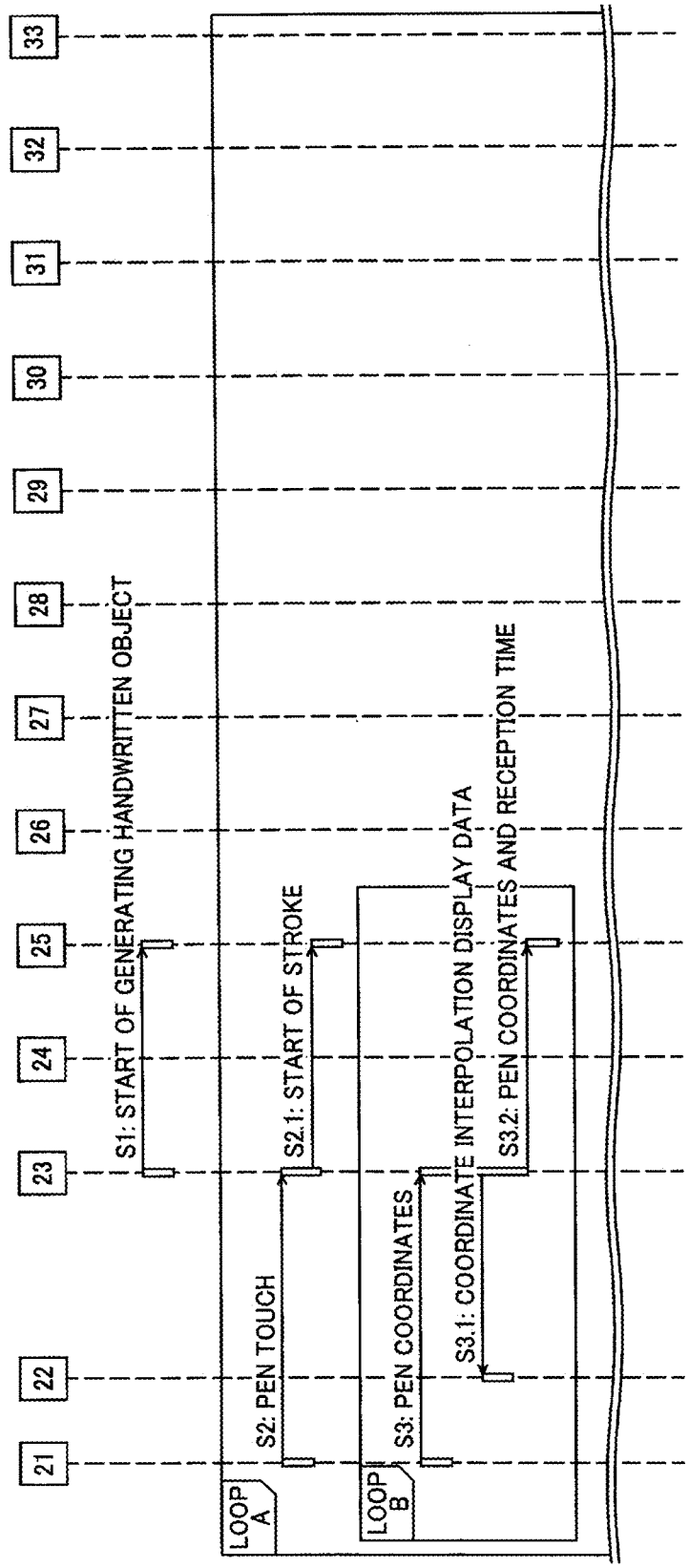

[Fig. 19]
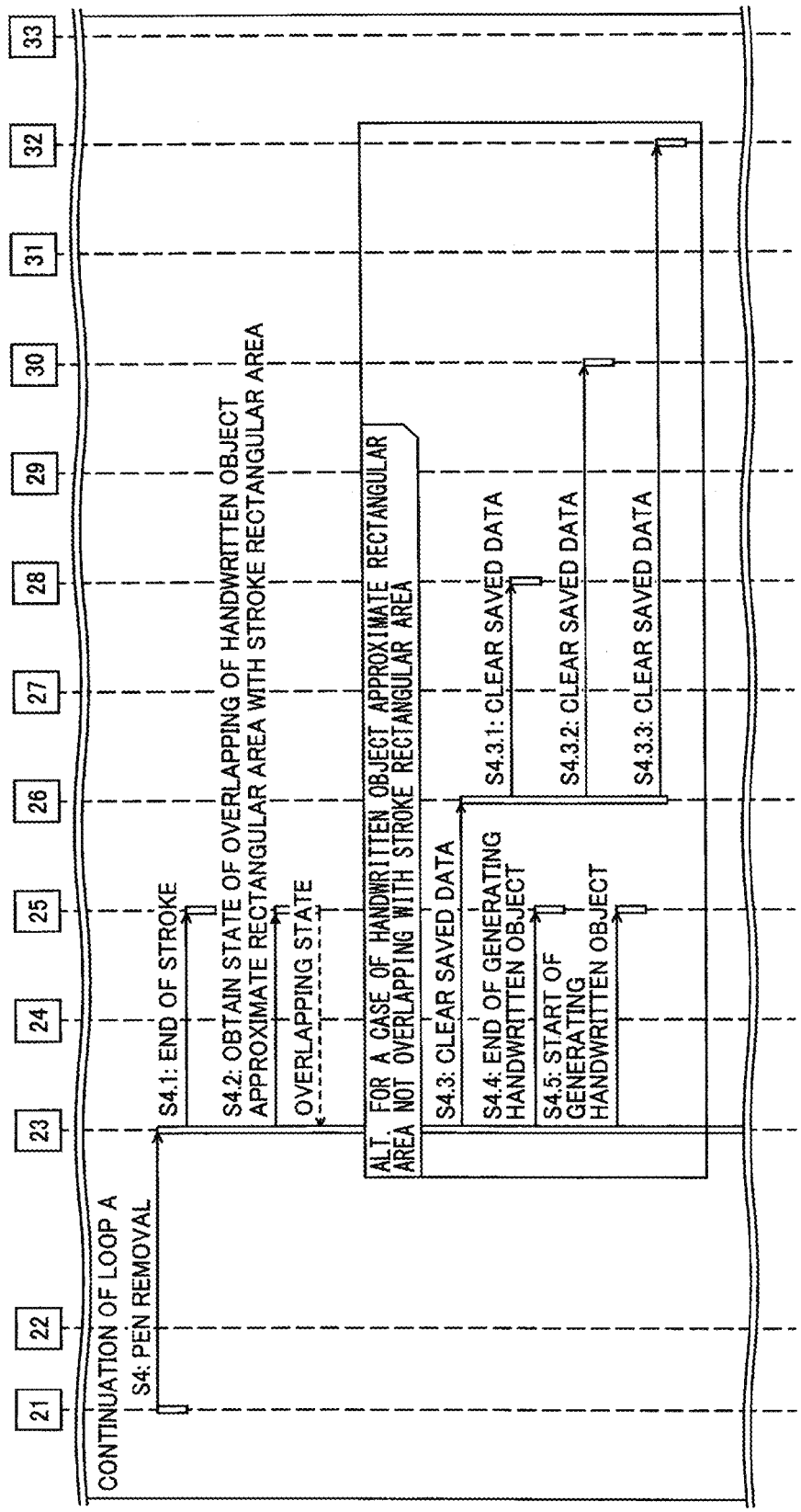

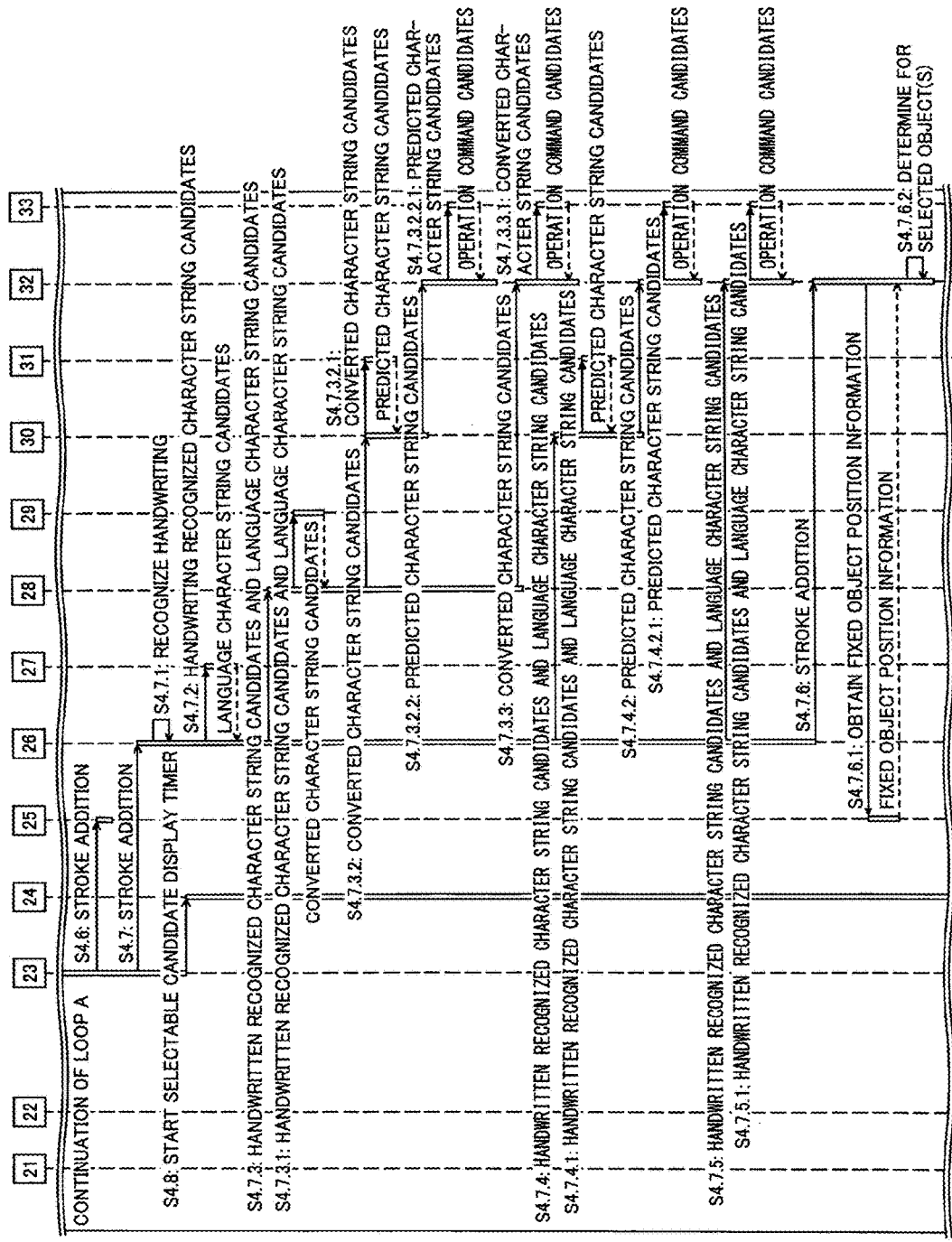
[Fig. 20]

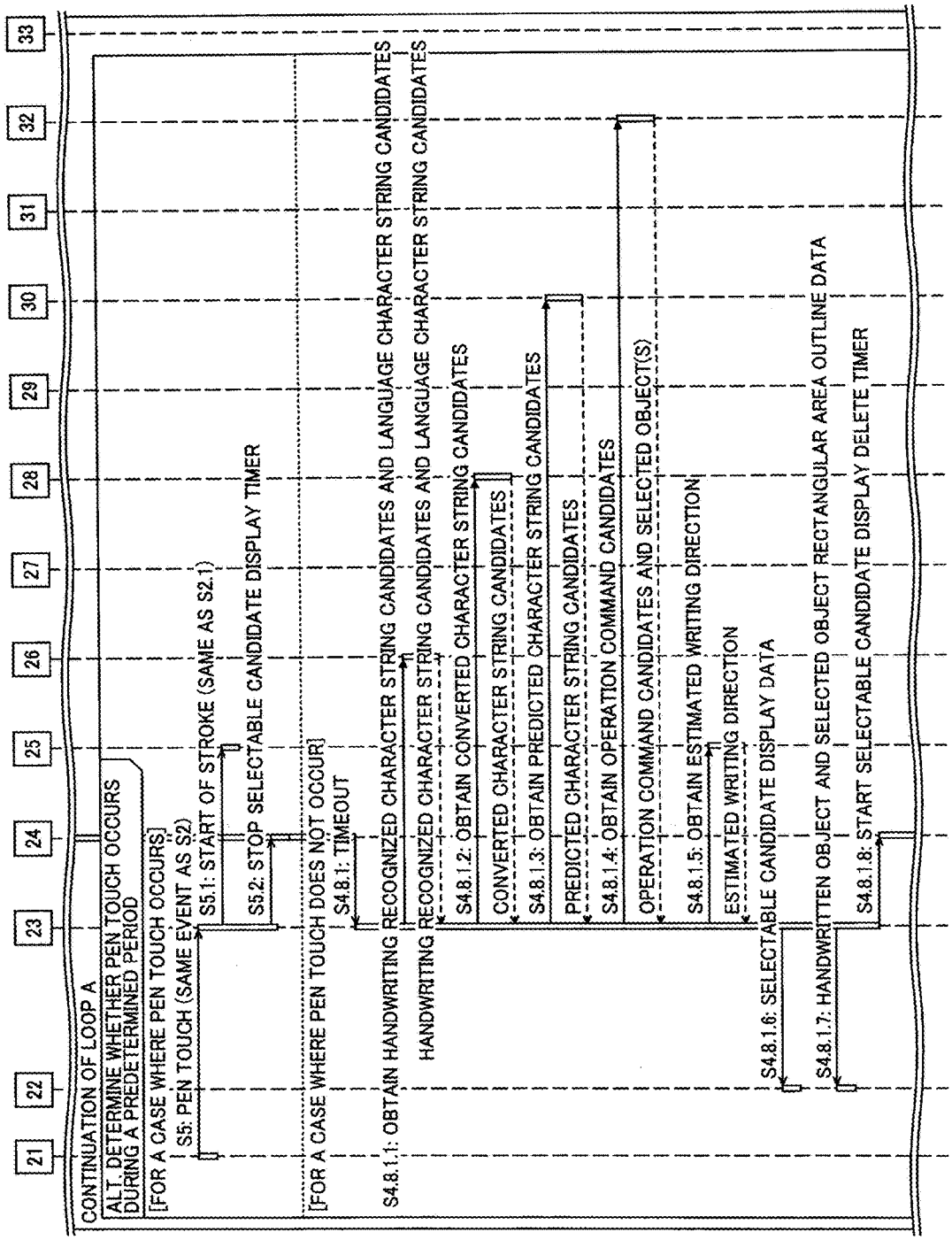
[Fig. 21]

[Fig. 22]
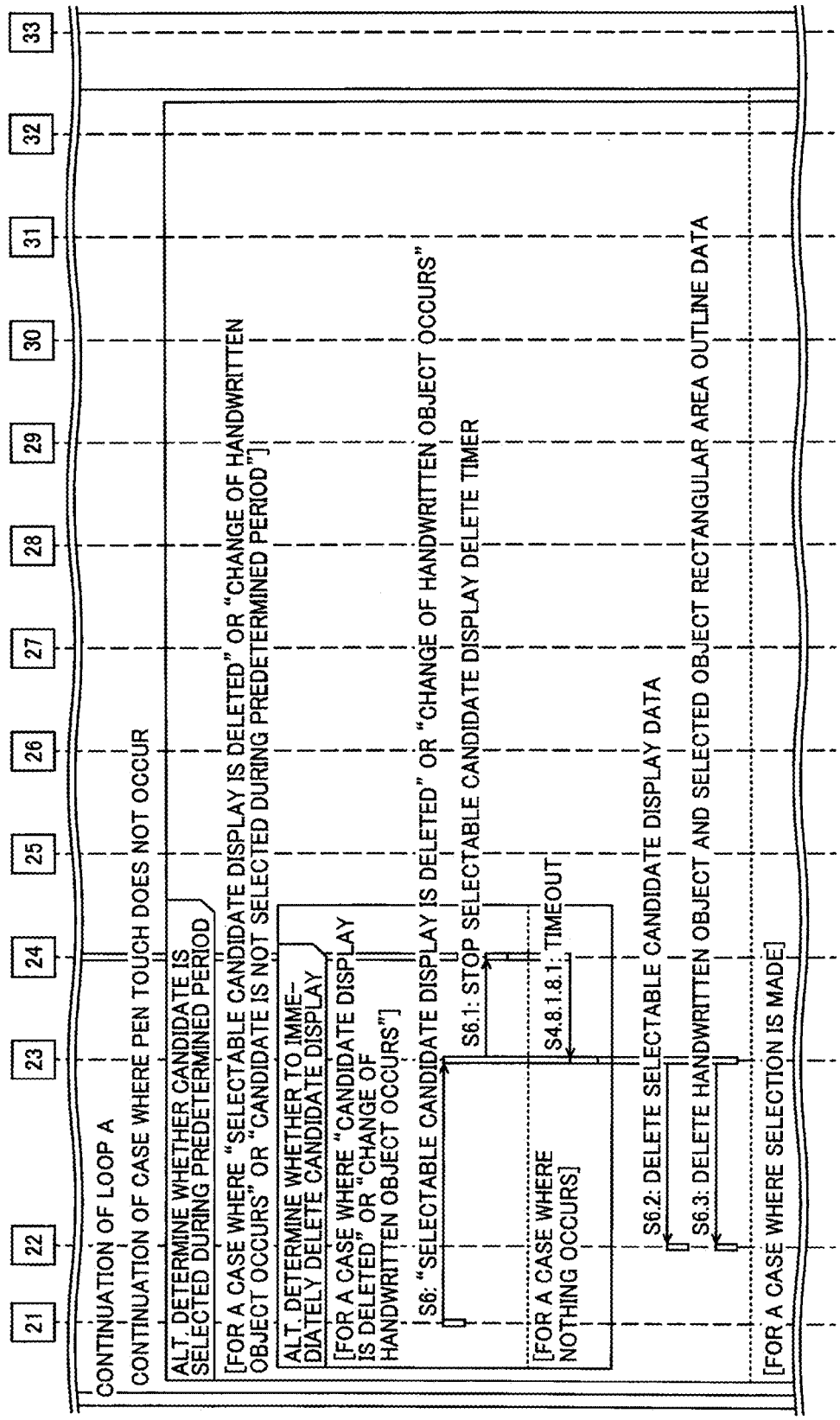

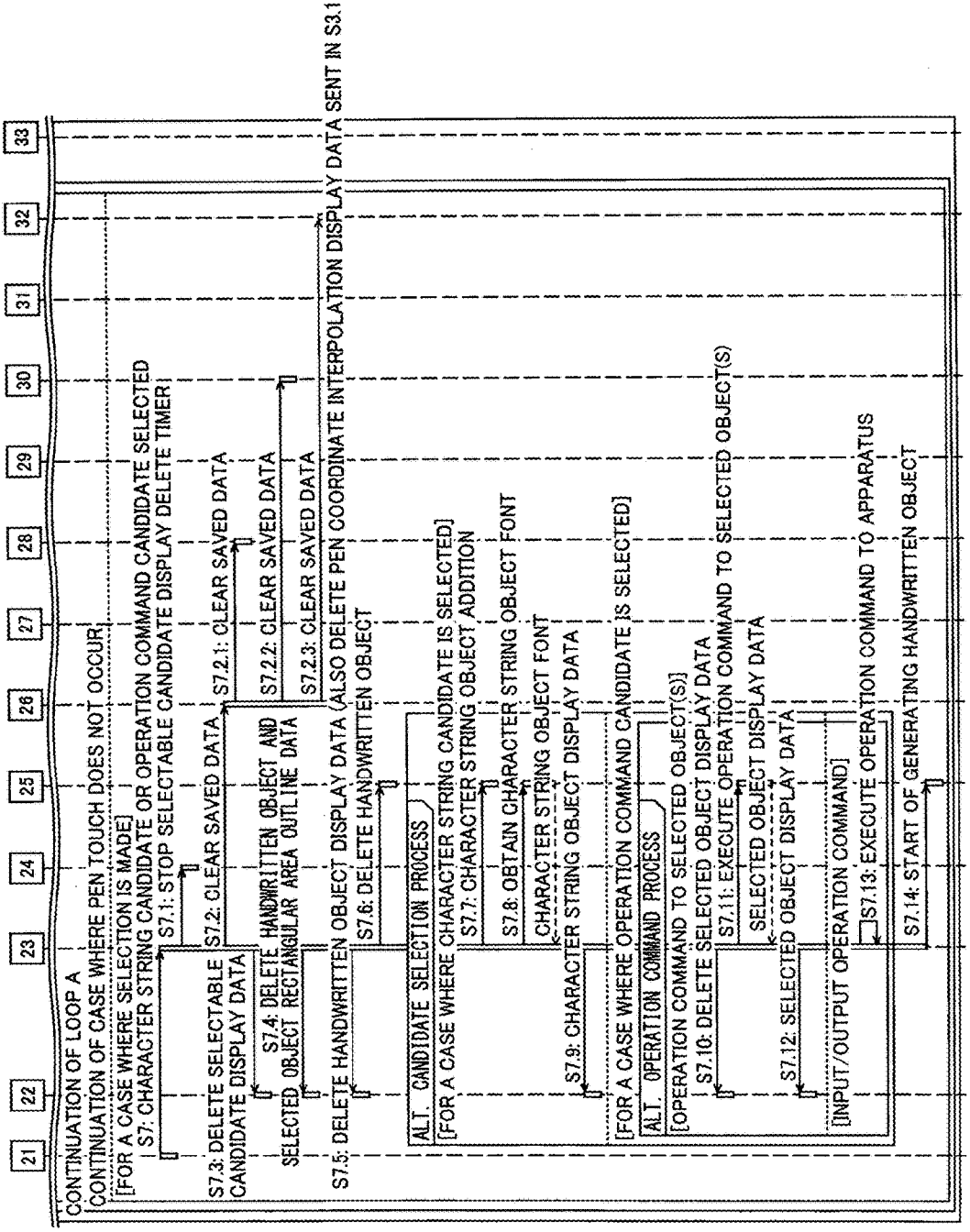
[Fig. 23]

[Fig. 24]
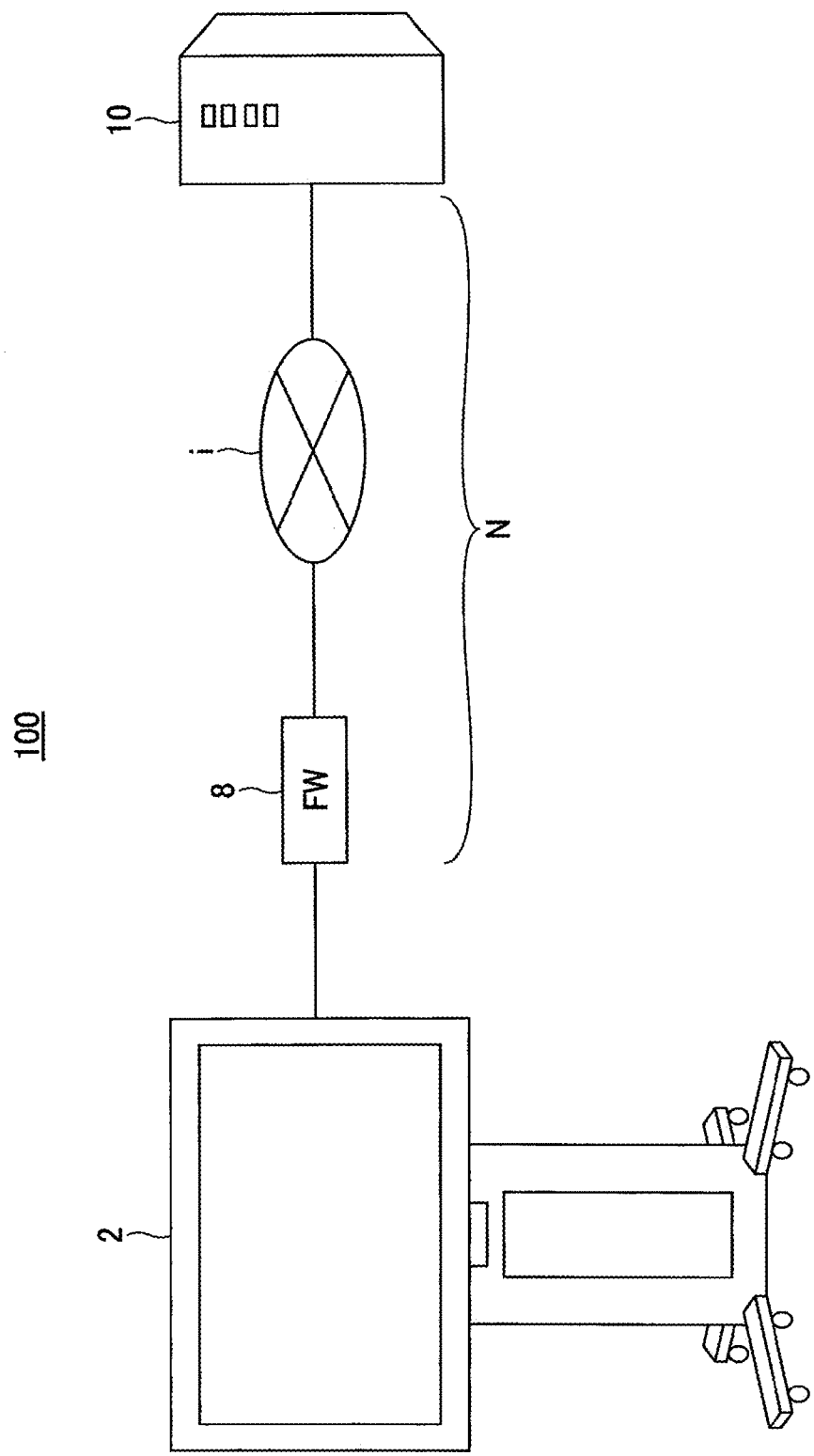

[Fig. 25]
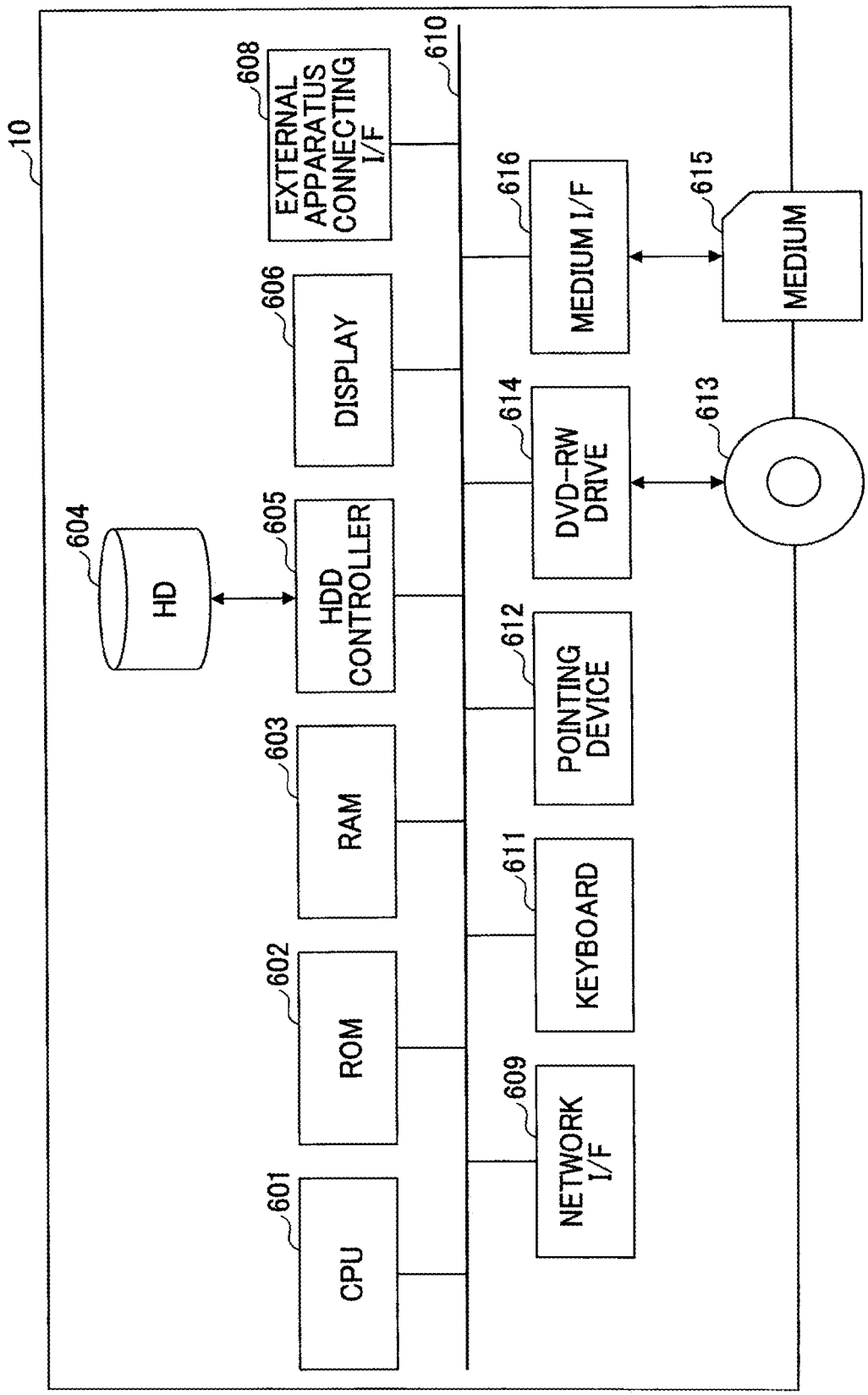

[Fig. 26]
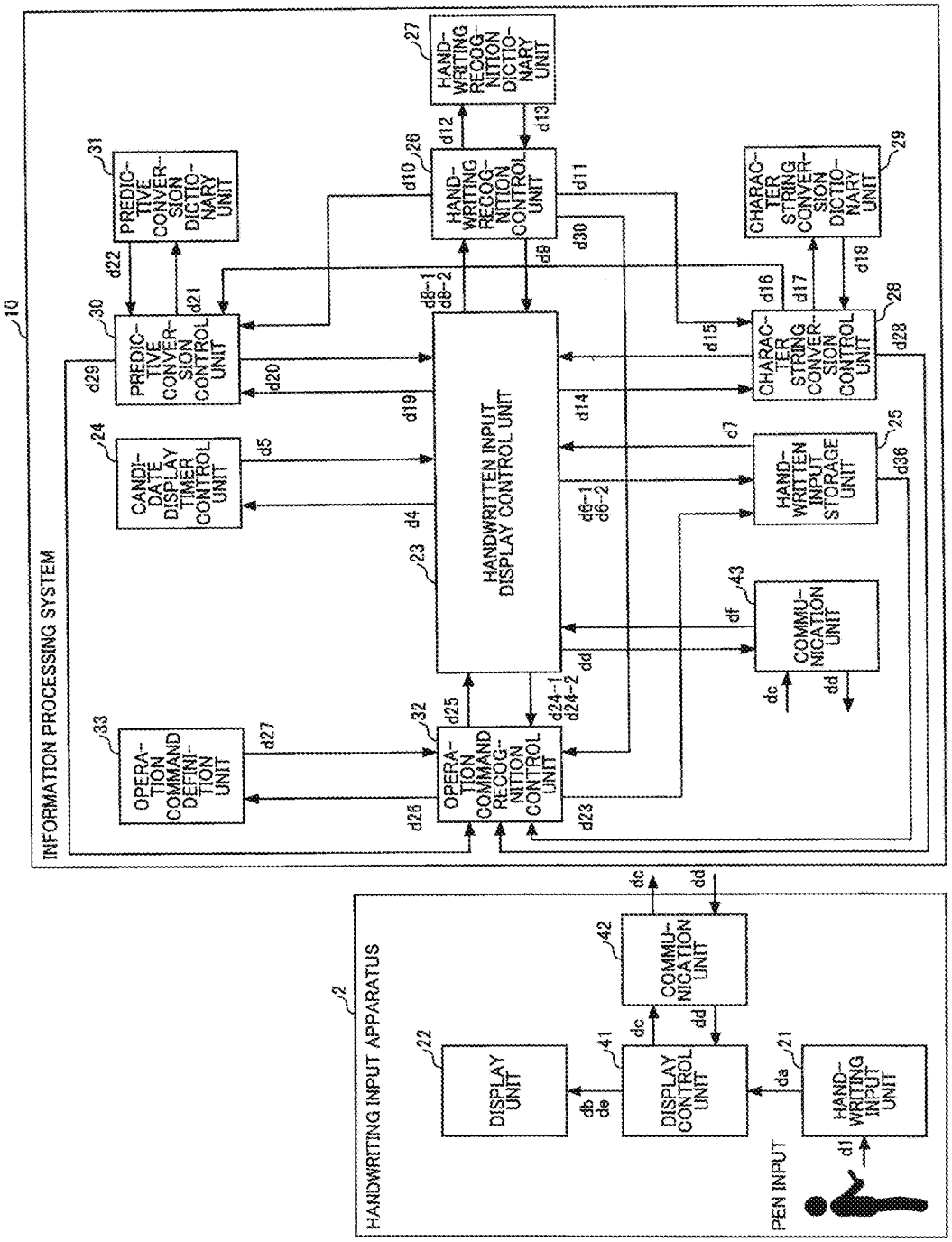

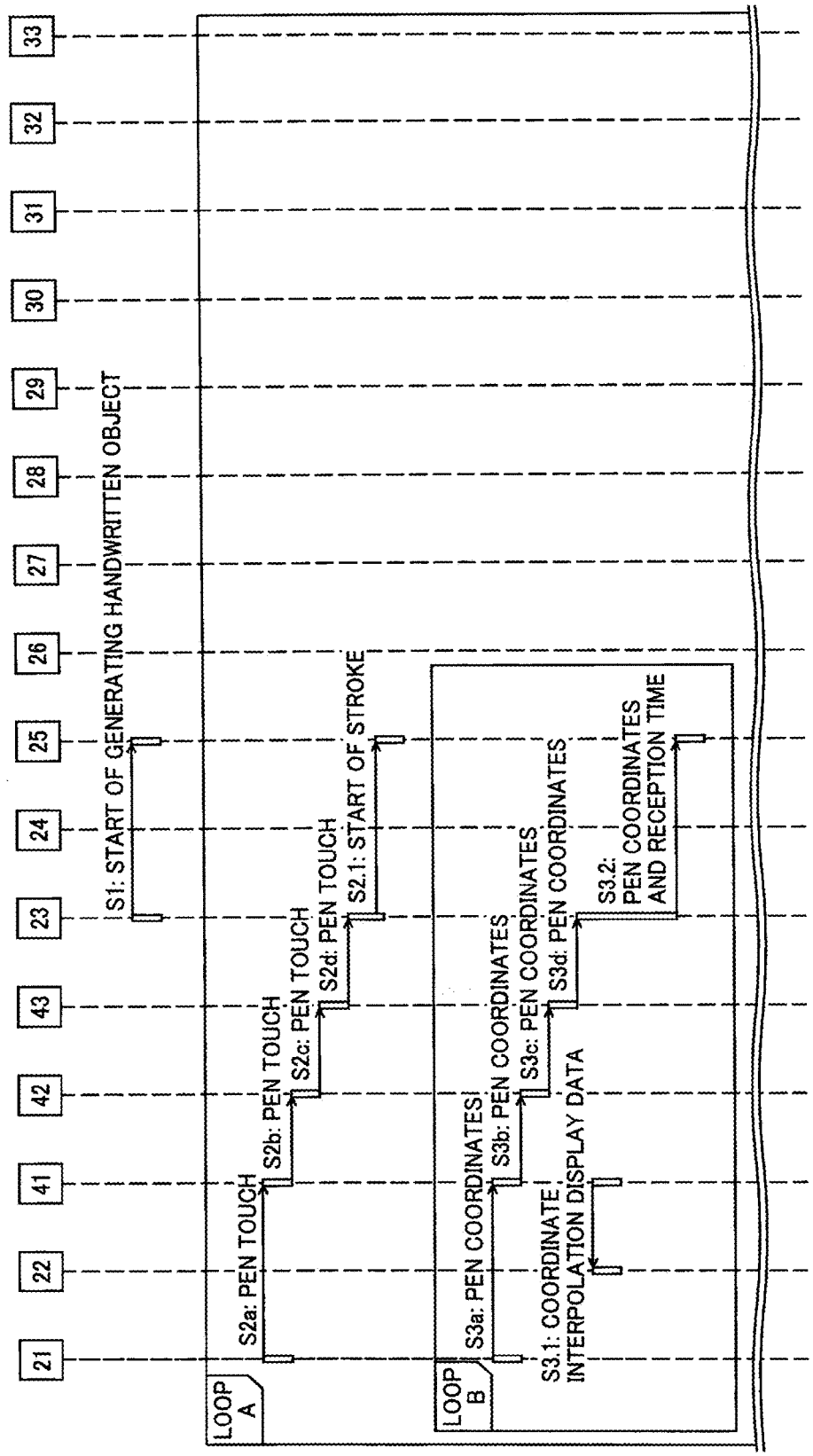
[Fig. 27]

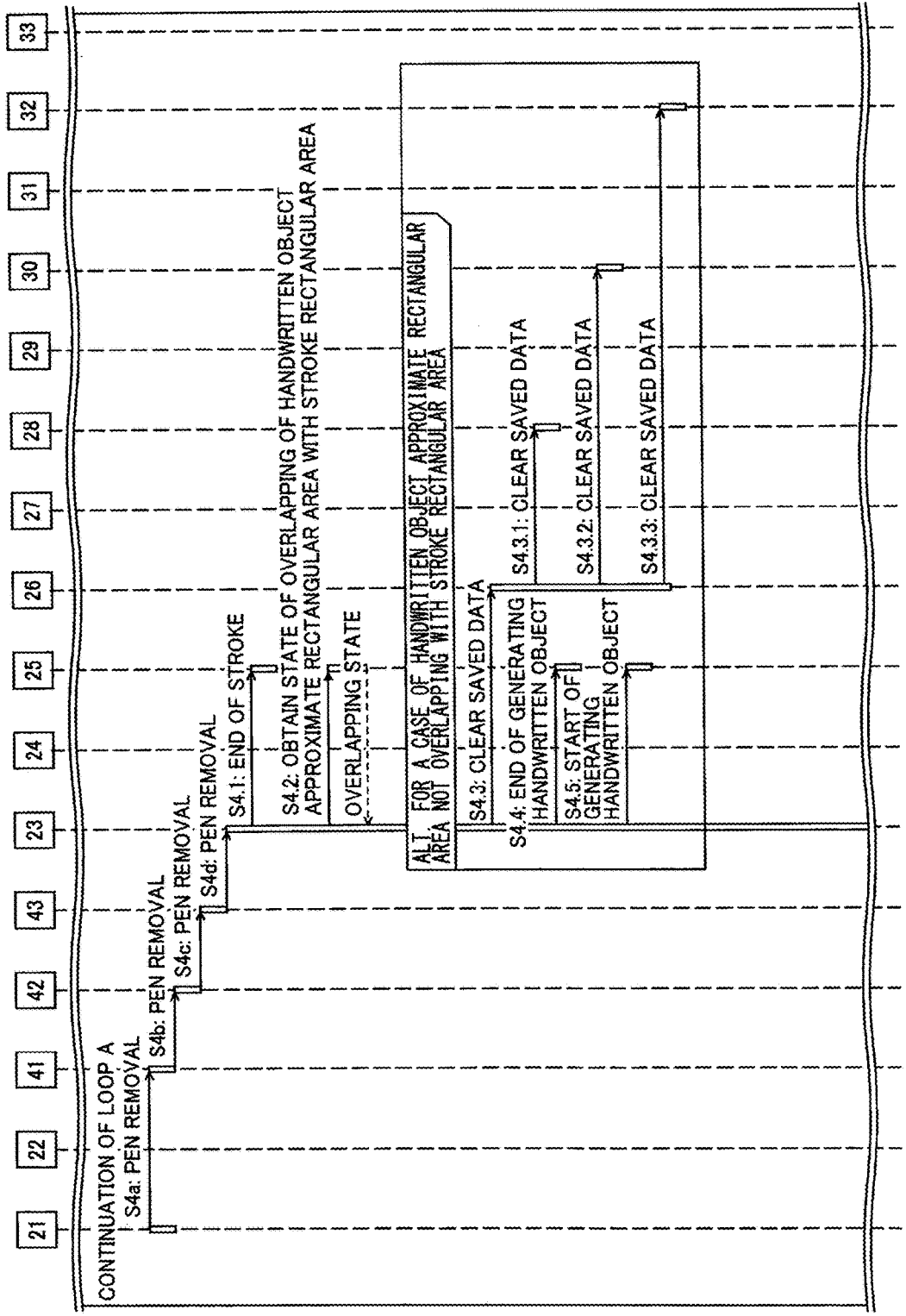

[Fig. 29]
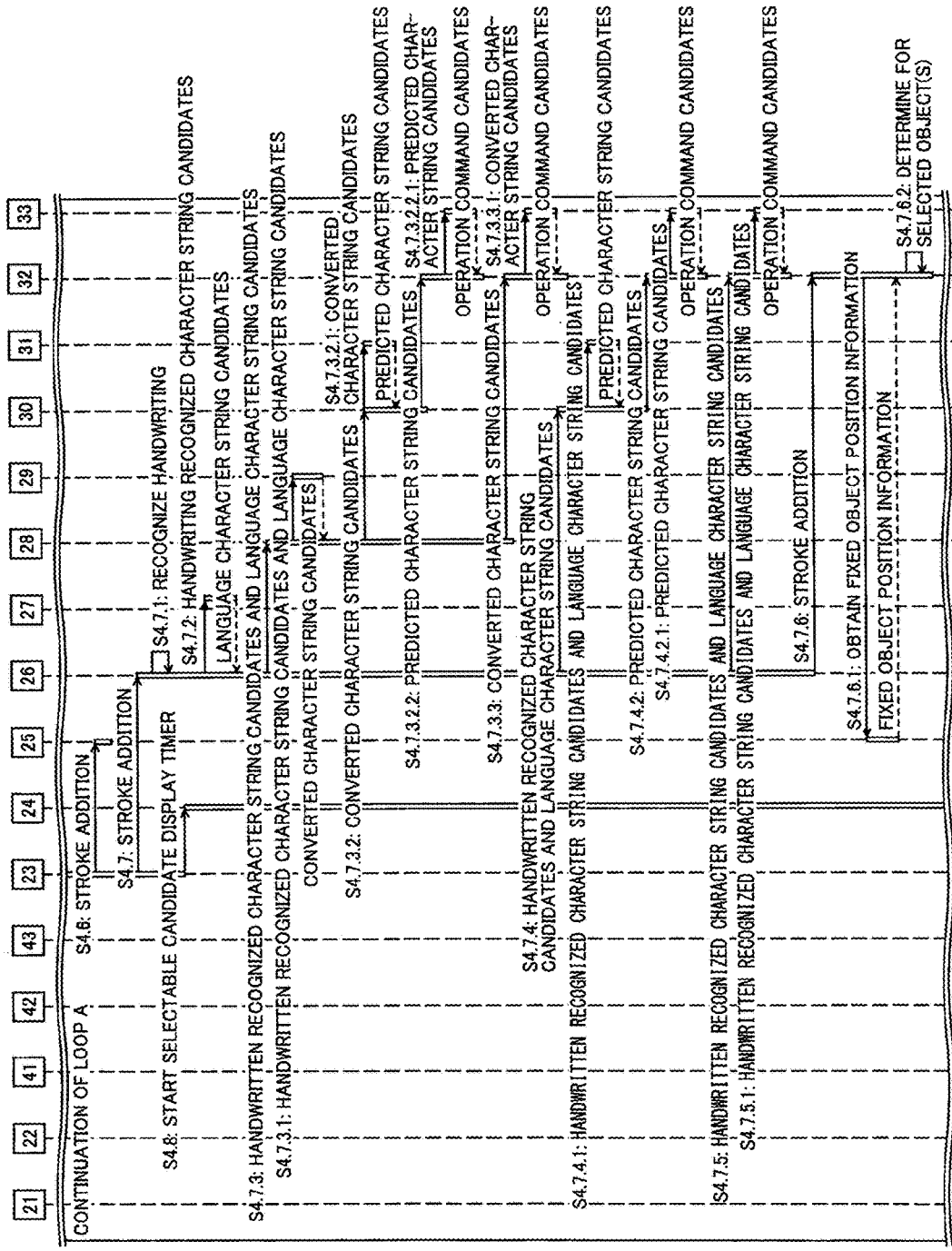

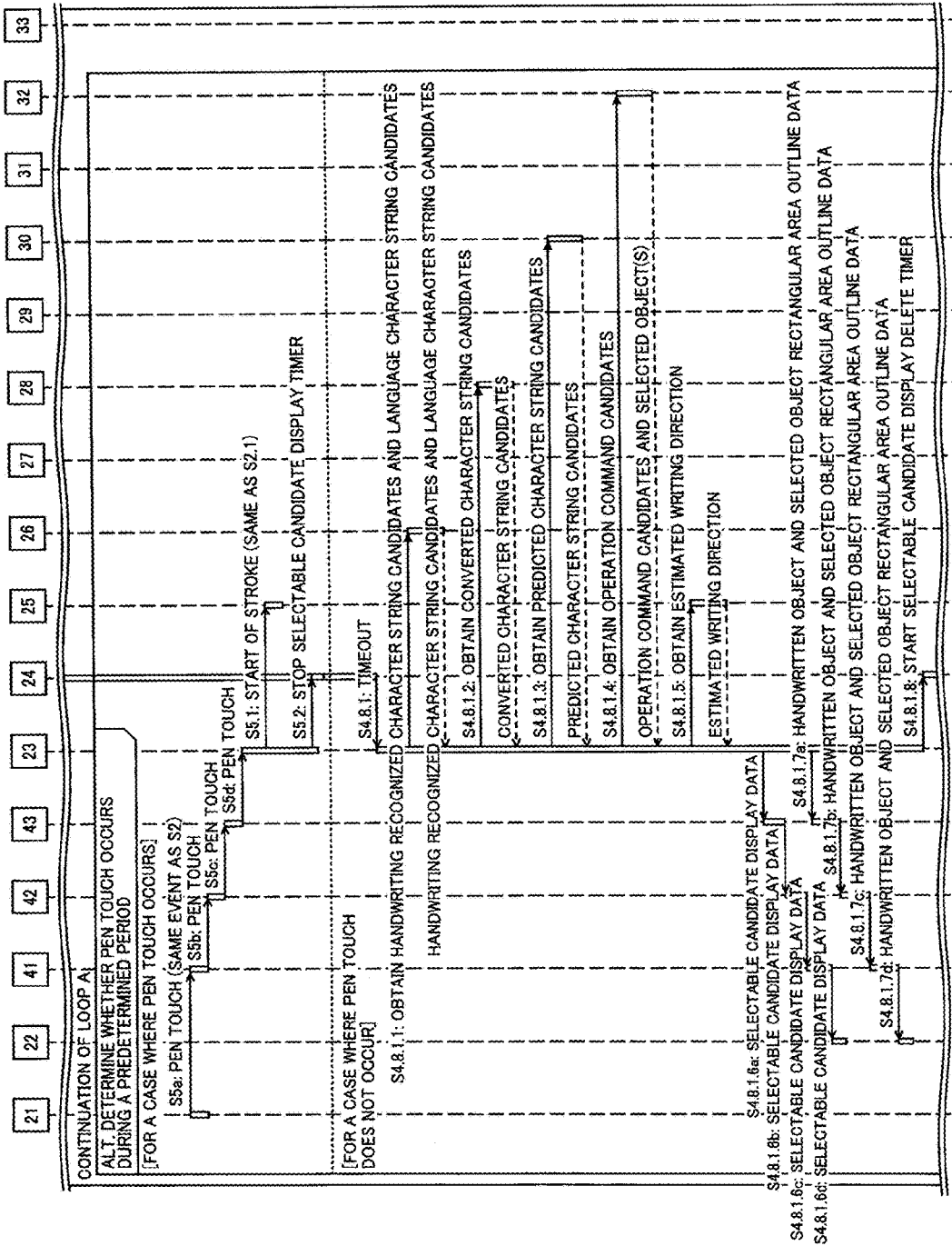
[Fig. 30]

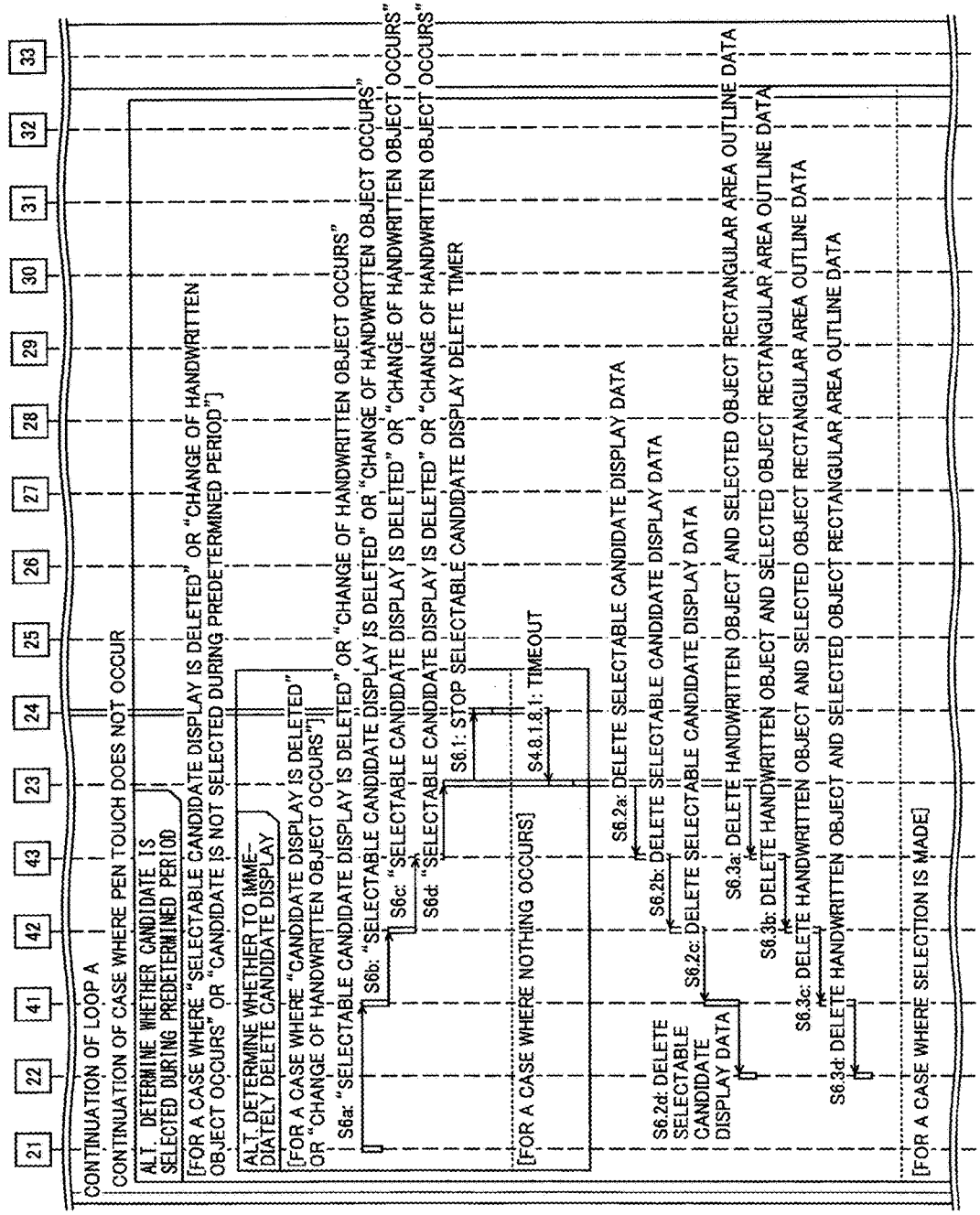
[Fig. 31]

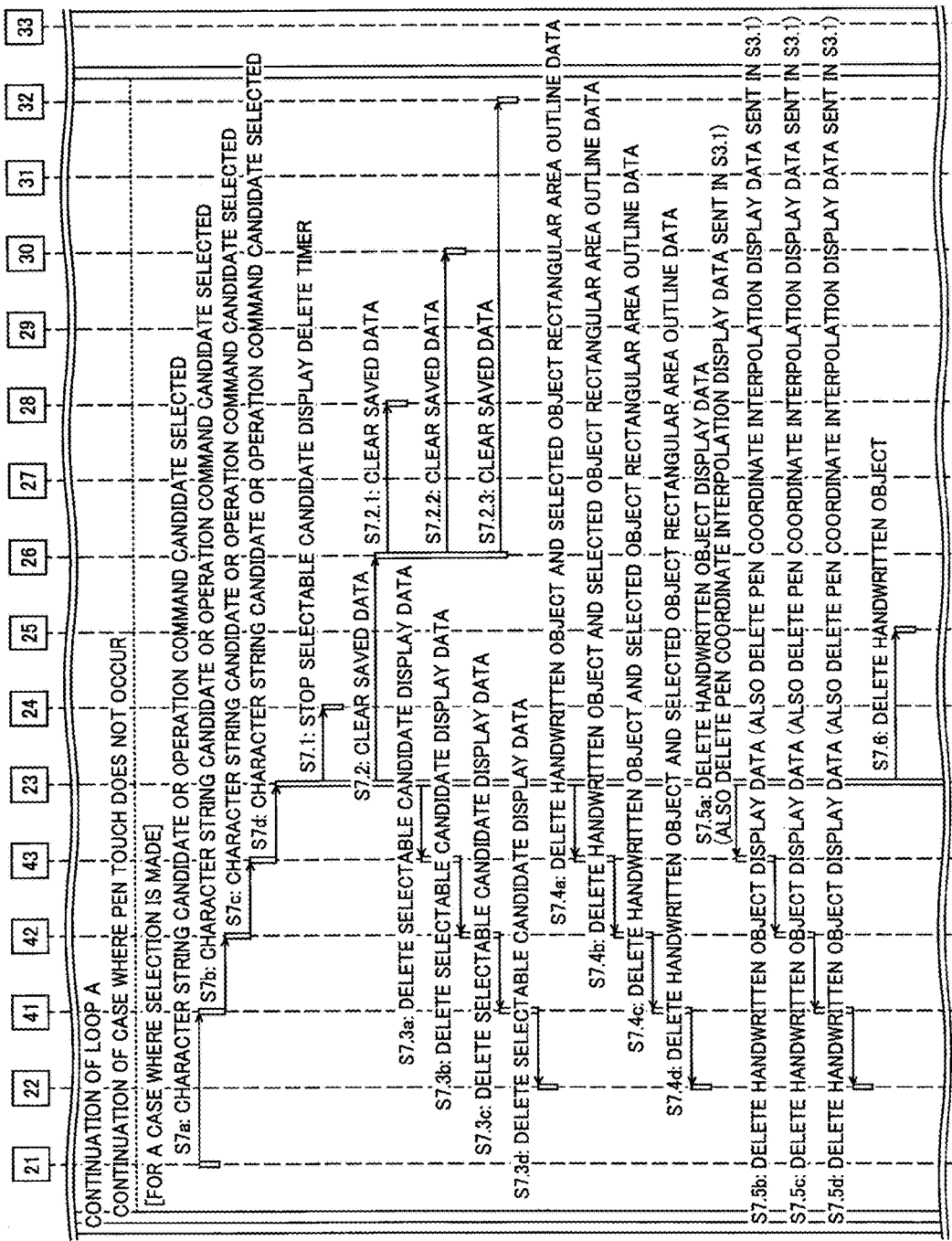
[Fig. 32]

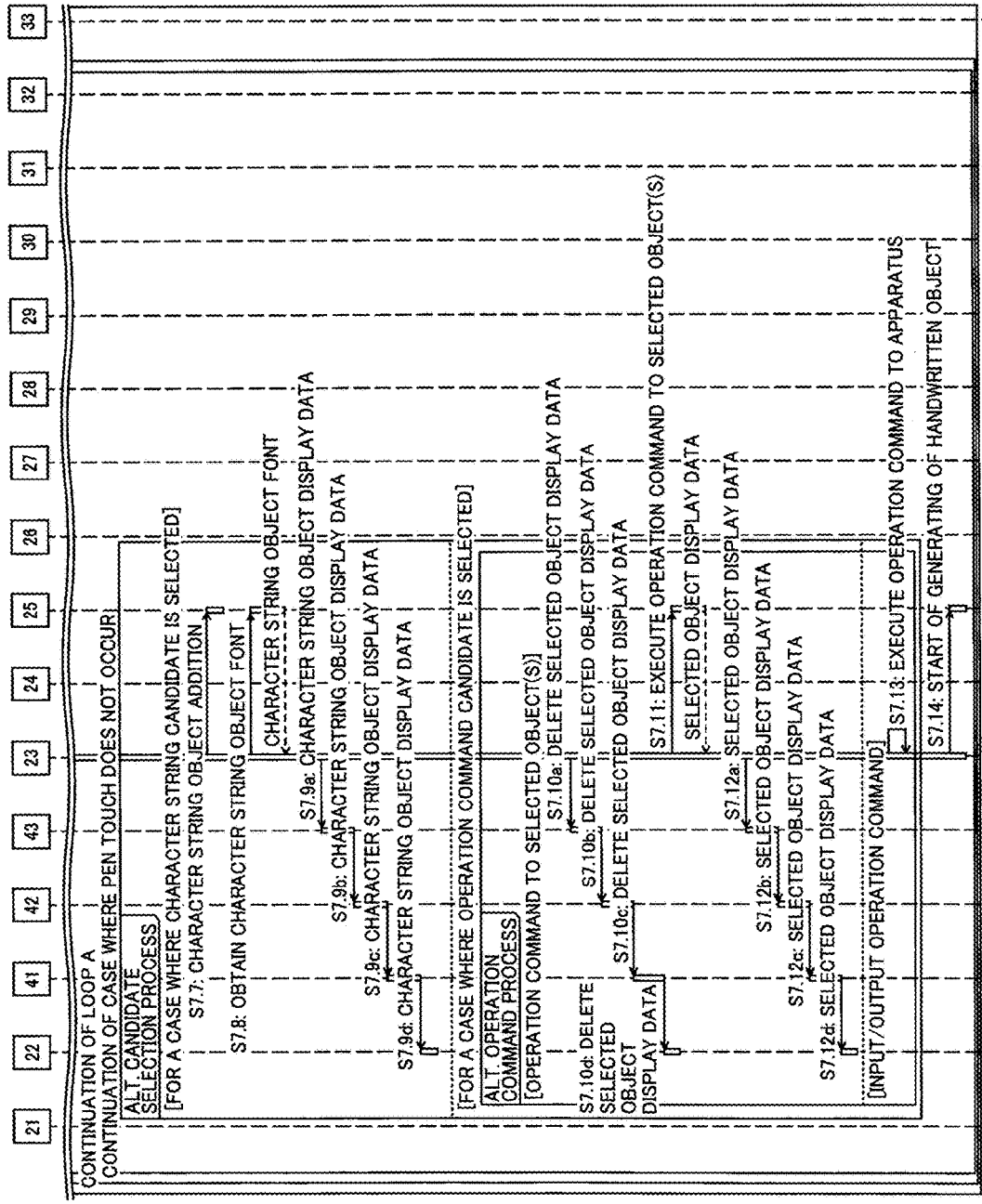
[Fig. 33]

[Fig. 34]
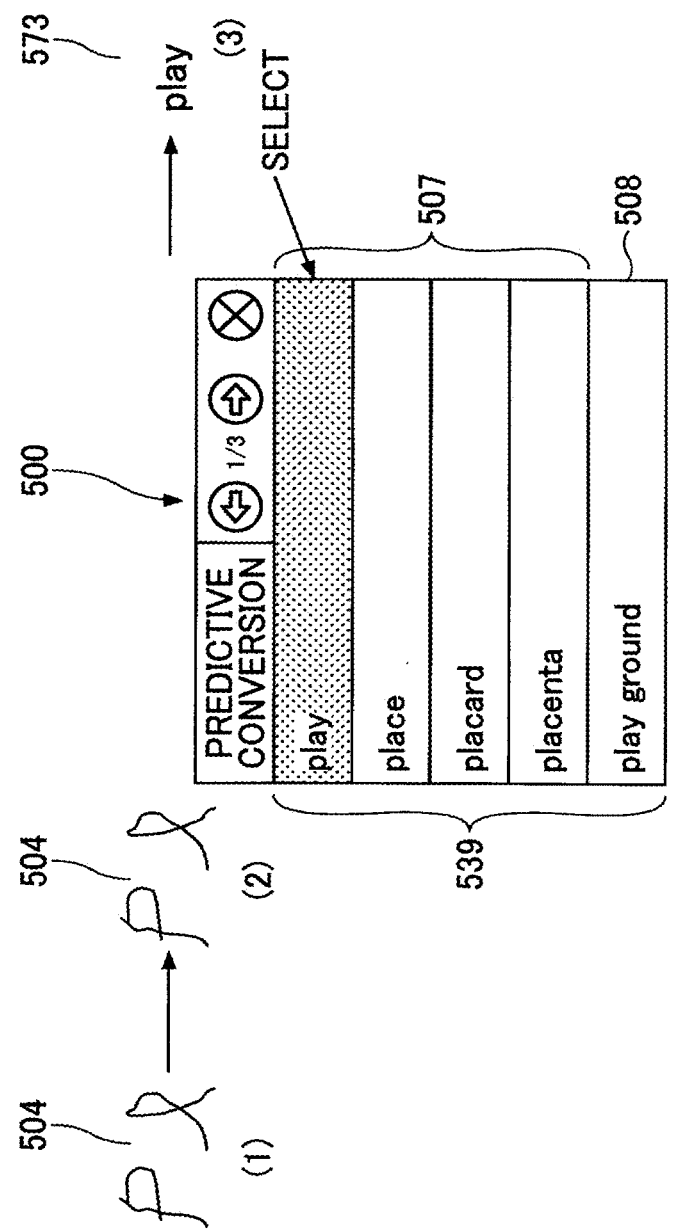

INPUT APPARATUS, INPUT METHOD, PROGRAM, AND INPUT SYSTEM

TECHNICAL FIELD

The present invention relates to an input apparatus, an input method, a program, and an input system.

BACKGROUND ART

In a common computer-controlled whiteboard apparatus or an application capable of receiving a handwriting input (hereinafter referred to as an input apparatus), an input device is limited to a pen or a finger. For this reason, operation menus are provided for the user to use, in a switching manner, a pen function menu to change the colors of characters and an editing function menu to delete characters and so forth. Normally, color, thickness, and so forth can be selected with the use of the pen function menu; deleting, moving, size changing, rotating, cutting, copying, pasting, and so forth can be selected with the use of the editing function menu (for example, see Japanese Laid-Open Patent Application No. 2018-026185).

Japanese Laid-Open Patent Application No. 2018-026185 discloses an input apparatus where a menu of color setting, transparency setting, thickness setting, line type setting, stamp setting, and operation setting are displayed in response to pressing of a pen button by the user.

SUMMARY OF INVENTION

In the above-described input apparatus in the related art, there is a case where handwriting input operability is not satisfactory. For example, the pen function menu or the editing function menu is to be displayed each time the user edits or modifies a handwritten object. After the menu is displayed, selection of a desired setting or function (color, thickness, line type, or the like) is to be further performed by the user.

In view of the above-described situation, the present invention has been devised to provide an input apparatus where handwriting input operability is improved.

One aspect of the present invention provides an input apparatus including a handwriting input unit configured to receive a handwritten input using a position of a pen or a user's finger in contact with a display; and a display unit configured to display the handwritten input received by the handwriting input unit on the display as a handwritten object. The input apparatus is configured to, in response to no occurrence of a change in the handwritten object during a first period, display one or more operation commands on the basis of the handwritten object.

According to the aspect of the present invention, an input apparatus can be provided where handwriting input operability is improved.

Other features and advantages of the disclosure will become apparent in the following detailed description of the embodiments with reference to the accompanying drawings.

BRIEF DESCRIPTION OF DRAWINGS

FIG. 1 illustrates operation menus displayed by a handwriting input apparatus in the related art;

FIG. 2 illustrates an example of a multifunctional pen;

FIG. 3A illustrates an example of displaying operation command candidates displayed by a handwriting input apparatus;

FIG. 3B illustrates an example of displaying operation command candidates displayed by the handwriting input apparatus;

FIG. 4 illustrates an overall configuration of an example of the handwriting input apparatus;

FIG. 5 illustrates an example of a hardware configuration of the handwriting input apparatus;

FIG. 6 is a functional block diagram illustrating an example of functions of the handwriting input apparatus;

FIG. 7 is a functional block diagram illustrating an example of functions related to user authentication provided by the handwriting input apparatus;

FIG. 8 illustrates an example of defined control data;

FIG. 9 illustrates an example of dictionary data of a handwriting recognition dictionary unit;

FIG. 10 illustrates an example of dictionary data of a character string conversion dictionary unit;

FIG. 11 illustrates an example of dictionary data of a predictive conversion dictionary unit;

FIG. 12A illustrates an example of operation command definition data stored by an operation command definition unit;

FIG. 12B illustrates an example of system definition data stored by the operation command definition unit;

FIG. 13 illustrates an example of operation command definition data for a case where there is a selected object selected with the use of a handwritten object;

FIG. 14 illustrates an example of displaying operation command candidates on the basis of the operation command definition data for a case where there is no selected object;

FIG. 15A illustrates an example of determining selected objects;

FIG. 15B illustrates an example of determining a selected object;

FIG. 15C illustrates an example of determining selected objects;

FIG. 15D illustrates an example of determining a selected object;

FIG. 16A illustrates an example of displaying operation command candidates on the basis of the operation command definition data for a case where there is a handwritten object;

FIG. 16B illustrates an example of displaying operation command candidates on the basis of the operation command definition data for a case where there is a handwritten object;

FIG. 17A illustrates an example of displaying operation command candidates on the basis of the operation command definition data for a case where there is a handwritten object;

FIG. 17B illustrates an example of displaying operation command candidates on the basis of the operation command definition data for a case where there is a handwritten object;

FIG. 18 is a sequence diagram for illustrating an example of processes where the handwriting input apparatus displays character string candidates and operation command candidates;

FIG. 19 is a sequence diagram for illustrating the example of processes where the handwriting input apparatus displays character string candidates and operation command candidates;

FIG. 20 is a sequence diagram for illustrating the example of processes where the handwriting input apparatus displays character string candidates and operation command candidates;

FIG. 21 is a sequence diagram for illustrating the example of processes where the handwriting input apparatus displays character string candidates and operation command candidates;

FIG. 22 is a sequence diagram for illustrating the example of processes where the handwriting input apparatus displays character string candidates and operation command candidates;

FIG. 23 is a sequence diagram for illustrating the example of processes where the handwriting input apparatus displays character string candidates and operation command candidates;

FIG. 24 is an example of a system configuration diagram of a handwritten input system (a second embodiment);

FIG. 25 is an example of a hardware configuration of an information processing system;

FIG. 26 is an example of functional blocks illustrating functions of the handwriting input system;

FIG. 27 is a sequence diagram for illustrating an example of processes where a handwriting input apparatus displays character string candidates and operation command candidates;

FIG. 28 is a sequence diagram for illustrating the example of processes where the handwriting input apparatus displays character string candidates and operation command candidates;

FIG. 29 is a sequence diagram for illustrating the example of processes where the handwriting input apparatus displays character string candidates and operation command candidates;

FIG. 30 is a sequence diagram for illustrating the example of processes where the handwriting input apparatus displays character string candidates and operation command candidates;

FIG. 31 is a sequence diagram for illustrating the example of processes where the handwriting input apparatus displays character string candidates and operation command candidates;

FIG. 32 is a sequence diagram for illustrating the example of processes where the handwriting input apparatus displays character string candidates and operation command candidates;

FIG. 33 is a sequence diagram for illustrating the example of processes where the handwriting input apparatus displays character string candidates and operation command candidates; and FIG. 34 illustrates an example of an operation guide.

DESCRIPTION OF EMBODIMENTS

As examples of embodiments of the present invention, a handwriting input apparatus 2 and a handwriting input method implemented by the handwriting input apparatus 2 will be described with reference to drawings.

<Operating Procedure of Handwriting Input Apparatus in Related Art>

For convenience of describing the handwriting input apparatus according to the embodiment of the present invention, operation procedures of a handwriting input apparatus in the related art will be briefly described first.

FIG. 1 illustrates operation menus displayed by a handwriting input apparatus in the related art. A pen function menu button 1021 for displaying a pen function menu 102, an editing function menu button 1031 for displaying an editing function menu 103, and an input/output function menu button 1041 for displaying an input/output function menu 104 are displayed on an operation panel 101.

The pen function menu 102 allows the user to select a pen color, thickness, and operation mode; the editing function menu 103 allows the user to delete, select, cut, copy, or paste an object; and the input/output function menu 104 allows the user to read a template, read a file, save a file, perform printing, and so forth.

As an example of an operation procedure of a handwriting input apparatus in the related art, an operation procedure to be performed after the user handwrites straight lines or curved lines (hereinafter, referred to as strokes), to delete the strokes and newly write strokes with a pen will now be described. Unless otherwise specified, pressing with a pen means pressing with the tip of the pen.

(A1) The user presses an editing function menu button 1031 with the pen to cause the editing function menu 103 to be displayed.

(A2) In response to the user pressing a "delete" button 1032 on the editing function menu 103, the handwriting input apparatus automatically deletes the editing function menu 103.

(A3) In response to the user writing a line with the pen across a plurality of strokes to be deleted, the strokes are deleted.

(A4) The user then presses a pen function menu button 1021 with the pen.

Through the procedure, the strokes to be deleted are deleted and thus, the user is allowed to newly handwrite a stroke with the pen. Thus, according to the related art, as many as four steps are used for simply deleting strokes. Despite differences in the number of steps and screen transitions, many handwriting input apparatuses in the related art have similar user operating systems. Such a user operating system is generally common to computer products and is based on a user operating system for invoking a function a user wishes to use. According to such a user operating system, because the user cannot use a function without knowing how to invoke a function, it is a common practice for a handwriting input apparatus to, with the use of a tutorial function or a help function, provide the user with information for invoking a function.

Similarly, if a user wishes to input or output information such as a filing or printing information, the user causes the input/output function menu 104 to be displayed. For example, to read a template, the following procedure is performed.

(B1) In response to the user pressing the input/output function menu button 1041 with the pen, the input/output function menu 104 is displayed.

(B2) In response to the user pressing a "Template Selection" button 1042 in the input/output function menu 104 with the pen, the input/output function menu 104 is deleted and a template selection window is displayed.

(B3) The user presses left and right buttons with the pen to scroll a displayed image until a desired template is displayed.

(B4) In response to the user pressing the desired template with the pen, the template is loaded and the template selection window is deleted.

Thus, a step-by-step user-operated procedure is used in the handwriting input apparatus in the related art. In other words, because the user operating system guiding the user to proceed to the next step in an explanatory manner is basically used, it is difficult for the user to intuitively operate the handwriting input apparatus.

In order to reduce user operating steps, as illustrated in FIG. 2, a pen itself may have an additional function. FIG. 2 illustrates an example of a multifunctional pen (hereinafter referred to as active pen 110). The active pen 110 is a pen with a built-in power supply capable of transmitting instructions to a handwriting input apparatus. In the active pen 110 of FIG. 2, there is one physical switch on the tip of the pen, there is another physical switch on the rear end of the pen, and there are other two physical switches on sides of the pen; the tip of the pen is for writing, the rear end of the pen is for deleting, and the sides of the pen are for assigning user functions.

The user may assign one of the pen side switches to a pen function menu 102 and another to an editing function menu 103. While it is convenient for the user to cause the pen function menu 102 or the editing function menu 103 to be displayed by pressing the corresponding side button of the active pen 110, there is no significant change in troublesomeness to the user in causing the pen function menu 102 or the editing function menu 103 to be displayed by pressing the side button each time of changing an object the user wishes to process.

By using the pen rear-end deleting switch, the above-mentioned steps of (A1), (A2), and (A4) can be omitted, and by using the pen rear-end instead of the pen tip in step (A3), it is possible to reduce the number of steps from 4 to 1 of the deleting procedure. However, in this method, the user is to purchase a special pen, i.e., the active pen 110, and to maintain the same. Furthermore, for the active pen 110, battery replacement or charging is to be made, and, in some cases depending on a usage situation, measures to prevent the active pen 110 from being stolen are likely to be taken.

The embodiments according to the present invention that will now be described solve these problems of the related art as will now be described.

First Embodiment

Overview

An outline of a handwriting input apparatus 2 according to the present embodiment will be described with reference to FIGS. 3A and 3B. FIGS. 3A and 3B illustrate display examples of candidates (also referred to as operation command candidates) of an operation command displayed by the handwriting input apparatus 2. FIG. 3A illustrates operation command candidates displayed as a result of a user handwriting a character; FIG. 3B illustrates operation command candidates displayed as a result of a user handwriting an enclosing line. First, FIG. 3A will be described.

A. In response to the user handwriting a handwritten object 11 (here, for a Japanese "Hiragana" character)

" ぎ "

with a pen, the handwriting input apparatus 2 identifies the character and converts the handwritten object to the Hiragana character

" ぎ "

B. The handwriting input apparatus 2 further converts the Hiragana character

" ぎ "

into a Chinese character. In the example of FIG. 3A, the Hiragana character

" ぎ "

is converted to a Chinese character

" 議 "

the Hiragana character

" ぎ "

can be converted to any other Chinese character or a string of Chinese characters as long as included in a dictionary.

C. The handwriting input apparatus 2 further converts the Chinese character

" 議 "

to a predicted string that is predicted from the Chinese character

" 議 "

In the example of FIG. 3A, the Chinese character

" 議 "

is converted into a Chinese character string

" 議事録 "

through prediction; the Chinese character

" 議 "

can be converted to any other Chinese character string as long as included in the dictionary.

D. The handwriting input apparatus 2 then displays operation command candidates including the Hiragana character

" ぎ "

the Chinese character

" 議 "

or the Chinese character string

" 議事録 "

(or "meeting minutes"). Actually, as illustrated in FIG. 3A, operation command candidates 510, i.e.,

" 議事録テンプレートを読み込む "

(or "read meeting minutes template") and

" 議事録フォルダーに保存する "

(or "save in a meeting minutes folder") in Japanese concerning input/output functions, are displayed as operation command candidates associated with the Hiragana character

" ぎ "

the Chinese character

" 議 "

or the Chinese character string

" 議事録 "

The number of operation command candidates is not limited to 2 as illustrated in FIG. 3A. In response to the user selecting an operation command from among the operation command candidates 510, the handwriting input apparatus 2 implements input or output of a file according to the selected operation command.

Accordingly, the user can cause the operation command candidates 510

" 議事録テンプレートを読み込む "

(or "read meeting minutes template") and

" 議事録フォルダーに保存する "

(or "save in a meeting minutes folder") to be displayed ultimately by handwriting the Hiragana character

" ぎ "

to invoke the input or output function illustrated in FIG. 1 ultimately from the state where the user has handwritten the Hiragana character

" ぎ "

Next, FIG. 3B will be described.

E. The user encloses, with a handwritten object 11 (in the example of FIG. 3B, an enclosing line), a fixed object 13, i.e., a Chinese character string

" 議事録 "

which has already been fixed.

F. The handwriting input apparatus 2 determines whether or not the handwritten object 11 and the fixed object 13 satisfy a predetermined criterion (for example, whether these objects overlap each other).

G. In response to the handwritten object 11 and the fixed object 13 satisfying the predetermined criteria, the handwriting input apparatus 2 displays operation command candidates 510 for an editing or modifying operation command. In the example of FIG. 3B, operation command candidates 510 of operation commands "delete", "move", "rotate" and "select" relating to the editing function are displayed. The number of operation command candidates 510 is not limited to 4 as in the example of FIG. 3B.

Accordingly, the user can cause the operation command candidates 510 to be displayed by enclosing the fixed object 13 with a line (the handwritten object 11), and can invoke the editing function for processing (i.e., deleting, moving, rotating or selecting) the fixed object 13 ultimately from the state where the user has handwritten the handwritten object 11.

As described above, the handwriting input apparatus 2 according to the present embodiment can invoke an input/output function or an editing function while the user has handwritten an object. Also a pen function can be invoked as well in the same manner. Therefore, a user operating procedure from the user's handwriting state to actually invoking a corresponding function can be effectively reduced clearly in comparison to the above-described related art.

Thus, according to the present embodiment, it is possible that a handwritten object 11 (a character in the case of FIG. 3A; an enclosing line in the case of FIG. 3B) is made to have more functions. As a result, the user can cause the handwriting input apparatus 2 to display operation command candidates 510 from only the user's intuitive operation (i.e., performing handwriting a character 11, an enclosing line 11, or the like).

Therefore, as a result of the user being allowed to cause the handwriting input apparatus 2 to display operation command candidates 510 only from the user's intuitive operation, it is possible to effectively reduce the need of the handwriting input apparatus 2 using the above-mentioned tutorial function or help function to provide the user with information for invoking a function.

As a result of the user being allowed to cause the handwriting input apparatus 2 to display operation command candidates 510 only from the user's intuitive operation, it is also possible to effectively reduce the above-mentioned step-by-step user-operated procedure on the handwriting input apparatus, and effectively reduce the need of the handwriting input apparatus 2 providing the above-mentioned user operating system for guiding the user to proceed to the next step in an explanatory manner.

As a result of the user being allowed to cause the handwriting input apparatus 2 to display operation command candidates 510 only from the user's intuitive operation, it is also possible to make an active pen 110 unnecessary and it is possible to effectively reduce the above-mentioned user's troublesomeness to cause the pen function menu 102 or the editing function menu 103 to be displayed by pressing the side button of the active pen 110 each time of changing an object the user wishes to process.

As a result of the user being allowed to cause the handwriting input apparatus 2 to display operation command candidates 510 only from the user's intuitive operation, it is possible to make an active pen 110 unnecessary and, as a result, it is possible to avoid purchasing a special pen, i.e., an active pen 110, and avoid maintaining the same, avoid performing battery replacement or charging the battery, and, also, avoid taking measures to prevent the active pen 110 from being stolen.

Terminology

An "input device" may be any device as long as the device enables the user to implement handwriting through an input of coordinates on a touch panel. Examples include a pen, a human finger, a human hand, and a rod-like member. In addition, also a line-of-sight input may be made possible for the purpose.

A "stroke" means a series of user operations, i.e., the user pressing the input device on the display, moving the input device continuously, and then removing the input device from the display. "Stroke data" is information displayed on a display on the basis of a series of coordinates inputs that are input with the use of the input device. Stroke data may be interpolated.

An "object" is an image displayed on the display on the basis of stroke data. An object means a displayed object, in the embodiment.

A "handwritten object" is an object made of one or more sets of stroke data and is handwritten by the user. A "handwritten object rectangular area" is an area defined by a circumscribed rectangle circumscribing a handwritten object.

A "fixed object" is an object that is converted into a character code (font) through a character recognition process performed on a handwritten object and selected by a user, or a handwritten object that is finally determined not to be converted into a character code (font).

An "input apparatus" is an apparatus that receives an input of information on the basis of touch positions of an input device on a touch panel. In the present embodiment, an input apparatus will be described with the use of the term "handwriting input apparatus 2".

An "operation command" is a command for implementing a specific process prepared to operate the handwriting input apparatus 2. According to the present embodiment, for example, operation commands of an editing system, a modifying system, and an input/output system are examples of an operation command. In fact, all commands for operating the handwriting input apparatus 2, such as image rotation by 180 degrees, page switching, setting of an operation mode, and so forth are included in examples of an operation command.

<Overall Configuration of Apparatus>

An overall configuration of the handwriting input apparatus 2 according to the embodiment of the present invention will now be described with reference to FIG. 4. FIG. 4 illustrates an overall configuration of the handwriting input apparatus 2. In FIG. 4, an electronic blackboard is illustrated as an example of the handwriting input apparatus 2.

As illustrated in FIG. 4, a display 220 as an example of a display device is installed at an upper section of the handwriting input apparatus 2. The user may input (draw) characters or the like onto the display 220 using a pen 2500.

<Hardware Configuration of Apparatus>

The hardware configuration of the handwriting input apparatus 2 will now be described with reference to FIG. 5. The handwriting input apparatus 2 has a configuration of an information processing device or a computer as illustrated. FIG. 5 illustrates one example of the hardware configuration of the handwriting input apparatus 2. As illustrated in FIG. 5, the handwriting input apparatus 2 includes a CPU (Central Processing Unit), a ROM (Read-Only Memory) 202, a RAM (Random Access Memory) 203, and a SSD (Solid State Drive) 204.

The CPU 201 controls operations of the whole handwriting input apparatus 2. The ROM 202 stores programs used to drive the CPU 201 such as an IPL (Initial Program Loader). The RAM 203 is used as a work area of the CPU 201. The SSD 204 stores various data such as programs for the handwriting input apparatus 2.

The handwriting input apparatus 2 also includes a display controller 213, a touch sensor controller 215, a touch sensor 216, the display 220, and a power switch 222.

The display controller 213 controls and manages screen display to output an output image to the display 220. The touch sensor 216 detects that the pen 2500, the user's hand, or the like (the pen or the user's hand acts as the input device) is in contact with the display 220. The touch sensor controller 215 controls processing of the touch sensor 216. The touch sensor 216 implements an input of coordinates and detection of the coordinates.

A method for inputting coordinates and detecting the coordinates is, for example, a method using an optical system where two light emitting and receiving devices located at the upper and lower ends of the display 220 emit a plurality of infrared rays parallel to the display 220, which are reflected by a reflective member provided around the display 220, and receive light returned through the same optical path as the light emitted by the light receiving device. The touch sensor 216 outputs position information of the infrared emitted by the two light emitting and receiving devices and interrupted by a touched object to the touch sensor controller 215; the touch sensor controller 215 determines the coordinate position that is the touched position of the object.

The power switch 222 is a switch for turning on and off the power of the handwriting input apparatus 2.

The handwriting input apparatus 2 further includes a bus line 210. The bus line 210 includes an address bus, a data bus, and so forth for electrically connecting the elements such as the CPU 201 illustrated in FIG. 5.

The touch sensor 216 is not limited to an optical type sensor. Various detection systems may be used, such as a touch panel of an electrostatic capacitance type where a touched position is determined by detecting of a change in capacitance; a touch panel of a resistive film type where a touched position is determined through a voltage change between two opposing resistive films; and an electromagnetic induction type where electromagnetic induction generated when a touched object touches a display section is detected and the touched position is determined.

The touch sensor 216 may be of a system that does not use an electronic pen to detect the presence or absence of a touch of a pen tip. In this case, a fingertip or a pen-shaped rod can be used to implement a touch operation. Note that the pen 2500 may have a shape that is not a long and thin pen shape.

<Functions of Apparatus>

Functions of the handwriting input apparatus 2 will now be described with reference to FIG. 6. FIG. 6 is an example of a functional block diagram illustrating functions of the handwriting input apparatus 2. The handwriting input apparatus 2 includes a handwriting input unit 21, a display unit 22, a handwritten input display control unit 23, a candidate display timer control unit 24, a handwritten input storage unit 25, a handwriting recognition control unit 26, a handwriting recognition dictionary unit 27, a character string conversion control unit 28, a character string conversion dictionary unit 29, a predictive conversion control unit 30, a predictive conversion dictionary unit 31, an operation command recognition control unit 32, and an operation command definition unit 33. These functions of the handwriting input apparatus 2 are implemented as a result of the elements illustrated in FIG. 5 operating according to instructions from the CPU 201 according to programs read from the SSD 204 and written in the RAM 203.

The handwriting input unit 21 is implemented by the touch sensor 216 and so forth and receives a handwriting input by the user. The handwriting input unit 21 converts the user's pen input d1 into pen operation data d2 (pen removal, pen touch, or pen-coordinate data) and transmits the converted data to the handwritten input display control unit 23. The pen coordinate data is transmitted periodically as discrete values, and the coordinates between the discrete values are interpolated through calculation.

The display unit 22 is implemented by the display 220 and so forth to display a handwritten object or an operation menu. The display unit 22 converts drawing data d3 written in a video memory by the handwritten input display control unit 23 to data corresponding to the characteristics of the display 220 and transmits the converted data to the display 220.

The handwritten input display control unit 23 performs overall control of handwriting input and display. The handwritten input display control unit 23 processes pen operation data d2 from the handwriting input unit 21 and displays the pen operation data d2 by transmitting the pen operation data d2 to the display unit 22. Processing of the pen operation data d2 and display of strokes will be described in more detail later with reference to FIGS. 18-23.

The candidate display timer control unit 24 provides a display control timer for selectable candidates, generates timing for starting and stopping the timer, to start display of selectable candidates and to delete the display. The candidate display timer control unit 24 receives a timer start request d4 or a timer stop request d4 from the handwritten input display control unit 23 and transmits a timeout event d5 to the handwritten input display control unit 23.

The handwritten input storage unit 25 has a storage function for storing user data (a handwritten object and character string objects). The handwritten input storage unit 25 receives user data d6-1 from the handwritten input display control unit 23, stores the data in the handwritten input storage unit 25, receives an obtaining request d6-2 from the handwritten input display control unit 23, and transmits user data d7 stored in the handwritten input storage unit 25. The handwritten input storage unit 25 transmits position information d36 of a fixed object to the operation command recognition control unit 32.

The handwriting recognition control unit 26 is a recognition engine for performing on-line handwriting recognition. Unlike a common OCR (Optical Character Reader), characters (various languages not only Japanese but also English and so forth), numerals, symbols (%, $, &, and so forth), and geometric forms (lines, circles, triangles, and so forth) are identified, in parallel with the user's pen operations. Various algorithms have been devised for recognition methods; concerning the present embodiment, description of a detailed recognizing algorithm is omitted as well known techniques may be used.

The handwriting recognition control unit 26 receives pen operation data d8-1 from the handwritten input display control unit 23, performs handwriting recognition, and stores thus obtained handwriting recognized character string candidates. The handwriting recognition control unit 26 stores language character string candidates obtained through conversion from the handwriting recognized character string candidates d12 with the use of the handwriting recognition dictionary unit 27. In response to an obtaining request d8-2 being received from the handwritten input display control unit 23, the handwriting recognition control unit 26 transmits the stored handwriting recognized character string candidates and language character string candidates d9 to the handwritten input display control unit 23.

The handwriting recognition dictionary unit 27 has dictionary data for handwriting recognized language conversion. The handwriting recognition dictionary unit 27 receives the handwriting recognized character string candidates d12 from the handwriting recognition control unit 26, converts the handwriting recognized character string candidates into the linguistically probable language character string candidates d13, and transmits the conversion result to the handwriting recognition control unit 26. For example, in a case of Japanese, the handwriting recognition dictionary unit 27 is used to convert Hiragana characters to Chinese characters or Katakana characters.

The character string conversion control unit 28 controls conversion into converted character string candidates. A "converted character string" is a character string that is likely to be created including a handwriting recognized character string or a language character string. The character string conversion control unit 28 receives the handwriting recognized character string candidates and the language character string candidates d11 from the handwriting recognition control unit 26, converts these candidates to converted character string candidates using the character string conversion dictionary unit 29, and stores the conversion result. In response to an obtaining request d14 being received from the handwritten input display control unit 23, the stored converted character string candidate d15 is transmitted to the handwritten input display control unit 23.

The character string conversion dictionary unit 29 has dictionary data for character string conversion. The character string conversion dictionary unit 29 receives the handwriting recognized character string candidates and the language character string candidates d17 from the character string conversion control unit 28 and transmits a converted character string candidate d18 to the character string conversion control unit 28.

The predictive conversion control unit 30 receives the handwriting recognized character string candidates and the language character string candidates d10 from the handwriting recognition control unit 26, receives the converted character string candidates d16 from the character string conversion control unit 28, and converts these candidates to predicted character string candidates using the predictive conversion dictionary unit 31. A "predicted character string candidate" is a character string that is likely to be created including a handwriting recognized character string, a language character string, or a converted character string. In response to an obtaining request d19 being received from the handwritten input display control unit 23, the predicted character string candidates d20 are transmitted to the handwritten input display control unit 23.

The predictive conversion dictionary unit 31 has dictionary data for predictive conversion. The predictive conversion dictionary unit 31 receives the handwriting recognized character string candidates, the language character string candidates, and the converted character string candidates d21 from the predictive conversion control unit 30, and transmits predicted character string candidates d22 to the predictive conversion control unit 30.

The operation command recognition control unit 32 receives the handwriting recognized character string candidates and the language character string candidate d30 from the handwriting recognition control unit 26, receives the converted character string candidates d28 from the character string conversion control unit 28, and receives the predicted character string candidates d29 from the predictive conversion control unit 30. With respect to these character string candidates, the operation command recognition control unit 32 transmits operation command conversion requests d26 to the operation command definition unit 33 and receives operation command candidates d27 from the operation command definition unit 33. The operation command recognition control unit 32 stores the received operation command candidates d27.

In this regard, in response to operation command conversion requests d26 being partially the same as operation command definitions, the operation command definition unit 33 transmits operation command candidates d27 to the operation command recognition control unit 32.

The operation command recognition control unit 32 receives pen operation data d24-1 from the handwritten input display control unit 23 and transmits a position information obtaining request d23 for a fixed object that has been input and fixed to the handwritten input storage unit 25. The operation command recognition control unit 32 stores a fixed object, determined from the pen operation data, as a selected object (including position information). The operation command recognition control unit 32 identifies a selected object that satisfies a predetermined criterion with the position of the pen operation data d24-1. In response to an obtaining request d24-2 being received from the handwritten input display control unit 23, the stored selected object d25, identified as an operation command candidate, is transmitted to the handwritten input display control unit 23.

<User Authentication>

In the present embodiment, control is performed using the result of user authentication, and therefore, it is desirable that the handwriting input apparatus 2 has a function to authenticate the user. Therefore, the function related to user authentication will be described with reference to FIG. 7.

FIG. 7 is a block diagram illustrating the function related to user authentication of the handwriting input apparatus 2. In FIG. 7, only the handwritten input display control unit 23 is illustrated for the function associated with a user authentication unit 34. However, each function illustrated in FIG. 6 may use the authentication result of the user.

An authentication information obtaining unit 35 obtains authentication information d31 from the user. The authentication information d31 may be the card number of an IC card, a user ID and a password, biometric information such as a fingerprint, or the like. The user authentication unit 34 obtains the authentication information d32 from the authentication information obtaining unit 35 and searches a user information DB 36 for the authentication information d33. In response to the corresponding user being found through the search, corresponding user information d34 is retrieved from the user information DB 36. The user information can be information representing a user attribute, for example, the user name, password, user computer name, department, authority, or the like.

Because the user authentication unit 34 transmits the user information d35 to the handwritten input display control unit 23, the handwritten input display control unit 23 can execute an operation command using the user information. An operation command using user information will be described with reference to FIGS. 12A and 12B.

Instead of the handwriting input apparatus 2 having the authentication function, an external authentication server may have the authentication function. In this case, the handwriting input apparatus 2 transmits the authentication information to the authentication server and obtains the authentication result and user information.

<Defined Control Data>

Next, defined control data used for various processes by the handwriting input apparatus 2 will be described with reference to FIG. 8. FIG. 8 illustrates an example of defined control data. The example of FIG. 8 illustrates the control data on a per-control item basis.

A selectable candidate display timer 401 defines a time, selectable candidates being displayed after the elapse of the time (one example of a first time). This is because selectable candidates are not displayed during handwriting. FIG. 8 illustrates that selectable candidates are displayed unless a pen touch occurs within a TimerValue of 500 ms from a pen removal. The selectable candidate display timer 401 is stored by the candidate display timer control unit 24. The selectable candidate display timer 401 is used at a start of the selectable candidate display timer 401 in step S4.8 of FIG. 20, which will be described later.

A selectable candidate delete timer 402 defines a time, displayed selectable candidates being deleted after the elapse of the time (one example of a second time). This is because selectable candidates will be deleted in response to the user not selecting the selectable candidates. FIG. 8 illustrates that selectable candidate display is deleted unless any one of the selectable candidates displayed is selected within TimerValue=5000 [ms] from the display of the selectable candidates. The selectable candidate delete timer 402 is stored by the candidate display timer control unit 24. The selectable candidate delete timer 402 is used at a start of the selectable candidate delete timer 402 in step S4.8.1.8 of FIG. 21.

A handwritten object approximate rectangular area 403 defines a rectangular area regarded as an area approximate to a handwritten object. According to the example of FIG. 8, the handwritten object approximate rectangular area 403 is a rectangular area larger than a handwritten object rectangular area horizontally by 50% of an estimated character size and vertically by 80% of the estimated character size. In the example illustrated in FIG. 8, the percentage (%) of the estimated character size is used. However, in a case where the unit "mm" or the like is used, the corresponding lengths can be fixed lengths. The handwritten object approximate rectangular area 403 is stored by the handwritten input storage unit 25. Estimated character sizes 405 are used in step S4.2 of FIG. 19 to determine overlap between a handwritten object approximate rectangular area and a stroke rectangular area.

Estimated writing direction and character size determination conditions 404 define constants for determining a writing direction and a character size measurement direction. According to the example of FIG. 8, for a case where (i) the difference between the time when a stroke has been added at the beginning of a handwritten object rectangular area and the time when the last stroke has been added is MinTime=1000 [ms] or more, (ii) the difference between the horizontal distance (width) and the vertical distance (height) of the handwritten object rectangular area is Min-Diff=10 [mm] or more, and (iii) the horizontal distance is longer than the vertical distance, the estimated writing direction is determined as being "horizontal" and the estimated character size is determined as being a vertical distance. For a case where the horizontal distance is shorter than the vertical distance, the estimated writing direction is determined as being "vertical" and the estimated character size is determined as being a horizontal distance. For a case where these conditions are not satisfied, the estimated character direction is determined as being "horizontal" (DefaultDir="Horizontal") and the estimated character size is determined as being the longer distance from among the horizontal and vertical distances. The estimated writing direction and character size determination conditions 404 are stored by the handwritten input storage unit 25. The estimated writing direction and character size determination conditions 404 are used in obtaining of an estimated writing direction in step S4.8.1.5 of FIG. 21 and obtaining of a character string object font in step S7.8.

The estimated character sizes 405 define data for estimating the size of a character or the like. According to the example of FIG. 8, an estimated character size determined with the use of the estimated writing direction and character size determination conditions 404 will be compared to a smaller character 405a (hereinafter referred to as a minimum font size) of the estimated character sizes 405 and a larger character 405c (hereinafter referred to as a maximum font size) of the estimated character sizes 405. For a case where the estimated character size is smaller than the minimum font size, the estimated character size is determined to be the minimum font size. For a case where the estimated character size is larger than the maximum font size, the estimated character size is determined to be the maximum font size. Otherwise, the character size is determined to be the character size of a medium character 405b. The estimated character sizes 405 are stored by the handwritten input storage unit 25. The estimated character sizes 405 are used in obtaining of a string object font in step S7.8 of FIG. 23.

Actually, the handwritten input storage unit 25 uses the font of the closest size from among the estimated character sizes 405 determined from comparing the estimated character size determined with the use of the estimated writing direction and character size determination conditions 404 to FontSizes of the estimated character sizes 405. For example, for a case where the estimated character size is 25 [mm] (the FontSize of smaller character) or less, the "smaller character" font is used. For a case where the estimated character size is 25 mm or more and 50 mm (the FontSize of middle character) or less, the "medium character" font is used. For a case where the estimated character size is greater than 100 mm (the FontSize of larger character), the "larger character" font is used. The "smaller character" 405a uses the Ming body 25 mm font (FontStyle="Ming body", FontSize="25 mm"); the "medium character" 405b uses the Ming body 50 mm font (FontStyle="Ming body", FontSize="50 mm"); the "larger character" 405c uses the Gothic body 100 mm font (FontStyle="Gothic body", FontSize="100 mm"). For a case where the number of the font sizes or style types is to be increased, the number of the estimated character sizes 405 may be increased accordingly.

A connecting line determination condition 406 defines data used to determine whether a plurality of objects have been selected by the user. According to the example of FIG. 8, for a case where (i) a handwritten object is a single stroke, (ii) the length of the long side of the handwritten object is 100 [mm] or more (MinLenLongSide="100 mm") and the length of the short side is 50 [mm] or less (MaxLenShortSide="50 mm"), and (iii) there are objects having overlap rates of 80% or more (MinOverLapRate="80%") (i.e., the overlaps are of a predetermined overlapping percentage or more) with respect to the long side and the short side of the handwritten object, it is determined that the plurality of objects have been selected (selected objects). In this case, it may be determined whether the overlaps are of more than the predetermined overlapping percentage instead of whether the overlaps are of the predetermined overlapping percentage or more. The operation command recognition control unit 32 stores the connecting line determination condition 406. The connecting line determination condition 406 is used in determination of selected objects in step S4.7.6.2 of FIG. 20.

An enclosing line determination condition 407 defines data used to determine whether an object is an enclosing line. According to the example of FIG. 8, the operation command recognition control unit 32 determines a fixed object, having the overlap rates of 100% or more (MinOverLapRate="100%") (i.e., the overlap being of a predetermined overlapping percentage or more) with respect to the long side direction and the short side direction with a handwritten object, as a selected object. In this case, it may be determined whether the overlap is of more than the predetermined overlapping percentage instead of whether the overlap is of the predetermined overlapping percentage or more. The enclosing line determination condition 407 is stored by the operation command recognition control unit 32. The enclosing line determination condition 407 is used in enclosing line determination in determination of a selected object in step S4.6.7.2 of FIG. 20.

Either condition from among the connecting line determination condition 406 and the enclosing line determination condition 407 may be used with priority for determination. For example, for a case where the connecting line determination condition 406 is set to be a mild condition (such that a handwritten object can be determined as a connecting line easily) and the enclosing line determination condition 407 is set to be a strict condition (such that a handwritten object can be determined only as an enclosing line), it may be better that the operation command recognition control unit 32 gives priority to the enclosing line determination condition 407 for the determination.

<Example of Dictionary Data>

The dictionary data will be described with reference to FIGS. 9-11. FIG. 9 is an example of the dictionary data of the handwriting recognition dictionary unit 27, FIG. 10 is an example of the dictionary data of the character string conversion dictionary unit 29, and FIG. 11 is an example of the dictionary data of the predictive conversion dictionary unit 31. These sets of dictionary data are used in steps S4.7.2-S4.7.4 of FIG. 20.

In the present embodiment, a conversion result using the dictionary data of the handwriting recognition dictionary unit 27 of FIG. 9 will be referred to as a "language character string candidate", a conversion result using the dictionary data of the character string conversion dictionary unit 29 of FIG. 10 will be referred to as a "converted character string candidate", and a conversion result using the dictionary data of the predictive conversion dictionary unit 31 of FIG. 11 will be referred to as a "predicted character string candidate".

"Before conversion" for each type of dictionary data indicates a character string to be searched for from the dictionary data; "after conversion" indicates a character string after conversion corresponding to a character string to be searched for; "probability" indicates the probability of being selected by the user. The probability is calculated from the results of the user selecting the character strings in the past. Therefore, the probabilities may be calculated on a per-use basis. Various algorithms have been devised to calculate such probabilities. Actually, the probabilities may be calculated in an appropriate way; the details will be omitted. According to the present embodiment, character string candidates based on estimated writing directions are displayed in a selection probability descending order.

In the dictionary data of the handwriting recognition dictionary unit 27 of FIG. 9, the handwritten

" ぎ "

("Hiragana" character and having a pronunciation "gi") has the probability of 0.55 to be

" 議 "

(Chinese character and having the same pronunciation "gi"), the probability of 0.4 to be

" 技 "

(Chinese character and having the same pronunciation "gi"); the handwritten

" ぎじ "

("Hiragana" characters and having a pronunciation "gishi") has the probability of 0.5 to be

" 技士 "

(Chinese characters and having the same pronunciation "gishi") and the probability of 0.45 to be

" 技師 "

(Chinese characters and having the same pronunciation "gishi"). The same applies to the other character strings before conversion. In FIG. 9, the character strings of "before conversion" are handwritten Hiragana characters. Instead, character strings other than Hiragana characters may be registered as character strings of "before conversion".

In the dictionary data of the character string conversion dictionary unit 29 of FIG. 10, the character string

" 議 "

(a Chinese character) is converted to

" 議事録 "

(a Chinese character string) with the probability of 0.95; the character string

" 技 "

(a Chinese character) is converted to

" 技量試 "

(a Chinese character string) with the probability of 0.85. The same applies to the other strings "before conversion".

In the dictionary data of the predictive conversion dictionary unit 31 of FIG. 11, the character string

" 議事録 "

(a Chinese character string) is converted to

" 議事録の送付 "

(Chinese characters strings and a Hiragana character) with the probability of 0.65; and the character string

" 技量試 "

(a Chinese character string) is converted to

" 技量試を決裁 "

(Chinese character strings and a Hiragana character) with the probability of 0.75. In the example of FIG. 11, all of the character strings "before conversion" are Chinese characters. However, characters other than Chinese characters may be registered instead.

The dictionary data is language independent, and any character strings may be registered as character strings of "before conversion" and "after conversion".

<Operation Command Definition Data Stored by Operation Command Definition Unit>

Next, the operation command definition data used by the operation command recognition control unit 32 will be described with reference to FIGS. 12A-13. FIGS. 12A and 12B illustrate an example of the operation command definition data and an example of system definition data stored by the operation command definition unit 33.

FIG. 12A illustrates an example of the operation command definition data. The operation command definition data illustrated in FIG. 12A is an example of the operation command definition data to be used when there is no selected object selected with the use of a handwritten object. Such operation command definition data is prepared for all the operation commands for operating the handwriting input apparatus 2. The operation commands of FIG. 12A have operation command names (Name), character strings that are partially the same as character string candidates (String), and operation command strings (Command) to be executed. "% . . . %" in an operation command string is a variable and is associated with system definition data as illustrated in FIG. 12B. In other words, "% . . . %" is replaced by system definition data illustrated in FIG. 12B.

The operation command definition data 701 indicates that the name of an operation command is " 議事録テンプレートを読み込む"
(or "read meeting minutes template"), a character string that is partially the same as a character string candidate is " 議事録"
(or "meeting minutes") or " テンプレート"
(or "template"), and an operation command string to be executed is "ReadFile https://% username %:% password %@server.com/templates/minutes.pdf". In this example, system definition data "% . . . %" is included in the operation command string to be executed, and "% username %" and "% password %" are replaced by system definition data 704 and 705, respectively. Therefore, the final operation-command string is "ReadFile https://taro.tokkyo: x2PDHTyS@server.com/template/minutes.pdf", indicating that the file "https://taro.tokkyo:x2PDHTyS@server.com/minutes.pdf" is to be read (ReadFile).

The operation command definition data 702 indicates that the name of an operation command is " 議事録フォルダーに保存する"
or ("save in a minutes folder"), a character string that is partially the same as a character string candidate is " 議事録"
(or "meeting minutes") or " 保存"
(or "save"), and an operation command string to be executed is "WriteFile https:/% username %:% password %@server.com/minutes/% machinename %_% yyyyy-m m-dd.pdf". Similar to the operation command definition data 701, "% username %", "% password %", and "% machinename %" in the operation command string are replaced by system definition data 704-706, respectively. Note that "% yyyy-mm-dd %" is to be replaced by the current date. For example, for a case where the current date is Sep. 26, 2018, "% yyyy-mm-dd %" is be replaced by "2018-09-26". The final operation command is "WriteFile https://taro.tokkyo: x2PDHTyS@server.com/mintes/% My-Machine_2018-09-26.pdf" and indicates that meeting minutes are to be saved in the file "https://taro.tokkyo:x2PDHTyS@server.com/% Minutes/% My-Machine_2018-09-26.p df" (WriteFile).

The operation command definition data 703 indicates that the name of an operation command is " 印刷する"
(or "print"), a character string that is partially the same as a character string candidate is " 印刷"
(or "print"), and an operation command string to be executed is "PrintFile https:/% username %:% password %@server.com/print/% machiname %-% yyyy-mm-dd % .pdf". As replacement in the operation command string is performed as for the operation command definition data 702, the final operation command to be executed is "PrintFile https://taro.tokkyo:x2PDHTyS@server.com/print/% My-Machine_2018-09-26.pdf", indicating that the file "https://taro.tokkyo: x2PDHTyS@server.com/print/% My-Machine_2018-09-26.pdf" is to be printed (PrintFile). That is, the file is sent to a server. In other words, the user causes a printer to communicate with the server and the printer prints the contents of the file on a paper sheet when the file is specified.

Thus, the operation command definition data 701-703 can be identified from character string candidates. Therefore, an operation command can be caused to be displayed as a result of the user handwriting an object. Further, after user authentication succeeds, "% username %", % password %", and so forth of operation command definition data will be replaced in the user information, and thus, input/output of the file can be performed in association with the user.

For a case where user authentication is not performed (which may be a case where user authentication fails for a case where the user can use the handwriting input apparatus 2 even if user authentication fails), "% username %", % password %", and so forth previously set to the handwriting input apparatus 2 are used for the replacement instead. Thus, even without user authentication, input/output of the file can be performed in association with the handwriting input apparatus 2.

Next, the operation command definition data for a case where there is a handwritten object, that is, operation command definition data of an editing system and a modifying system will be described. FIG. 13 illustrates an example of the operation command definition data for a case where there is a selected object selected with the use of a handwritten object. The operation command definition data illustrated in FIG. 13 has operation command names (Name), group names (Group) of operation command candidates, and operation command character strings (Command) to be executed.

The operation command definition data 707 defines operation commands of an editing system (Group="Edit"), and is examples of definition data of operation commands "delete," "move," "rotate," and "select" of an editing system. That is, these operation commands are displayed for a selected object to allow the user to select a desired operation command.

The operation command definition data 708 defines operation commands of a modifying system (Group="Decorate"), and the operation commands of the modifying system are defined as examples of the operation commands "make thicker," "make thinner," "make larger," "make smaller," and "draw underline". These operations commands are displayed for a selected object to allow the user to select a desired operation command. Furthermore, operation commands concerning color may also be displayed.

Thus, as a result of the user selecting a selected object with the use of a handwritten object, operation command definition data 707 or 708 is identified. Therefore, the user can cause an operation command to be displayed as a result of performing handwriting.

<Example of Displaying Operation Command Candidates>

FIG. 14 illustrates a display example of operation command candidates based on the operation command definition data (for a case where there is no selected object) illustrated in FIG. 12A. A procedure to display operation command candidates will be described later in detail with reference to sequence diagrams of FIGS. 18-23.

FIG. 14 illustrates an example of an operation guide 500 and selectable candidates 530 displayed in the operation guide 500. As a result of the user handwriting a handwritten object 504 (and after a timeout of the selectable candidate display timer), the operation guide 500 is displayed. The operation guide 500 includes an operation header 520, operation command candidates 510, a handwriting recognized character string candidate 506, converted character string candidates 507, predicted character string candidates 508, and a handwritten object rectangular area outline 503. The selectable candidates 530 include the operation command candidates 510, the handwriting recognized character string candidate 506 (including a language string candidate if any), the converted character string candidates 507, and the predicted character string candidates 508. The selectable candidates 530, excluding the operation command candidates 510, will be referred to as "character string candidates" 539.

The operation header 520 has buttons 501, 509, 502, and 505. The button 501 is for receiving the user operation of turning on and off of predictive conversion. In the example of FIG. 14, as a result of the user pressing the button 501 indicating "predict", the handwriting input unit 21 receives the pressing operation and sends the corresponding information to the handwritten input display control unit 23, and the display unit 22 changes the indication of the button 501 to

" かな"

(or "Kana characters"). After the change of the indication, predictive conversion is not performed (the converted character string candidates 507 and the predicted character string candidates 508 are not displayed), and the operation command candidates 510, the handwriting recognized character string candidates 506, and language character string candidates (such as a Chinese character

" 議"

obtained from Kana-to-Chinese character conversion) are displayed.

The button 502 is used for the user to operate candidate display pages. In the example of FIG. 14, the candidate display pages are 3 pages, and currently the first page is displayed. The button 505 is for receiving the user's operation to delete the operation guide 500. In response to the user pressing the button 505, the handwriting input unit 21 receives the pressing operation and sends the corresponding information to the handwritten input display control unit 23. As a result, the display unit 22 deletes the display other than the handwritten object 504. The button 509 is for receiving the user's operation for collective display deletion. In response to the user pressing the button 509, the handwriting input unit 21 receives the pressing operation and sends the corresponding information to the handwritten input display control unit 23. As a result, the display unit 22 deletes all indications illustrated in FIG. 14, including the handwritten object 504, to allow the user to newly perform handwriting.

In FIG. 14, the handwritten object 504 is the user-handwritten letter

" ぎ"

(a Hiragana character). The handwritten object rectangular area outline 503 sur-rounding the handwritten object 504 is displayed. The corresponding display procedure will be described later with reference to the sequence diagrams of FIGS. 18-23. In the example of FIG. 14, the handwritten object rectangular area outline 503 is displayed in a form of a broken-line frame.

The handwriting recognized character string candidate 506 is arranged in a probability descending order, the converted character string candidates 507 are arranged in a probability descending order, and the predicted character string candidates 508 are arranged in a probability descending order. The handwriting recognized character string candidate 506

" ぎ"

is a candidate of a recognition result with respect to the handwritten object 504. In this example,

" ぎ"

(a Hiragana character) is correctly identified from the handwritten object 504.

The converted character string candidates 507 are character string candidates obtained through conversion from a language character string candidate. In this example, the term

" 技量試"

is an abbreviation of the term

" 技術量産試作"

(or "technical mass production trial"). The predicted character string candidates 508 are converted from a handwriting recognized character string candidate, a language character string candidate, or a converted character string candidate. In this example,

" 技量試を決裁"

and

" 議事録の送付先"

are displayed as the predicted character string candidates 508.

The operation command candidates 510 are selected on the basis of the operation command definition data 701-703 of FIG. 11A. In the example illustrated in FIG. 14, the symbols

"»"

511 at the beginnings indicate that the following character strings are operation command candidates. In FIG. 14, there is no selected data that has been selected with the use of the handwritten object 504

" ぎ"

" 議事録"

which is a character string candidate obtained from the handwritten object

" ぎ"

is partially the same as the operation command definition data 701 and 702 illustrated in FIG. 12A. Therefore,

" 議事録テンプレートを読み込む"

and

" 議事録フォルダーに保存する"

are displayed as the operation command candidates 510.

In response to the user selecting the operation command candidate

"議事録テンプレートを読み込む"

(or "read a meeting minutes template"), the corresponding operation command defined by the operation command definition data 701 is executed. In response to the user selecting the operation command candidate

"議事録フォルダーに保存する"

(or "save in a meeting minutes folder"), the corresponding operation command defined by the operation command definition data 702 is executed. Thus, operation command candidates are displayed for a case where operation command definition data including a converted character string is found. Therefore, operation command candidates are not always displayed.

As illustrated in FIG. 14, the character string candidates and the operation command candidates are displayed at the same time (together). Therefore, the user can select either a character string candidate or an operation command candidate that the user intends to input.

<Example of Determining Selected Object>

According to the handwriting input apparatus 2 of the present embodiment, the user can determine a selected object by selecting a fixed object through handwriting. The selected object is to be edited or modified.

FIGS. 15A-15D illustrate examples of determination of a selected object. In FIGS. 15A-15D, a solid line represents a handwritten object 11, halftone dots represents a handwritten object rectangular area 12, solid lines represent a fixed object 13, and broken lines represent a selected object rectangular area 14. Lowercase English characters are appended to reference numerals to distinguish between them. In addition, as a determination condition (for determining whether or not a predetermined relationship exists) for determining whether a fixed object is a selected object, the connecting line determination condition 406 or the enclosing line determination condition 407 of the defined control data illustrated in FIG. 8 is used.

FIG. 15A illustrates an example where two fixed objects 13a and 13b written horizontally are selected by the user with the use of a connecting line (a handwritten object 11a). In this example, because the length H1 of the short side and the length W1 of the long side of the handwritten object rectangular area 12a satisfy the connecting line determination condition 406 and the overlap rate with the fixed objects 13a and 13b satisfies the connecting line determination condition 406, both the fixed objects 13a and 13b are determined as selected objects.

FIG. 15B is an example where the fixed object 13c in horizontal writing is selected by an enclosing line (a handwritten object 11b). In this example, only the fixed object 13c

"議事録"

where the overlap ratio between the fixed object 13c and the handwritten object rectangular area 12c satisfies the enclosing line determination condition 407, is determined as a selected object.

FIG. 15C is an example where a connecting line (a handwritten object 11c) is used to select the plurality of fixed objects 13d and 13e written vertically. In this example, as in FIG. 15A, the length H1 of the short side and the length W1 of the long side of the handwritten object rectangular area 12d satisfy the connecting line determination condition 406 and the overlap rate with the two fixed objects 13d and 13e satisfies the connecting line determination condition 406.

Therefore, both the fixed objects 13d and 13e

"議事録"

and

"ぎじ"

are determined as selected objects.

FIG. 15D is an example where the vertically written fixed object 13f is selected by an enclosing line (a handwritten object 11d). In this example, as in FIG. 15B, only the fixed object 13f

"議事録"

is determined as a selected object.

<Example of Displaying Operation Command Candidates>

FIGS. 16A and 16B illustrate display examples of operation command candidates on the basis of the operation command definition data for a case where there is a handwritten object illustrated in FIG. 15A. FIG. 16A illustrates operation command candidates of an editing system; FIG. 16B illustrates operation command candidates of a modifying system. FIG. 16A illustrates an example where the selected objects are determined with the use of the handwritten object 11a as in FIG. 15A.

As illustrated in FIGS. 16A and 16B, a main menu 550 includes operation command candidates displayed after the line-head symbols 511

"»"

The main menu 550 displays the last executed operation command names or the first operation command names in the operation command definition data. The first line of the operation command candidate "DELETE" is of an editing operation command; the second line of the operation command "MAKE THICKER" is of a modifying operation command.

The symbols ">" 512a and 512b (an example of submenu buttons) at the ends of the lines indicate that there are submenus. The first-line symbol ">" 512a is to display a submenu including the remaining operation commands of an editing system; the second line of the symbol ">" 512b is to display a submenu including the remaining operation commands of a modifying system. In response to the user pressing the symbol ">" 512a, the submenu 560 is displayed to the right. The submenu 560 displays all the operation commands defined in the operation command definition data. The submenu 560 is displayed from the time the main menu 550 is displayed or the submenu 560 is displayed in response to the user pressing the first-line symbol ">" 512b as mentioned above.

In response to the user pressing any one of the displayed operation command names with the pen, the handwritten input display control unit 23 executes the "Command" (see FIG. 13) of the operation command definition data associated with the pressed operation command name on the selected objects. That is, the selected objects can be "deleted" in response to the name "DELETE" 521 being pressed; the selected objects can be "moved" in response to the name "MOVE" 522 being pressed; the selected objects can be "rotated" in response to the name "ROTATE" 523 being pressed; another operation can be "selected" for the selected objects in response to the name "SELECT" 524 being pressed.

For example, in response to the user pressing "DELETE" 521 with the pen, the selected objects

"議事録"

and

"ぎじ"

can be deleted. In response to any one of "MOVE" 522, "ROTATE" 523, and "SELECT" 524 being pressed, bounding boxes (the circumscribed rectangles of the selected objects) can be displayed. Then, through a dragging operation with the pen, the user can move or rotate the selected objects in case of "MOVE" 522 or "ROTATE" 523. In case of "SELECT" 524 being pressed, the user can perform another operation on the bounding boxes.

The other character string candidates than the operation command candidates, i.e., character strings

" — "

541,

" 一、"

542,

" 〜 "

543

" → "

544, and

" ⇒ "

545, are the recognition results with respect to the connecting line (the handwritten object 11a). In a case where the user intends to input such a character string instead of an operation command, the user is allowed to select the corresponding character string candidate.

Concerning FIG. 16B, the submenu 560 is displayed from the time the main menu 550 is displayed or the submenu 560 is displayed in response to the user pressing the second-line symbol ">" 512b. The main menu 550 and the submenu 560 are displayed in the display example illustrated in FIG. 16B as in the case of FIG. 16A. On the basis of the operation command definition data of FIG. 13, the handwritten input display control unit 23 can be caused to thicken the lines that draw the selected objects in response to "MAKE THICKER" 531 being pressed; the handwritten input display control unit 23 can be caused to thin the lines that draw the selected objects in response to "MAKE THINNER" 532 being pressed; the handwritten input display control unit 23 can be caused to enlarge the selected objects in response to "MAKE LARGER" 533 being pressed; the handwritten input display control unit 23 can be caused to reduce the selected objects in size in response to "MAKE SMALLER" 534 being pressed; the handwritten input display control unit 23 can be caused to draw an underline to the selected objects in response to "DRAW UNDERLINE" 535 being pressed.

Further, the following values have been defined separately: how much the lines that draw the selected objects are to be thickened for a case where "MAKE THICKER" 531 is pressed; how much the lines that draw the selected objects are to be thinned for a case where "MAKE THINNER" 532 is pressed; how much the selected objects are to be enlarged for a case where "MAKE LARGER" 533 is pressed; how much the selected objects are to be reduced in size for a case where "MAKE SMALLER" 534 is pressed; which line type of underline is to be selected for a case where "DRAW UNDERLINE" 535 is pressed. Alternatively, in response to any element of the submenu 560 of FIG. 16B being selected, a corresponding selection menu may be further displayed to allow the user to make a corresponding adjustment.

In more detail, in response to the user pressing "MAKE THICKER" 531 with the pen, the handwritten input display control unit 23 can be made to thicken the lines that draw the fixed objects 13a and 13b

" 議事録 "

and

" ぎじ "

In response to the user pressing "MAKE THINNER" 532 with the pen, the handwritten input display control unit 23 can be made to thin the lines that draw the fixed objects 13a and 13b

" 議事録 "

and

" ぎじ "

In response to the user pressing "MAKE LARGER" 533 with the pen, the handwritten input display control unit 23 can be made to enlarge the fixed objects 13a and 13b

" 議事録 "

and

" ぎじ "

In response to the user pressing "MAKE SMALLER" 534 with the pen, the handwritten input display control unit 23 can be made to reduce the fixed objects 13a and 13b

" 議事録 "

and

" ぎじ "

in size. In response to the user pressing "DRAW UNDERLINE" 535 with the pen, the handwritten input display control unit 23 can be made to draw underlines to the fixed objects 13a and 13b

" 議事録 "

and

" ぎじ "

FIGS. 17A and 17B illustrate display examples of operation command candidates on the basis of the operation command definition data for a case where there is a handwritten object illustrated in FIG. 15B. The difference from FIGS. 16A and 16B is that FIGS. 17A and 17B illustrate an example where the selected object is determined with the use of the handwritten object 11b (the enclosing line) of FIG. 15B. As can be seen from comparison between FIGS. 16A and 16B and FIGS. 17A and 17B, there is no difference in the operation command candidates displayed regardless of whether the handwritten object to be used to determine a selected object(s) is a connecting line or an enclosing line. This is because, in either case, the handwritten input display control unit 23 displays operation command candidates on the display unit 22 in response to a selected object(s) being determined. In this regard, it is also possible to change the contents of operation command candidates to be displayed according to a recognition result of a handwritten object 11a or 11b. In this case, operation command definition data such as the operation command definition data illustrated in FIG. 13 are associated with identified handwritten objects (such as

" 一 "

" ○ "

and so forth).

In FIGS. 17A and 17B, the symbols

" ○ "

551 and "∞" 552, the numerals "0" 553 and "00" 554, and the Katakana character

" ロ "

555, which are character string candidates other than the operation command candidates, are the recognition results obtained with respect to the enclosing line (the handwritten object 11b), and any one of these character string candidates can be selected by the user in a case where the user intends to input the character string instead of operation commands.

<Operation Procedure>

Operations of the handwriting input apparatus 2 will be described with reference to FIGS. 18-23 as well as with reference to the configurations described above. FIGS. 18-23 are sequence diagrams illustrating examples of processes where the handwriting input apparatus 2 displays character string candidates and operation command candidates. The process of FIG. 18 starts when the handwriting input apparatus 2 starts (when the corresponding application starts). In FIGS. 18-23, the functions of FIG. 6 are represented by the corresponding reference numerals due to space limitation.

S1: The handwritten input display control unit 23 first transmits an event of start of generating a handwritten object to the handwritten input storage unit 25. The handwritten input storage unit 25 allocates a handwritten object area (a memory area for storing a handwritten object). The user may have to touch the handwriting input unit 21 with the pen for preparing the handwritten object area.

S2: The user then touches the handwriting input unit 21 with the pen. The handwriting input unit 21 detects the pen touch and transmits the pen touch event to the handwritten input display control unit 23.

S2.1: The handwritten input display control unit 23 transmits a stroke start event to the handwritten input storage unit 25, and the handwritten input storage unit 25 allocates a stroke area (a memory area).

S3: In response to the user moving the pen in contact with the handwriting input unit 21, the handwriting input unit 21 transmits the corresponding pen coordinates to the handwritten input display control unit 23.

S3.1: The handwritten input display control unit 23 transmits the pen coordinate interpolation display data (data for interpolating the discrete pen coordinates) to the display unit 22. The display unit 22 displays a line by interpolating the pen coordinates using the pen coordinate interpolation display data.

S3.2: The handwritten input display control unit 23 transmits the pen coordinates and the pen-coordinates reception time to the handwritten input storage unit 25. The handwritten input storage unit 25 attaches the pen coordinates to the corresponding stroke data. While the user is moving the pen, the handwriting input unit 21 repeatedly transmits the corresponding pen coordinates to the handwritten input display control unit 23 at regular intervals, so that steps S3-S3.2 are repeated until a pen removal from the handwriting input unit 21 occurs.

S4: In response to the user removing the pen from the handwriting input unit 21, the handwriting input unit 21 transmits the pen removal event to the handwritten input display control unit 23.

S4.1: The handwritten input display control unit 23 transmits an event of end of the stroke to the handwritten input storage unit 25 and the handwritten input storage unit 25 fixes the pen coordinates for the stroke. As a result, no more pen coordinates can be attached to the stroke data.

S4.2: The handwritten input display control unit 23 transmits a request to obtain an overlapping state between a handwritten object approximate rectangular area and a stroke rectangular area on the basis of the handwritten object approximate rectangular area 403 to the handwritten input storage unit 25. The handwritten input storage unit 25 calculates the overlapping state and transmits the overlapping state to the handwritten input display control unit 23.

Steps S4.3-S4.5 are executed for a case where the handwritten object approximate rectangular area and the stroke rectangular area do not overlap each other.

S4.3: For a case where the handwritten object approximate rectangular area and the stroke rectangular area do not overlap each other, one handwritten object is fixed. Therefore, the handwritten input display control unit 23 transmits a request to clear stored data to the handwriting recognition control unit 26.

S4.3.1-S4.3.3: The handwriting recognition control unit 26 transmits a request to clear stored data to the character string conversion control unit 28, the predictive conversion control unit 30, and the operation command recognition control unit 32. The handwriting recognition control unit 26, the character string conversion control unit 28, the predictive conversion control unit 30, and the operation command recognition control unit 32 clear the data concerning the character string candidates and the operation command candidates that has been stored. The last handwritten stroke at the time of clearing of the data is not added to the handwritten object.

S4.4: The handwritten input display control unit 23 transmits an event of end of generating the handwritten object to the handwritten input storage unit 25. The handwritten input storage unit 25 fixes the handwritten object. The event of end of generating the handwritten object means that the handwritten object has been completed (as a result, no more strokes are added to the handwritten object).

S4.5: The handwritten input display control unit 23 transmits an event of start of generating a handwritten object to the handwritten input storage unit 25. In preparation for a start of handwriting (a pen touch) of a next handwritten object, the handwritten input storage unit 25 allocates a new handwritten object area.

S4.6: The handwritten input display control unit 23 transmits a stroke adding event with respect to the stroke ended in step S4.1 to the handwritten input storage unit 25. For a case where steps S4.3-S4.5 have been executed, the stroke to be added is the first stroke of the handwritten object, and the handwritten input storage unit 25 adds the stroke data to the handwritten object, generating of the handwritten object having been started. For a case where steps S4.3-S4.5 have not been executed, the additional stroke is added to the handwritten object, generating of the handwritten object having been already in progress.

S4.7: The handwritten input display control unit 23 transmits the stroke adding event to the handwriting recognition control unit 26. The handwriting recognition control unit 26 adds the stroke data to the stroke data storing area where a character string candidate is stored.

S4.7.1: The handwriting recognition control unit 26 performs handwriting recognition on the data stored in the stroke data storing area.

S4.7.2: The handwriting recognition control unit 26 transmits handwriting recognized character string candidates which are the result of the handwriting recognition to the handwriting recognition dictionary unit 27. The handwriting recognition dictionary unit 27 transmits linguistically probable language character string candidates to the handwriting recognition control unit 26.

S4.7.3: The handwriting recognition control unit 26 transmits the handwriting recognized character string candidates and the received language character string candidates to the character string conversion control unit 28.

S4.7.3.1: The character string conversion control unit 28 transmits the handwriting recognized character string candidates and the language string candidates to the character string conversion dictionary unit 29. The character string conversion dictionary unit 29 transmits converted character string candidates to the character string conversion control unit 28.

S4.7.3.2: The character string conversion control unit 28 transmits the received converted character string candidates to the predictive conversion control unit 30.

S4.7.3.2.1: The predictive conversion control unit 30 transmits the received converted character string candidates to the predictive conversion dictionary unit 31. The predictive conversion dictionary unit 31 transmits predicted character string candidates to the predictive conversion control unit 30.

S4.7.3.2.2: The predictive conversion control unit 30 transmits the received predicted character string candidates to the operation command recognition control unit 32.

S4.7.3.2.2.1: The operation command recognition control unit 32 transmits the received predicted character string candidates to the operation command definition unit 33. The operation command definition unit 33 transmits operation command candidates to the operation command recognition control unit 32. Thus, the operation command recognition control unit 32 can obtain the operation command candidates corresponding to operation command definition data including character strings ("String" in FIG. 12A) that are the same as the predicted character string candidate.

Steps S4.7.3.3-S4.7.5.1 up to transmitting operation command candidates are then executed in the same manner as follows.

S4.7.3.3: The character string conversion control unit 28 transmits the received converted character string candidates to the operation command recognition control unit 32.

S4.7.3.3.1: The operation command recognition control unit 32 transmits the received converted string candidates to the operation command definition unit 33. The operation command definition unit 33 transmits operation command candidates to the operation command recognition control unit 32. Thus, the operation command recognition control unit 32 obtains the operation command candidates corresponding to operation command definition data including character strings ("String") that are the same as the converted character string candidates.

S4.7.4: The handwriting recognition control unit 26 transmits the handwriting recognized character string candidates and the language character string candidates to the predictive conversion control unit 30.

S4.7.4.1: The predictive conversion control unit 30 transmits the received handwriting recognized character string candidates and language character string candidates to the predictive conversion dictionary unit 31. The predictive conversion dictionary unit 31 transmits predicted character string candidates to the predictive conversion control unit 30.

S4.7.4.2: The predictive conversion control unit 30 transmits the received predicted character string candidates to the operation command recognition control unit 32.

S4.7.4.2.1: The operation command recognition control unit 32 transmits the received predicted character string candidates to the operation command definition unit 33. The operation command definition unit 33 transmits operation command candidates to the operation command recognition control unit 32. Thus, the operation command recognition control unit 32 can obtain the operation command candidates corresponding to operation command definition data including the character strings ("String") that are the same as the predicted character string candidates.

S4.7.5: The handwriting recognition control unit 26 transmits the handwriting recognized character string candidates and the received language character string candidates to the operation command recognition control unit 32.

S4.7.5.1: The operation command recognition control unit 32 transmits the received handwriting recognized character string candidates and language character string candidates to the operation command definition unit 33. The operation command definition unit 33 transmits operation command candidates to the operation command recognition control unit 32. Thus, the operation command recognition control unit 32 can obtain the operation command candidates corresponding to operation command definition data including the character strings ("String") that are the same as the language string candidates.

S4.7.6: The handwriting recognition control unit 26 transmits the stroke adding event to the operation command recognition control unit 32.

S4.7.6.1: The operation command recognition control unit 32 transmits a request to obtain position information of a fixed object to the handwritten input storage unit 25. The handwritten input storage unit 25 transmits the position information of the fixed object to the operation command recognition control unit 32.

S4.7.6.2: For determining a selected object(s), the operation command recognition control unit 32 determines whether the position information of the stroke received from the handwriting recognition control unit 26 in step S4.7.6 concerning the stroke adding event and the position information of the fixed object received from the handwritten input storage unit 25 have a predetermined relationship on the basis of the connecting line determination condition 406 and the enclosing line determination condition 407; and stores the fixed object, if any, that can be determined as being selected, as a selected object(s). In this case, because the selected object(s) is thus determined, operation command candidates of an input/output system are obtained from the operation command definition unit 33.

The handwriting recognition control unit 26, the character string conversion control unit 28, the predictive conversion control unit 30, and the operation command recognition control unit 32 store the data of the handwriting recognized character string candidates, the language character string candidates, the converted character string candidates, the predicted character string candidates, the operation command candidates, and the selected object(s) so that the data can be obtained in steps S4.8.1.2-4.8.1.4 of a later stage.

S4.8: Immediately after the handwritten input display control unit 23 transmits the stroke adding event to the handwriting recognition control unit 26 in step S4.7, the handwritten input display control unit 23 transmits an instruction to start the selectable candidate display timer 401 to the candidate display timer control unit 24. The candidate display timer control unit 24 starts the selectable candidate display timer 401.

Steps S5-S5.2 are executed in response to an occurrence of a pen touch before a certain time elapses (before the selectable candidate display timer 401 expires).

S5: In response to the user touching the handwriting input unit 21 with the pen before the selectable candidate display timer 401 expires, the handwriting input unit 21 transmits the pen touch event (the same as the event of step S2) to the handwritten input display control unit 23.

S5.1: The handwritten input display control unit 23 transmits a stroke start event (the same as the event of step S2.1) to the handwritten input storage unit 25. The sequence to be executed after step S5.1 is the same as the sequence executed after step S2.1.

S5.2: The handwritten input display control unit 23 transmits a selectable candidate display timer stop instruction to the candidate display timer control unit 24. The candidate display timer control unit 24 stops the selectable candidate display timer 401. This is because the pen touch has been detected, and thus, the selectable candidate display timer 401 has become unnecessary.

Steps S4.8.1-S7.14 are executed in response to no occurrence of a pen touch before the elapse of a certain period (before the selectable candidate display timer 401 expires). Therefore, the character string candidates and the operation command candidates illustrated in FIG. 14 will be displayed.

4.8.1: In response to the user not touching the handwriting input unit 21 with the pen during the operation of the selectable candidate display timer 401, the candidate display timer control unit 24 transmits a timeout event to the handwritten input display control unit 23.

S4.8.1.1: The handwritten input display control unit 23 transmits a request to obtain handwriting recognized character string candidates and language character string candidates to the handwriting recognition control unit 26. The handwriting recognition control unit 26 transmits the currently stored handwriting recognized character string candidates and language character string candidates to the handwritten input display control unit 23.

S4.8.1.2: The handwritten input display control unit 23 transmits a request to obtain converted character string candidates to the character string conversion control unit 28. The character string conversion control unit 28 transmits the currently stored converted character string candidates to the handwritten input display control unit 23.

S4.8.1.3: The handwritten input display control unit 23 transmits a request to obtain predicted character string candidates to the predictive conversion control unit 30. The predictive conversion control unit 30 transmits the currently stored predicted character string candidates to the handwritten input display control unit 23.

S4.8.1.4: The handwritten input display control unit 23 transmits a request to obtain operation command candidates to the operation command recognition control unit 32. The operation command recognition control unit 32 transmits the currently stored operation command candidates and selected object(s) to the handwritten input display control unit 23.

S4.8.1.5: The handwritten input display control unit 23 transmits a request to obtain an estimated writing direction to the handwritten input storage unit 25. The handwritten input storage unit 25 determines the estimated writing direction from the stroke added time difference as well as the horizontal distance and the vertical distance of the handwritten object rectangular area and transmits the determined estimated writing direction to the handwritten input display control unit 23.

S4.8.1.6: The handwritten input display control unit 23 generates selectable candidate display data such as the selectable candidate display data illustrated in FIG. 14 using these handwriting recognized character string candidates (in the example of FIG. 14,

"ぎ"

language character string candidates (in the example of FIG. 14, not illustrated but, for example,

"議"

converted character string candidates (in the example of FIG. 14,

"議事録"
and

"技量試"

predicted character string candidates (in the example of FIG. 14,

"技量試を決済"
and

"議事録の送付"

operation command candidates (in the example of FIG. 14,

"議事録テンプレートを読み込む"
and)

"議事録フォルダーに保存す"

the corresponding selection probabilities, and the estimated writing direction; transmits the generated selectable candidate display data including the character string candidates and the operation command candidates to the display unit 22; and displays the selectable candidate display data by the display unit 22.

S4.8.1.7: The handwritten input display control unit 23 transmits rectangular area outline data (rectangular frames) (such as the handwritten object rectangular area outline 503 in FIG. 14) of the handwritten object and the selected object(s) to the display unit 22.

S4.8.1.8: The handwritten input display control unit 23 transmits an instruction to start the selectable candidate delete timer 402 to the candidate display timer control unit 24 in order to delete the data after an elapse of a certain time from the display of the selectable candidate display data. The candidate display timer control unit 24 starts the selectable candidate delete timer 402.

Steps S6-S6.3 are executed in response to, during the operation of the selectable candidate delete timer 402, (i) the user deleting the selectable candidates displayed on the display unit 22, (ii) a change occurring in the handwritten object (that is, the user adding, deleting, moving, changing in shape, or dividing a stroke of the handwritten object), or (iii) no candidate being selected before the timeout of the selectable candidate delete timer 402.

Steps S6-S6.1 are executed in response to (i) the candidate display being deleted or (ii) a change occurring in the handwritten object.

S6: The handwriting input unit 21 transmits an event of the selectable candidates displayed being deleted or a change in the handwritten object occurring to the handwritten input display control unit 23.

S6.1: The handwritten input display control unit 23 transmits an instruction to stop the selectable candidate delete timer 402. The candidate display timer control unit 24 stops the selectable candidate delete timer 402. This is because the selectable candidate delete timer 402 has become unnecessary as a result of, for example, the user processing the handwritten object within the certain period.

S6.2: The handwritten input display control unit 23 transmits an instruction to delete the selectable candidate display data to the display unit 22 to delete the display of the selectable candidates.

S6.3: The handwritten input display control unit 23 transmits an instruction to delete the rectangular area outline data of the handwritten object and the selected object(s) to the display unit 22 to delete the display of the data. Therefore, for a case where the display of the operation command candidates is deleted due to a condition other than any operation command candidate being selected, the display of the handwritten object is maintained.

4.8.1.8.1: In response to neither the display of the selectable candidates being deleted nor a change occurring in the handwritten object (i.e., in response to the user not performing any pen operation) during the operation of the selectable candidate delete timer 402, the candidate display timer control unit 24 transmits a timeout event to the handwritten input display control unit 23.

The handwritten input display control unit 23 executes steps S6.2 and S6.3 also after the timeout of the selectable candidate delete timer 402. This is because the selectable candidate display data and the rectangular area outline data of the handwritten object and the selected object(s) may be deleted after the elapse of the certain period.

In response to the user selecting a selectable candidate during the operation of the selectable candidate delete timer 402, steps S7-S7.14 are executed.

S7: In response to the user selecting a selectable candidate during the operation of the selectable candidate delete timer 402, the handwriting input unit 21 transmits an event of selection of a character string candidate or an operation command candidate to the handwritten input display control unit 23.

S7.1: The handwritten input display control unit 23 transmits an instruction to stop the selectable candidate delete timer 402 to the candidate display timer control unit 24. The candidate display timer control unit 24 stops the selectable candidate delete timer 402.

S7.2: The handwritten input display control unit 23 transmits an instruction to clear the stored data to the handwriting recognition control unit 26.

S7.2.1: The handwriting recognition control unit 26 transmits an instruction to clear the stored data to the character string conversion control unit 28.

S7.2.2: The handwriting recognition control unit 26 transmits an instruction to clear the stored data the predictive conversion control unit 30.

S7.2.3: The handwriting recognition control unit 26 transmits an instruction to clear the stored data to the operation command recognition control unit 32.

The handwriting recognition control unit 26, the character string conversion control unit 28, the predictive conversion control unit 30, and the operation command recognition control unit 32 clear the data concerning the character string candidates and the operation command candidates that have been stored.

S7.3: The handwritten input display control unit 23 transmits an instruction to delete the selectable candidate display data to the display unit 22 to delete the display of the selectable candidate display data.

S7.4: The handwritten input display control unit 23 transmits an instruction to delete the rectangular area outline data of the handwritten object and the selected object(s) to the display unit 22 to delete the display of the data.

S7.5: The handwritten input display control unit 23 transmits an instruction to delete the handwritten object display data and an instruction to delete the pen coordinate interpolation display data transmitted in step S3.1 to the display unit 22 to delete the corresponding display. This is because a character string candidate or an operation command candidate has been selected and thus, the display of the handwritten object and so forth has become unnecessary.

S7.6: The handwritten input display control unit 23 transmits a handwritten object deletion event to the handwritten input storage unit 25.

In response to a character string candidate being selected, steps S7.7 to S7.9 are executed.

S7.7: In response to a character string candidate being selected, the handwritten input display control unit 23 transmits an event of an addition of a character string object to the handwritten input storage unit 25.

S7.8: The handwritten input display control unit 23 also transmits a request to obtain a character string object font to the handwritten input storage unit 25. The handwritten input storage unit 25 selects a defined font on the basis of the estimated character size of the handwritten object and transmits the selected font to the handwritten input display control unit 23.

S7.9: The handwritten input display control unit 23 displays a character string object at the same position as the handwritten object by sending the character string object display data to the display unit 22 using the defined font received from the handwritten input storage unit 25.

In response to an operation command candidate being selected, steps S7.10-S7.12 or step S7.13 is executed. Steps S7.10-S7.12 are executed for a case where there is a selected object(s).

S7.10: In response to an operation command candidate for the selected object being selected, the handwritten input display control unit 23 transmits an instruction to delete the selected object display data to the display unit 22 to delete the display of the selected object display data. This is to delete the display of the original selected object(s) once.

S7.11: The handwritten input display control unit 23 transmits an instruction to execute the corresponding operation command on the selected object(s) to the handwritten input storage unit 25. The handwritten input storage unit 25 transmits display data of a new selected object(s) (display data after being edited or modified according to the operation command) to the handwritten input display control unit 23.

S7.12: The handwritten input display control unit 23 transmits the selected object display data to the display unit 22 so that the selected object(s) after being processed according to the operation command is newly displayed.

For a case where there is no selected object (i.e., for a case where an input/output operation command has been selected), step S7.13 is executed.

S7.13: In response to an operation command of an input/output system being selected, the handwritten input display control unit 23 executes the operation command according to the operation command string ("Command") of the operation command definition data corresponding to the operation command selected by the user. For a case where the user authentication unit 34 has succeeded in authentication of the user, the handwritten input display control unit 23 sets the information of the corresponding user to the segment(s) "% . . . %" of the operation command (see FIG. 12A) and executes the operation command.

S7.14: The handwritten input display control unit 23 transmits an event of start of generating a handwritten object to the handwritten input storage unit 25 for a next handwritten object. The handwritten input storage unit 25 allocates a handwritten object area. Then, the process of steps S2-S7.14 are be repeated.

Summary of First Embodiment

As described above, the handwriting input apparatus 2 according to the first embodiment can be caused to display suitable operation command candidates as a result of the user handwriting a handwritten object or enclosing a fixed object with a line, for example. Accordingly, any function (such as an editing function, an input/output function, or a pen function) can be invoked immediately from a handwritten state. In other words, it is possible to omit step-by-step operations of pressing menu buttons to invoke a desired function, thereby reducing operation procedures from the user's handwriting state to the invocation of a desired function.

Second Embodiment

In a second embodiment of the present invention, a system-type handwriting input system where an information processing system in a network performs processing such as handwriting recognition and returns a result of the processing to a handwriting input apparatus 2 will be described.

In the description of the present embodiment, because the components or the contents of the drawings having the same reference numerals as the first embodiment perform the same functions, the description of the components described once may be omitted or only the differences may be described.

FIG. 24 is an example of a system configuration diagram of a handwriting input system 100 according to the present embodiment. The handwriting input system 100 includes a handwriting input apparatus 2 and an information processing system 10 capable of communicating together through a network N.

The handwriting input apparatus 2 is located in a facility, such as an office, and is connected to a LAN or Wi-Fi provided in the facility. The information processing system 10 is provided at, for example, a data center. The handwriting input apparatus 2 is connected to the Internet i via a firewall 8, and the information processing system 10 is also connected to the Internet i via a high-speed LAN in the data center.

The handwriting input apparatus 2 may be connected to the Internet i using wireless communication such as a telephone line network. In this case, the wireless communication is of 3G (3rd Generation), 4G (4th Generation), 5G (5th Generation), LTE (Long Term Evolution), WiMAX (Worldwide Interoperability for Microwave Access), or the like.

The information processing system 10 includes one or more information processing apparatuses. The one or more information processing apparatuses provide services to the handwriting input apparatus 2 as servers. A "server" is a computer or software that functions to provide information and processing results in response to a client's request. As will be described later, the information processing system 10 receives pen coordinates from the handwriting input apparatus 2 and transmits information for displaying an operation guide 500 illustrated in FIG. 14 to the handwriting input apparatus 2.

A server-side system is sometimes referred to as a cloud system. A cloud system is a system that uses cloud computing. Cloud computing has a form of use where resources in a network are used without identification of specific hardware resources. A cloud system is not necessarily provided in the Internet. In FIG. 24, the information processing system 10 is provided in the Internet, but may be provided in a local network (such a form being referred to as on-premises).

The information processing system 10 may include a plurality of computing apparatuses such as server clusters. The plurality of computing apparatuses are configured to communicate with each other via any type of communication link, including networks, shared memory, and the like, and perform the processes disclosed herein.

The configuration of the handwriting input apparatus 2 may be the same as in the first embodiment. In the present embodiment, at least a touch panel, a display, and a communication function are provided in the handwriting input apparatus 2. The handwriting input apparatus 2 may include a plurality of computing apparatuses configured to communicate with each other.

In the present embodiment, as the handwriting input apparatus 2, a typical information processing apparatus, such as a PC or a tablet, can execute a web browser or a dedicated application. A web browser or a dedicated application communicates with the information processing system 10. In a case where a web browser operates, the user enters or selects a URL of the information processing system 10 to connect the handwriting input apparatus 2 to the information processing system 10. The handwriting input apparatus 2 executes a web application provided by the information processing system 10 in the web browser. The web application is software or a mechanism running in the web browser through coordinating of a program using a programming language (e.g., JavaScript) running in the web browser with a program running in a web server.

In a case where a dedicated application operates, the handwriting input apparatus 2 is connected to a URL of the information processing system 10 which is registered in advance. Because the dedicated application has a program and a user interface, the program transmits information to and receives information from the information processing system 10 and displays information at the information processing system 10 using the user interface.

The communication method may use a general-purpose communication protocol such as HTTP, HTTPs, and Web-Socket, or may use a dedicated communication protocol.

<Example of Hardware Configuration>

The hardware configuration of the handwriting input apparatus 2 may be the same as the hardware configuration of FIG. 5. Concerning the present embodiment, a hardware configuration example of the information processing system 10 will now be described.

FIG. 25 illustrates the hardware configuration of the information processing system 10. As illustrated in FIG. 25, the information processing system 10 is made of a computer and, as illustrated in FIG. 25, includes a CPU 601, a ROM 602, a RAM 603, a HD 604, a HDD (hard disk drive) controller 605, a display 606, an external apparatus connecting I/F (interface) 608, a network I/F 609, a bus line 610, a keyboard 611, a pointing device 612, a DVD-RW (Digital Versatile Disk Rewritable) drive 514, and a medium I/F 616.

The CPU 601 controls operations of the whole information processing system 10. The ROM 602 stores a program used to drive the CPU 601, such as an IPL. The RAM 603 is used as a work area of the CPU 601. The HD 604 stores various data such as a program. The HDD controller 605 controls reading of various data from or writing of various data to the HD 604 under the control of the CPU 601. The display 606 displays various information such as a cursor, a menu, a window, characters, and images. The external apparatus connecting I/F 608 is an interface for connecting to various external apparatuses. An external apparatus may be, for example, a USB (Universal Serial Bus) memory or a printer. The network I/F 609 is an interface for performing data communication using a communication network. The bus line 610 includes an address bus, a data bus, and so forth for electrically connecting components such as the CPU 601 illustrated in FIG. 25.

The keyboard 611 has a plurality of keys for inputting characters, numerals, various instructions, and so forth. The pointing device 612 is another input part for selecting and executing various instructions, selecting a processing target, moving a cursor, and so forth. The DVD-RW drive 614 controls reading of various data from and writing of various data to the DVD-RW 613 as an example of a removable recording medium. Instead of the DVD-RW, a DVD-R, or the like may be used. The medium I/F 616 controls reading of data from and writing (storing) of data to a recording medium 615, such as a flash memory.

<Functions of System>

Functions of the handwriting input system 100 will be described with reference to FIG. 26. FIG. 26 is an example of a functional block diagram illustrating the functions of the handwriting input system 100. In the description of FIG. 26, the differences from FIG. 6 will be mainly explained.

In the present embodiment, the handwriting input apparatus 2 includes a display unit 22, a display control unit 41, a handwriting input unit 21, and a communication unit 42. Each function of the handwriting input apparatus 2 is implemented as a result of the components illustrated in FIG. 5 being operated by instructions from the CPU 201 according to a program written from the SSD 204 to the RAM 203.

The functions of the handwriting input unit 21 according to the present embodiment may be the same as the functions of the first embodiment. The handwriting input unit 21 converts the user's pen input d1 to pen operation data da (pen removal, pen touch, or pen-coordinate data) and transmits the converted data to the display control unit 41.

The display control unit 41 controls the display of the handwriting input apparatus 2. First, the display control unit 41 interpolates coordinates between discrete values of the pen coordinate data, which have discrete values, and transmits the pen coordinate data from a pen touch through a pen removal as a single stroke db to the display unit 22.

The display control unit 41 transmits the pen operation data dc to the communication unit 42 and obtains various display data dd from the communication unit 42. The display data includes information for displaying the operation guide 500 of FIG. 14. The display control unit 41 transmits the display data de to the display unit 22.

The communication unit 42 transmits the pen operation data dc to the information processing system 10, receives the various display data dd from the information processing system 10, and transmits the received data to the display control unit 41.

The functions of the display unit 22 may be the same as in the first embodiment. The display unit 22 displays a stroke db and display data de. The display unit 22 converts the stroke db or the display data de written in a video memory by the display control unit 41 into data corresponding to the characteristics of the display 220 and transmits the data to the display 220.

<Functions of Information Processing System>

The information processing system 10 includes a communication unit 43, a handwritten input display control unit 23, a candidate display timer control unit 24, a handwritten input storage unit 25, a handwriting recognition control unit 26, a handwriting recognition dictionary unit 27, a character string conversion control unit 28, a character string conversion dictionary unit 29, a predictive conversion control unit 30, a predictive conversion dictionary unit 31, an operation command recognition control unit 32, and an operation command definition unit 33. These functions of the information processing system 10 are implemented as a result of the components illustrated in FIG. 25 being operated according to instructions from the CPU 601 according to a program written from the HD 604 to the RAM 603.

The communication unit 43 receives the pen operation data dc from the handwriting input apparatus 2, transmits the pen operation data df to the handwritten input display control unit 23, receives the display data dd from the handwritten input display control unit 23, and transmits the pen operation data df to the handwriting input apparatus 2.

The other functions are the same as in the first embodiment at least concerning the description of the present embodiment.

Concerning a function to authenticate the user, the information processing system 10 performs authenticating operations according to a common method.

<Operation Procedure>

Operations of the handwriting input system 100 will be described with reference to the above-described configurations and FIGS. 27-33. FIGS. 27-33 are sequence diagrams illustrating an example of processes where the handwriting input apparatus 2 displays character string candidates and operation command candidates. The process of FIG. 27 starts in response to the handwriting input apparatus 2 starting (i.e., the web browser or the dedicated application starting) and communication with the information processing system 10 being established. The overall flow of FIGS. 27-33 may be the same as the overall flow of FIGS. 18-23 described above.

S1: In response to communication being established, in order to allocate a memory area in the handwriting input apparatus 2, the handwritten input display control unit 23 transmits an event of start of generating a handwritten object to the handwritten input storage unit 25. The handwritten input storage unit 25 allocates a handwritten object area (a memory area for storing a handwritten object). The user may have to touch the handwriting input unit 21 with the pen for allocating the handwritten object area.

S2*a*: The user then touches the handwriting input unit 21 with the pen. The handwriting input unit 21 detects the pen touch and transmits a pen touch event to the display control unit 41.

S2*b*: The display control unit 41 transmits the pen touch event to the communication unit 42 in order to indicate the pen touch to the information processing system 10.

S2*c*: The communication unit 42 transmits the pen touch event to the information processing system 10.

S2*d*: The communication unit 43 of the information processing system 10 receives the pen touch event and transmits the pen touch event to the handwritten input display control unit 23.

S2.1: The handwritten input display control unit 23 transmits an event of start of a stroke to the handwritten input storage unit 25, and the handwritten input storage unit 25 allocates a stroke area.

S3*a*: In response to the user moving the pen in contact with the handwriting input unit 21, the handwriting input unit 21 transmits the pen coordinates to the display control unit 41.

S3*b*: The display control unit 41 transmits the pen coordinates to the communication unit 42 in order to indicate the pen coordinates to the information processing system 10.

S3*c*: The communication unit 42 transmits the pen coordinates to the information processing system 10.

S3*d*: The communication unit 43 of the information processing system 10 receives the pen coordinates and indicates the pen coordinates to the handwritten input display control unit 23.

S3.1: The display control unit 41 transmits pen coordinate interpolation display data (data interpolating the discrete pen coordinates) to the display unit 22. The display unit 22 displays a line by interpolating the pen coordinates using the pen coordinate interpolation display data. The process of step S3.2 is the same as the process in the first embodiment described above.

S4a: In response to the user removing the pen from the handwriting input unit 21, the handwriting input unit 21 transmits a pen removal event to the display control unit 41.

S4b: The display control unit 41 transmits the pen removal event to the communication unit 42 in order to indicate the pen removal to the information processing system 10.

S4c: The communication unit 42 transmits the pen removal event to the information processing system 10.

S4d: The communication unit 43 of the information processing system 10 receives the pen removal event and transmits the pen removal event to the handwritten input display control unit 23.

Subsequent steps S4.1-S4.3.3 and steps S4.6-S4.7.6.2 in FIG. 29 are the same as the corresponding steps in the first embodiment described above.

S5a: In response to the user touching the handwriting input unit 21 with the pen before a timer expires, the handwriting input unit 21 transmits the pen touch event (the same event as the event of step S2) to the display control unit 41. The process of steps S5b-S5d may be the same as in steps S2b-S2d described above. Further, the process of steps S5.1-S4.8.1.5 is the same as the corresponding process in the first embodiment described above.

S4.8.1.6a: The handwritten input display control unit 23 generates selectable candidate display data including character string candidates, operation command candidates, illustrated in FIG. 14, selection probabilities, and an estimated writing direction, and transmits the selectable candidate display data including the character string candidates and the operation command candidates to the communication unit 43.

S4.8.1.6b: The communication unit 43 transmits the selectable candidate display data to the handwriting input apparatus 2.

S4.8.1.6c: The communication unit 42 of the handwriting input apparatus 2 receives the selectable candidate display data and transmits the selectable candidate display data to the display control unit 41.

S4.8.1.6d: The display control unit 41 receives the selectable candidate display data and transmits the selectable candidate display data to the display unit 22 to display the selectable candidate display data.

S4.8.1.7a: The handwritten input display control unit 23 transmits rectangular area outline data (a rectangular frame) (i.e., in the example of in FIG. 14, the handwritten object rectangular area outline 503) of the handwritten object and the selected object(s) to the communication unit 43.

S4.8.1.7b: The communication unit 43 transmits the rectangular area outline data to the handwriting input apparatus 2.

S4.8.1.7c: The communication unit 42 of the handwriting input apparatus 2 receives the rectangular area outline data and transmits the rectangular area outline data to the display control unit 41.

S4.8.1.7d: The display control unit 41 receives the rectangular area outline data and transmits the rectangular area outline data to the display unit 22 to display the rectangular area outline data. The process of step S4.8.1.8 is the same as the process in the first embodiment described above.

S6a: In response to the user performing an operation to delete the selectable candidate display or perform handwriting additionally to the handwritten object, the handwriting input unit 21 transmits an event of the selectable candidate display being deleted or the change in the handwritten object to the display control unit 41.

S6b: The display control unit 41 transmits the event of the selectable candidate display being deleted or the change of the handwritten object to the communication unit 42 to indicate to the information processing system 10 the event of the selectable candidate display being deleted or the change of the handwritten object.

S6c: The communication unit 42 transmits the event of the selectable candidate display being deleted or the change in the handwritten object to the information processing system 10.

S6d: The communication unit 43 of the information processing system 10 receives the event of the selectable candidate display being deleted or the change in the handwritten object and transmits the instruction to delete the selectable candidate display or the change in the handwritten object to the handwritten input display control unit 23. The process of Steps S6.1-S4.8.1.8.1 is the same as the process in the first embodiment described above.

S6.2a: The handwritten input display control unit 23 transmits an instruction to delete the selectable candidate display data to the communication unit 43.

S6.2b: The communication unit 43 transmits the instruction to delete the selectable candidate display data to the handwriting input apparatus 2.

S6.2c: The communication unit 42 of the handwriting input apparatus 2 receives the instruction to delete the selectable candidate display data and transmits the instruction to delete the selectable candidate display data to the display control unit 41.

S6.2d: The display control unit 41 receives the instruction to delete the selectable candidate display data and transmits the instruction to delete the selectable candidate display data to the display unit 22 to actually delete the display of the selectable candidates.

S6.3a: The handwritten input display control unit 23 transmits an instruction to delete the rectangular area outline data of the handwritten object and the selected object(s) to the communication unit 43.

S6.3b: The communication unit 43 transmits the instruction to delete the rectangular area outline data of the handwritten object and the selected object(s) to the handwriting input apparatus 2.

S6.3c: The communication unit 42 of the handwriting input apparatus 2 receives the instruction to delete the rectangular area outline data of the handwritten object and the selected object(s) and transmits the instruction to delete the rectangular area outline data of the handwritten object and the selected object(s) to the display control unit 41.

S6.3d: The display control unit 41 receives the instruction to delete the rectangular area outline data of the handwritten object and the selected object(s) and transmits the instruction to delete the rectangular area outline data of the handwritten object and the selected object(s) to the display unit 22 to cause the rectangular area outline data of the handwritten object and the selected object(s) to be deleted. Thus, for a case where display of operation command candidates is deleted due to a condition other than a case of any operation command candidate being selected, display of a handwritten object is maintained.

In response to the user selecting any selectable candidate during operation of the selectable candidate delete timer, steps S7-S7.14 are executed.

S7a: In response to the user selecting a selectable candidate during operation of the selectable candidate delete timer, the handwriting input unit 21 transmits an event of the selection of a character string candidate or an operation command candidate to the display control unit 41.

S7*b*: The display control unit 41 transmits the event of the selection of a character string candidate or an operation command candidate to the communication unit 42 for indicating the event to the information processing system 10.

S7*c*: The communication unit 42 transmits the event of the selection of a character string candidate or an operation command candidate to the information processing system 10.

S7*d*: The communication unit 43 of the information processing system 10 receives the event of the selection of a character string candidate or an operation command candidate and transmits the event of the selection of a character string candidate or an operation command candidate to the handwritten input display control unit 23. The process of steps S7.1-S7.2.3 is the same as the process in the first embodiment described above.

S7.3*a*: The handwritten input display control unit 23 transmits an instruction to delete the selectable candidate display data to the communication unit 43.

S7.3*b*: The communication unit 43 transmits the instruction to delete the selectable candidate display data to the handwriting input apparatus 2.

S7.3*c*: The communication unit 42 of the handwriting input apparatus 2 receives the instruction to delete the selectable candidate display data and transmits the instruction to delete the selectable candidate display data to the display control unit 41.

S7.3*d*: The display control unit 41 receives the instruction to delete the selectable candidate display data and causes the display unit 22 to delete the selectable candidates.

S7.4*a*: The handwritten input display control unit 23 transmits an instruction to delete the rectangular area outline data of the handwritten object and the selected object(s) to the communication unit 43.

S7.4*b*: The communication unit 43 transmits the instruction to delete the rectangular area outline data of the handwritten object and the selected object(s) to the handwriting input apparatus 2.

S7.4*c*: The communication unit 42 of the handwriting input apparatus 2 receives the instruction to delete the rectangular area outline data of the handwritten object and the selected object(s) and transmits the instruction to delete the rectangular area outline data of the handwritten object and the selected object(s) to the display control unit 41.

S7.4*d*: The display control unit 41 receives the instruction to delete the rectangular area outline data of the handwritten object and the selected object(s) and causes the display unit 22 to delete the rectangular area outline data of the handwritten object and the selected object(s).

S7.5*a*: The handwritten input display control unit 23 transmits an instruction to delete the handwritten object display data to the communication unit 43.

S7.5*b*: The communication unit 43 transmits the instruction to delete the handwritten object display data to the handwriting input apparatus 2.

S7.5*c*: The communication unit 42 of the handwriting input apparatus 2 receives the instruction to delete the handwritten object display data and transmits the instruction to delete the handwritten object display data to the display control unit 41.

S7.5*d*: The display control unit 41 receives the instruction to delete the handwritten object display data and causes the display unit 22 to delete the display of the handwritten object and the pen coordinate interpolation display data. The process of step S7.6 may be the same as the process in the first embodiment described above.

In response to a character string candidate being selected, steps S7.7-S7.9*d* are executed. The process of steps S7.7 and S7.8 may be the same as the process in the first embodiment described above.

S7.9*a*: The handwritten input display control unit 23 transmits character string object display data to be displayed at the same position as the handwritten object to the communication unit 43 using the defined font received from the handwritten input storage unit 25.

S7.9*b*: The communication unit 43 transmits the character string object display data to the handwriting input apparatus 2.

S7.9*c*: The communication unit 42 of the handwriting input apparatus 2 receives the character string object display data and transmits the character string object display data to the display control unit 41.

S7.9*d*: The display control unit 41 receives the character string object display data and causes the display unit 22 to display the character string object.

In response to an operation command candidate being selected, steps S7.10*a*-S7.12*d* or step S7.13 are executed. Steps S7.10*a*-S7.12*d* are executed for a case where there is a selected object(s).

S7.10*a*: In response to an operation command candidate for a selected object(s) being selected (for a case where the selected object(s) exists), the handwritten input display control unit 23 transmits an instruction to delete the selected object display data to the communication unit 43. This is to delete the display of the original selected object(s) once.

S7.10*b*: The communication unit 43 transmits the instruction to delete the selected object display data to the handwriting input apparatus 2.

S7.10*c*: The communication unit 42 of the handwriting input apparatus 2 receives the instruction to delete the selected object display data and transmits the instruction to delete the selected object display data to the display control unit 41.

S7.10*d*: The display control unit 41 receives the instruction to delete the selected object display data and causes the display unit 22 to delete the display of the selected object(s).

S7.11: The handwritten input display control unit 23 transmits the operation command for the selected object(s) to the handwritten input storage unit 25. The handwritten input storage unit 25 transmits display data (display data of after being edited or modified according to the operation command) of the new selected object(s) to the handwritten input display control unit 23.

S7.12*a*: The handwritten input display control unit 23 transmits the selected object display data to the communication unit 43.

S7.12*b*: The communication unit 43 transmits the selected object display data to the handwriting input apparatus 2.

S7.12*c*: The communication unit 42 of the handwriting input apparatus 2 receives the selected object display data and transmits the selected object display data to the display control unit 41.

S7.12*d*: Because the display control unit 41 receives the selected object display data, the display unit 22 newly displays the selected object(s) after being processed according to the operation command. The process of steps S7.13-S7.14 may be the same as the corresponding process in the first embodiment described above.

As described above, even in the system configuration of the present embodiment where the handwriting input apparatus 2 and the information processing system 10 communicate with each other, the same effect as in the first embodiment can be obtained. The processing flows of FIGS. 27-33 are an example, and processes to be executed with respect to the handwriting input apparatus 2 and the information processing system 10 communicating with each other may be included or omitted. A part of the processes performed by the information processing system 10 may be instead performed by the handwriting input apparatus 2. For example, the handwriting input apparatus 2 may perform a process to delete display.

<Example of Display of Operation Guide>

In the case of the handwriting recognition system according to the second embodiment, the operation guide 500 may be the same as in FIG. 14. It is also possible to change the design of the operation guide 500. Below, concerning the present embodiment, an example of the operation guide displayed for a case where English is handwritten will be described.

FIG. 34 illustrates an example of the operation guide 500. For a case where the information processing system 10 is to recognize a foreign language such as English, it is desirable for the information processing system 10 to be able to determine the language itself that has been handwritten. However, in order to improve the recognition accuracy, some method may be used to determine what language has been handwritten by the user. For example, the user selects a language from among languages indicated in the menu displayed by the handwriting input apparatus 2 and indicates the corresponding language to the information processing system 10. Alternatively, the user may previously register attributes of the user including the locale (what language is used) with the information processing system 10 so that the information processing system 10 can determine what language will be handwritten according to the user logging in. Alternatively, for a case where the information processing system 10 is in the Internet, the country or region may be determined by the IP address of the handwriting input apparatus 2, and the information processing system 10 may determine the language used in the country or region.

(1) In FIG. 34, for example, the user handwrites a character string "pl".

(2) The handwriting recognition control unit 26, the handwriting recognition dictionary unit 27, the character string conversion control unit 28, the character string conversion dictionary unit 29, the predictive conversion control unit 30, and the predictive conversion dictionary unit 31 are configured to process English. The handwriting recognition control unit 26 recognizes that the handwritten character string "pl" is English. The information processing system 10 recognizes the character string "pl" and transmits corresponding converted character string candidates 507 each including the character string "pl" as a part and a corresponding predicted character string candidate 508 including a converted character string as a part to the handwriting input apparatus 2. This allows the handwriting input apparatus 2 to display words or phrases (selectable candidates) starting with "pl", such as "play", "place", "placard", "placenta", "playground", and so forth. Although not illustrated in FIG. 34, operation command candidates (such as the operation command candidates 510 as in FIG. 14 for a case of Japanese language) may also be displayed.

(3) In response to the user selecting "play", the display of the operation guide 500 and the handwritten object 504 is deleted and "play" 573 is displayed.

Summary of Second Embodiment

Thus, according to the present embodiment, handwriting recognition can be implemented in the handwriting input system 100 where the handwriting input apparatus 2 and the information processing system 10 communicate with each other in the same way as in the first embodiment.

Other Applications

Thus, the input apparatuses, input methods, programs, and input systems have been described with reference to the preferred embodiments. However, the present invention is not limited to the specific embodiments, and various modifications, substitutions, and so forth, may be made without departing from the scope of the claimed invention.

For example, although an electronic blackboard has been described in the embodiments as an example, an information processing apparatus having a touch panel can be suitably used. An apparatus having the same functions as or functions similar to the functions of an electronic blackboard is also called an electronic whiteboard, an electronic information board, an interactive board, or the like. An information processing apparatus having a touch panel may be, for example, an output apparatus such as a PJ (Projector), digital signage, a HUD (HeadUp Display), an industrial machine, an imaging apparatus, a sound collector, a medical apparatus, a network home appliance, a personal computer, a cellular phone, a smartphone, a tablet terminal, a game machine, a PDA (Personal Digital Assistant), a digital camera, a wearable PC, or a desktop PC.

In the embodiments, the coordinates of the tip of the pen are detected by the touch panel, but the coordinates of the tip of the pen may be detected by ultrasound. In this case, the pen emits ultrasonic waves together with light emission, and the handwriting input apparatus 2 calculates the distance according to the time of arrival of the ultrasonic waves. The position of the pen can be determined from the direction and distance of the ultrasonic waves. A projector draws (projects) the pen's trajectory (i.e., moved route) as a stroke.

In the embodiments, for a case where there is a selected object(s), operation command candidates of an editing system and a modifying system are displayed, whereas for a case where there is no selected object, operation command candidates of an input/output system are displayed. However, operation command candidates of an editing system and a modifying system and operation command candidates of an input/output system may be displayed at the same time.

The configuration examples of FIGS. 6 and 26, for example, are examples where, in order to facilitate understanding of processes executed by the handwriting input apparatus 2, functions are classified on a per-main function basis. However, embodiments of the present invention are not limited by the specific method of classifying the processing units or by the specific names of the processing units. The processes of the handwriting input apparatus 2 can be classified more finely depending on the actual processing contents. Alternatively, it is possible to classify the functions in such a manner that each processing unit include more processes.

Each of the functions of the embodiments described above may be implemented by one or more processing circuits. A "processing circuit" or a "processing unit" described herein includes a processor programmed to perform each function by software, such as a processor implemented in electronic circuits, an ASIC (Application Specific Integrated Circuit) designed to perform each function as described above, a digital signal processor (DSP), a field programmable gate array (FPGA), or a conventional circuit module.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

The processing circuitry is implemented as at least a portion of a microprocessor. The processing circuitry may be implemented using one or more circuits, one or more microprocessors, microcontrollers, application speci?c integrated circuits, dedicated hardware, digital signal processors, microcomputers, central processing units, ?eld programmable gate arrays, programmable logic devices, state machines, super computers, or any combination thereof. Also, the processing circuitry may include one or more software modules executable within one or more processing circuits. The processing circuitry may further include memory con?gured to store instructions and/or code that causes the processing circuitry to execute functions.

If embodied in software, each block may represent a module, segment, or portion of code that comprises program instructions to implement the speci?ed logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the speci?ed logical function(s).

DESCRIPTION OF SYMBOLS

2 Handwriting input apparatus
21 Handwriting input unit
22 Display unit
23 Handwritten input display control unit
24 Candidate display timer control unit
25 Handwritten input storage unit
26 Handwriting recognition control unit
27 Handwriting recognition dictionary unit
28 Character string conversion control unit
29 Character string conversion dictionary unit
30 Predictive conversion control unit
31 Predictive conversion dictionary unit
32 Operation command recognition control unit
33 Operation command definition unit
34 User authentication unit
35 Authentication information obtaining unit The present application is based on and claims the benefit of priority of Japanese patent application No. 2018-194685 filed on Oct. 15, 2018 and Japanese patent application No. 2019-185271 filed on Oct. 8, 2019. The entire contents of Japanese patent application No. 2018-194685 and Japanese patent application No. 2019-185271 are hereby incorporated herein by reference.

The invention claimed is:

1. An input apparatus comprising:
a handwriting inputter to receive a handwritten input using a position of a pen or a user's finger in contact with a display;
the display to display the handwritten input received by the handwriting inputter on the display as a handwritten object; and
one or more processors configured to, in response to the handwritten object, display selectable candidates including both of one or more operation commands candidates and one or more character string candidates on the basis of the handwritten object on an area of the display that is in contact with the pen or the user's finger, the one or more operation commands candidates including a specific process implementation corresponding to a command, and the one or more character string candidates identified from the handwritten object which is displayed on the display, the handwritten object, the one or more operation commands candidates, and the one or more character string candidates being displayed on the display at a same time,
wherein the one or more operation commands candidates include at least an editing command or a modifying command to change characteristic of the handwritten object,
wherein the one or more processors is further configured to, in response to that none of a user adding, deleting, moving, changing in shape, or dividing a stroke of the handwritten object occurs during a first period, display the selectable candidates including both of the one or more operation commands candidates and the one or more character string candidates on the basis of the handwritten object,
wherein the one or more character string candidates comprise a handwriting recognized character string candidate recognized from the handwritten object, and a name of the command includes a character string that is the same as the handwriting recognized character string candidate,
wherein the one or more operation commands candidates start to be displayed at the same time as the one or more character string candidates on the same area of the display, and
wherein in a case a first handwritten input is received, a corresponding first operation command candidate is displayed, and in a case of a second handwritten input, different from the first handwritten input, is received, a corresponding second operation command candidate, different from the corresponding first operation command candidate, replaces the corresponding first operation command candidate.

2. The input apparatus according to claim 1, further configured to,
in response to no occurrence of the change in the handwritten object during the first period,
display a handwritten object rectangular area including the handwritten object and displays one or more operation commands candidates identified as the operation commands from the handwritten object;

in response to any one from among (i) no operation command candidate being selected from among the one or more operation command candidates during a second period, (ii) receiving an operation of the user to delete display of one or more operation command candidates, and (iii) an occurrence of a change in the handwritten object, delete display of the one or more operation command candidates; and in response to deleting from the display the one or more operation command candidates due to a condition other than any operation command candidate being selected from among the one or more operation command candidates, maintain display of the handwritten object.

3. The input apparatus according to claim 2, wherein the condition other than any operation command candidate being selected from among the one or more operation command candidates corresponds to a case of either one from among (i) receiving an operation of the user to delete the display of the one or more operation command candidates and (ii) an occurrence of a change in the handwritten object.

4. The input apparatus according to claim 2, further configured to display one or more character string candidates identified from the handwritten object;

in response to either one from among (i) neither operation command candidate nor character string candidate being selected from among the one or more operation command candidates and the one or more character string candidates during the second period and (ii) receiving an operation of the user to delete the one or more operation command candidates and the one or more character string candidates, delete display of the one or more operation command candidates and the one or more character string candidates; and in response to deleting the display of the one or more operation command candidates and the one or more character string candidates due to a condition other than any operation command candidate or any character string candidate being selected from among the one or more operation command candidates and the one or more character string candidates, maintain display of the handwritten object.

5. The input apparatus according to claim 4 further configured to display character strings including elements selected from among characters, numerals, symbols, and geometric forms as the one or more character string candidates, and display the operation commands together with the elements selected from among characters, numerals, symbols, and geometric forms.

6. The input apparatus according to claim 1, further configured to store constants that replace variables associated with the one or more operation command candidates, replace the variables associated with the one or more operation command candidates identified from the handwritten object with constants, and execute an operation command from among the one or more operation command candidates for which a variable is replaced with a constant.

7. The input apparatus according to claim 6, further comprising a user authenticator configured to authenticate the user, wherein the input apparatus is further configured to, in response to success of authentication of the user by the user authenticator, set, to the constant, information concerning the user, replace the variable associated with the operation command with the information concerning the user, and execute the operation command for which the variable is replaced with the information concerning the user.

8. The input apparatus according to claim 1, further configured to, in response to position information of a fixed object obtained from handwriting having predetermined relationships with the handwritten object, identify an operation command, from among the one or more operation command candidates, concerning the fixed object that has the predetermined relationships with the handwritten object.

9. The input apparatus according to claim 8, further configured to, identify the operation command for editing or modifying the fixed object that has the predetermined relationships with the handwritten object.

10. The input apparatus according to claim 8, further configured to, in response to position information of a plurality of fixed objects obtained from handwriting having predetermined relationships with the single handwritten object, identify an operation command, from among the one or more operation command candidates, concerning the plurality of fixed objects that have the predetermined relationships with the single handwritten object.

11. The input apparatus according to claim 8, further configured to, in response to an overlap of the fixed object obtained from handwriting with the handwritten object being of a predetermined overlapping percentage or more or being of more than the predetermined overlapping percentage or in response to overlaps of the plurality of fixed objects obtained from handwriting with the single handwritten object being of a predetermined overlapping percentage or more or being of more than the predetermined overlapping percentage, determine that the position information of the fixed object obtained from handwriting has the predetermined relationships with the handwritten object or the position information of the plurality of fixed objects obtained from handwriting has the predetermined relationships with the single handwritten object.

12. The input apparatus according to claim 1, wherein the display is further configured to, for ultimately displaying the one or more operation command candidates, first, display one or more operation command candidates from among the one or more operation command candidates and a submenu button; and second, display a remaining operation command candidate from among the one or more operation command candidates in response to the submenu button being operated by the user.

13. The input apparatus according to claim 12, wherein one operation command candidate from among the one or more operation command candidates displayed first with the submenu button corresponds to an operation command last selected by the user.

14. The input apparatus of claim 1, wherein the editing command includes one of delete, move, rotate or select commands and the modifying command includes one of make thicker, make thinner, make larger, make smaller, or draw underline commands.

15. The input apparatus of claim 1, wherein the input apparatus is an electronic blackboard.

16. The input apparatus of claim 1, wherein, in the selectable candidates, the one or more operation command candidates and the one or more character string candidates are displayed together.

17. The input apparatus of claim 1, wherein the input apparatus further comprises a memory to store the first period.

18. The input apparatus of claim 1, wherein the editing command or the modifying command is displayed as a main menu followed by a symbol, and a submenu including remaining operation commands in operation command definition data is further displayed from a time the main menu is displayed or in response to the symbol being pressed.

19. An input method comprising:
receiving by a handwritten inputter a handwritten input using a position of a pen or a user's finger in contact with a display;
displaying by the display the handwritten input received by the handwriting inputter on the display as a handwritten object; and
in response to the handwritten object, displaying selectable candidates including both of one or more operation commands candidates and one or more character string candidates on the basis of the handwritten object on an area of the display that is in contact with the pen or the user's finger, the one or more operation commands candidates including a specific process implementation corresponding to a command, and the one or more character string candidates identified from the handwritten object which is displayed on the display, the handwritten object, the one or more operation commands candidates, and the one or more character string candidates being displayed on the display at a same time,
wherein the operation commands candidates include at least an editing command or a modifying command to change characteristic of the handwritten object,
wherein the input method further comprises, in response to that none of a user adding, deleting, moving, changing in shape, or dividing a stroke of the handwritten object occurs during a first period, displaying the selectable candidates including both of the one or more operation commands candidates and the one or more character string candidates on the basis of the handwritten object,
wherein the one or more character string candidates comprise a handwriting recognized character string candidate recognized from the handwritten object, and a name of the command includes a character string that is the same as the handwriting recognized character string candidate,
wherein the one or more operation commands candidates start to be displayed at the same time as the one or more character string candidates on the same area of the display, and
wherein in a case a first handwritten input is received, a corresponding first operation command candidate is displayed, and in a case of a second handwritten input, different from the first handwritten input, is received, a corresponding second operation command candidate, different from the corresponding first operation command candidate, replaces the corresponding first operation command candidate.

20. A non-transitory recording medium storing a program causing an information processing apparatus to function as
a handwriting inputter configured to receive a handwritten input using a position of a pen or a user's finger in contact with a display; and
the display configured to display the handwritten input received by the handwriting inputter on the display as a handwritten object,
wherein the program further causes the information processing apparatus to, in response to the handwritten object, display selectable candidates including both of one or more operation commands candidates and one or more character string candidates on the basis of the handwritten object on an area of the display that is in contact with the pen or the user's finger, the one or more operation commands candidates including a specific process implementation corresponding to a command, and the one or more character string candidates identified from the handwritten object which is displayed on the display, the handwritten object, the one or more operation commands candidates, and the one or more character string candidates being displayed on the display at a same time,
wherein the operation commands candidates include at least an editing command or a modifying command to change characteristic of the handwritten object,
wherein the program further causes the information processing apparatus to, in response to that none of a user adding, deleting, moving, changing in shape, or dividing a stroke of the handwritten object occurs during a first period, display the selectable candidates including both of the one or more operation commands candidates and the one or more character string candidates on the basis of the handwritten object,
wherein the one or more character string candidates comprise a handwriting recognized character string candidate recognized from the handwritten object, and a name of the command includes a character string that is the same as the handwriting recognized character string candidate,
wherein the one or more operation commands candidates start to be displayed at the same time as the one or more character string candidates on the same area of the display, and
wherein in a case a first handwritten input is received, a corresponding first operation command candidate is displayed, and in a case of a second handwritten input, different from the first handwritten input, is received, a corresponding second operation command candidate, different from the corresponding first operation command candidate, replaces the corresponding first operation command candidate.

* * * * *